(12) United States Patent
Levien et al.

(10) Patent No.: US 8,745,725 B2
(45) Date of Patent: Jun. 3, 2014

(54) HIGHLIGHTING IN RESPONSE TO DETERMINING DEVICE TRANSFER

(75) Inventors: Royce A. Levien, Lexington, MA (US);
Richard T. Lord, Tacoma, WA (US);
Robert W. Lord, Seattle, WA (US);
Mark A. Malamud, Seattle, WA (US);
John D. Rinaldo, Jr., Bellevue, WA (US); Clarence T. Tegreene, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/374,479

(22) Filed: Dec. 28, 2011

(65) Prior Publication Data
US 2012/0249570 A1 Oct. 4, 2012

Related U.S. Application Data

(63) Continuation-in-part of application No. 13/065,885, filed on Mar. 30, 2011, and a continuation-in-part of application No. 13/065,964, filed on Mar. 31, 2011, (Continued)

(51) Int. Cl.
*G06F 21/00* (2013.01)
(52) U.S. Cl.
CPC ............ *G06F 21/00* (2013.01); *Y10S 705/904* (2013.01); *Y10S 705/905* (2013.01); *Y10S 705/908* (2013.01)
USPC ................... 726/16; 726/2; 726/27; 705/27.2; 705/904; 705/905; 705/908; 715/708; 715/744; 715/747; 715/822; 715/863; 340/3.1; 340/5.2; 340/5.32; 380/250

(58) Field of Classification Search
CPC ......... G06F 21/00; G06F 3/017; G06F 3/046; G06K 9/00335
See application file for complete search history.

(56) References Cited

U.S. PATENT DOCUMENTS 6,002,427 A * 12/1999 Kipust .......................... 348/156
6,961,912 B2   11/2005 Aoki et al.
(Continued)

OTHER PUBLICATIONS

"Computer Detecting User Presence Video Mockup [Ubuntu]"; Web Upd8.org; Bearing a date of Sep. 14, 2010; pp. 1-11; located at: http://www.webupd8.org/2010/09/computer-detecting-user-presence-video.html; printed on Mar. 30, 2011.

(Continued)

*Primary Examiner* — Morshed Mehedi
*Assistant Examiner* — Sharon Lynch

(57) ABSTRACT

A computationally implemented method includes, but is not limited to: determining that a computing device that was presenting an item has been transferred from a first user to a second user; and presenting, via the computing device, one or more highlighted portions of the item, the one or more highlighted portions being highlighted in response, at least in part, to said determining. In addition to the foregoing, other method aspects are described in the claims, drawings, and text forming a part of the present disclosure.

66 Claims, 28 Drawing Sheets

Related U.S. Application Data and a continuation-in-part of application No. 13/066,848, filed on Apr. 25, 2011, now Pat. No. 8,402,535, and a continuation-in-part of application No. 13/066,917, filed on Apr. 26, 2011, now Pat. No. 8,347,399, and a continuation-in-part of application No. 13/135,314, filed on Jun. 29, 2011, and a continuation-in-part of application No. 13/135,392, filed on Jun. 30, 2011, and a continuation-in-part of application No. 13/199,237, filed on Aug. 22, 2011, now Pat. No. 8,613,075, and a continuation-in-part of application No. 13/199,286, filed on Aug. 23, 2011, now Pat. No. 8,615,797, and a continuation-in-part of application No. 13/200,743, filed on Sep. 28, 2011, and a continuation-in-part of application No. 13/200,800, filed on Sep. 29, 2011, and a continuation-in-part of application No. 13/317,827, filed on Oct. 27, 2011, and a continuation-in-part of application No. 13/317,832, filed on Oct. 28, 2011, and a continuation-in-part of application No. 13/373,679, filed on Nov. 23, 2011, and a continuation-in-part of application No. 13/373,796, filed on Nov. 29, 2011, and a continuation-in-part of application No. 13/374,352, filed on Dec. 22, 2011, and a continuation-in-part of application No. 13/374,083, filed on Dec. 8, 2011, and a continuation-in-part of application No. 13/374,213, filed on Dec. 14, 2011.

(56) References Cited

U.S. PATENT DOCUMENTS

| | | | |
|---|---|---|---|
| 7,190,351 | B1 | 3/2007 | Goren |
| 7,200,248 | B2 | 4/2007 | Horiguchi |
| 7,260,726 | B1 | 8/2007 | Doe et al. |
| 7,437,765 | B2 | 10/2008 | Elms et al. |
| 7,649,444 | B1 | 1/2010 | Fear et al. |
| 7,774,486 | B2 | 8/2010 | Clarke |
| 7,868,778 | B2 | 1/2011 | Kenwright |
| 8,279,242 | B2 | 10/2012 | Bentley |
| 8,289,130 | B2 | 10/2012 | Nakajima et al. |
| 8,406,162 | B2 | 3/2013 | Haupt et al. |
| 2002/0176603 | A1 | 11/2002 | Bauer et al. |
| 2003/0016253 | A1 | 1/2003 | Aoki et al. |
| 2003/0107584 | A1* | 6/2003 | Clapper .................. 345/619 |
| 2005/0039027 | A1 | 2/2005 | Shapiro |
| 2005/0149726 | A1 | 7/2005 | Joshi et al. |
| 2006/0052132 | A1* | 3/2006 | Naukkarinen et al. ...... 455/556.1 |
| 2006/0277474 | A1 | 12/2006 | Robarts et al. |
| 2007/0005616 | A1* | 1/2007 | Hay et al. .................. 707/100 |
| 2007/0030824 | A1* | 2/2007 | Ribaudo et al. ............. 370/328 |
| 2007/0042714 | A1* | 2/2007 | Ayed ....................... 455/41.2 |
| 2007/0052672 | A1 | 3/2007 | Ritter et al. |
| 2007/0118604 | A1* | 5/2007 | Costa Requena ............ 709/206 |
| 2007/0150827 | A1 | 6/2007 | Singh et al. |
| 2007/0162574 | A1 | 7/2007 | Williamson et al. |
| 2007/0174633 | A1 | 7/2007 | Draper et al. |
| 2007/0234209 | A1* | 10/2007 | Williams .................. 715/700 |
| 2007/0247425 | A1 | 10/2007 | Liberty et al. |
| 2008/0159496 | A1* | 7/2008 | Brown ...................... 379/93.03 |
| 2008/0201783 | A1 | 8/2008 | Tamai |
| 2008/0233996 | A1 | 9/2008 | Ogasawara et al. |
| 2008/0266089 | A1 | 10/2008 | Haren et al. |
| 2008/0271109 | A1 | 10/2008 | Singh et al. |
| 2009/0005079 | A1 | 1/2009 | Shields et al. |
| 2009/0006962 | A1 | 1/2009 | Ives et al. |
| 2009/0015425 | A1 | 1/2009 | Palmqvist et al. |
| 2009/0179765 | A1* | 7/2009 | Nymark et al. ............... 340/669 |
| 2009/0210932 | A1 | 8/2009 | Balakrishnan et al. |
| 2009/0239587 | A1 | 9/2009 | Negron et al. |
| 2009/0240569 | A1 | 9/2009 | Ramer et al. |
| 2009/0253410 | A1* | 10/2009 | Fitzgerald et al. ............ 455/411 |
| 2009/0292930 | A1 | 11/2009 | Marano et al. |
| 2009/0297064 | A1 | 12/2009 | Koziol et al. |
| 2010/0053322 | A1* | 3/2010 | Marti et al. .................. 348/135 |
| 2010/0124363 | A1* | 5/2010 | Ek et al. ..................... 382/118 |
| 2010/0157135 | A1 | 6/2010 | Dossaji et al. |
| 2010/0167783 | A1* | 7/2010 | Alameh et al. ............. 455/556.1 |
| 2010/0180210 | A1 | 7/2010 | Toyama et al. |
| 2010/0222141 | A1 | 9/2010 | LaSalvia et al. |
| 2010/0235667 | A1 | 9/2010 | Mucignat et al. |
| 2011/0025842 | A1 | 2/2011 | King et al. |
| 2011/0069940 | A1* | 3/2011 | Shimy et al. ................ 386/296 |
| 2011/0072452 | A1 | 3/2011 | Shimy et al. |
| 2011/0083109 | A1 | 4/2011 | Hildebrandt et al. |
| 2011/0093806 | A1 | 4/2011 | Cohen et al. |
| 2011/0107427 | A1 | 5/2011 | Cohen et al. |
| 2011/0110557 | A1 | 5/2011 | Clark et al. |
| 2011/0133908 | A1 | 6/2011 | Leung |
| 2011/0141011 | A1* | 6/2011 | Lashina et al. ............... 345/156 |
| 2011/0154266 | A1* | 6/2011 | Friend et al. ................. 715/863 |
| 2011/0166972 | A1 | 7/2011 | Cohen et al. |
| 2011/0197121 | A1* | 8/2011 | Kletter ........................ 715/234 |
| 2011/0202269 | A1 | 8/2011 | Reventlow |
| 2011/0227856 | A1 | 9/2011 | Corroy et al. |
| 2011/0231911 | A1 | 9/2011 | White et al. |
| 2011/0265179 | A1 | 10/2011 | Newman et al. |
| 2011/0317872 | A1 | 12/2011 | Free |
| 2011/0321143 | A1 | 12/2011 | Angaluri et al. |
| 2012/0017147 | A1* | 1/2012 | Mark ........................... 715/702 |
| 2012/0028625 | A1 | 2/2012 | Konig |
| 2012/0062729 | A1* | 3/2012 | Hart et al. .................... 348/135 |
| 2012/0081392 | A1* | 4/2012 | Arthur ........................ 345/633 |
| 2012/0108215 | A1 | 5/2012 | Kameli |
| 2012/0151339 | A1* | 6/2012 | Zhang et al. ................. 715/702 |
| 2012/0166966 | A1 | 6/2012 | Wood et al. |
| 2012/0191764 | A1* | 7/2012 | Leibu et al. .................. 707/821 |
| 2012/0235790 | A1* | 9/2012 | Zhao et al. ................... 340/5.83 |
| 2012/0256967 | A1* | 10/2012 | Baldwin et al. .............. 345/684 |
| 2012/0293528 | A1* | 11/2012 | Larsen ......................... 345/589 |
| 2012/0311438 | A1 | 12/2012 | Cranfill et al. |
| 2012/0330660 | A1* | 12/2012 | Jaiswal ........................ 704/235 |
| 2013/0065608 | A1 | 3/2013 | Nakajima et al. |
| 2013/0159939 | A1* | 6/2013 | Krishnamurthi ............. 715/863 |

OTHER PUBLICATIONS

"How do I detect when a user is sitting in the chair in front of a computer?"; Superuser.com; Bearing a date of Aug. 11, 2009; 5 Total pages; located at: http://superuser.com/questions/21364/how-do-i-detect-when-a-user-is-sitting-in-the-chair-in-front-of-a-computer.

Pike, John; "Homeland Security: Biometrics"; GlobalSecurity.org; Bearing a date of Mar. 9, 2007; 4 Total pages; located at: http://www.globalsecurity.org/security/systems/biometrics.htm.

U.S. Appl. No. 13/374,352, Levien et al.
U.S. Appl. No. 13/374,213, Levien et al.
U.S. Appl. No. 13/374,083, Levien et al.
U.S. Appl. No. 13/373,796, Levien et al.
U.S. Appl. No. 13/373,679, Levien et al.
U.S. Appl. No. 13/317,832, Levien et al.
U.S. Appl. No. 13/317,827, Levien et al.
U.S. Appl. No. 13/200,800, Levien et al.
U.S. Appl. No. 13/200,743, Levien et al.
U.S. Appl. No. 13/199,286, Levien et al.
U.S. Appl. No. 13/199,237, Levien et al.
U.S. Appl. No. 13/135,392, Levien et al.
U.S. Appl. No. 13/135,314, Levien et al.
U.S. Appl. No. 13/066,917, Levien et al.
U.S. Appl. No. 13/066,848, Levien et al.
U.S. Appl. No. 13/065,964, Levien et al.
U.S. Appl. No. 13/065,885, Levien et al.

Hughes, Neil; "Apple Exploring Face Detection to Unlock, Customize & Interact with iOS Devices"; bearing a date of Apr. 5, 2012; pp. 1-4; AppleInsider; http://www.appleinsider.com/articles/12/04/05/apple_exploring_face_detection_to_unlock_customize_interact_with_ios_devices.html.

Kernchen et al.; "Multimodal user interfaces for context-aware mobile applications"; IEEE 16th International Symposium on Personal, Indoor and Mobile Radio Communications; bearing a date of Mar. 20, 2005; pp. 2268-2273; #1568961325; IEEE.

(56) References Cited

OTHER PUBLICATIONS

Noll et al.; "Integrating Mobile Devices into Semantic Services Environments"; The Fourth International Conference on Wireless and Mobile Communications; bearing a date of Mar. 4, 2008; pp. 137-143; IEEE Computer Society.

* cited by examiner

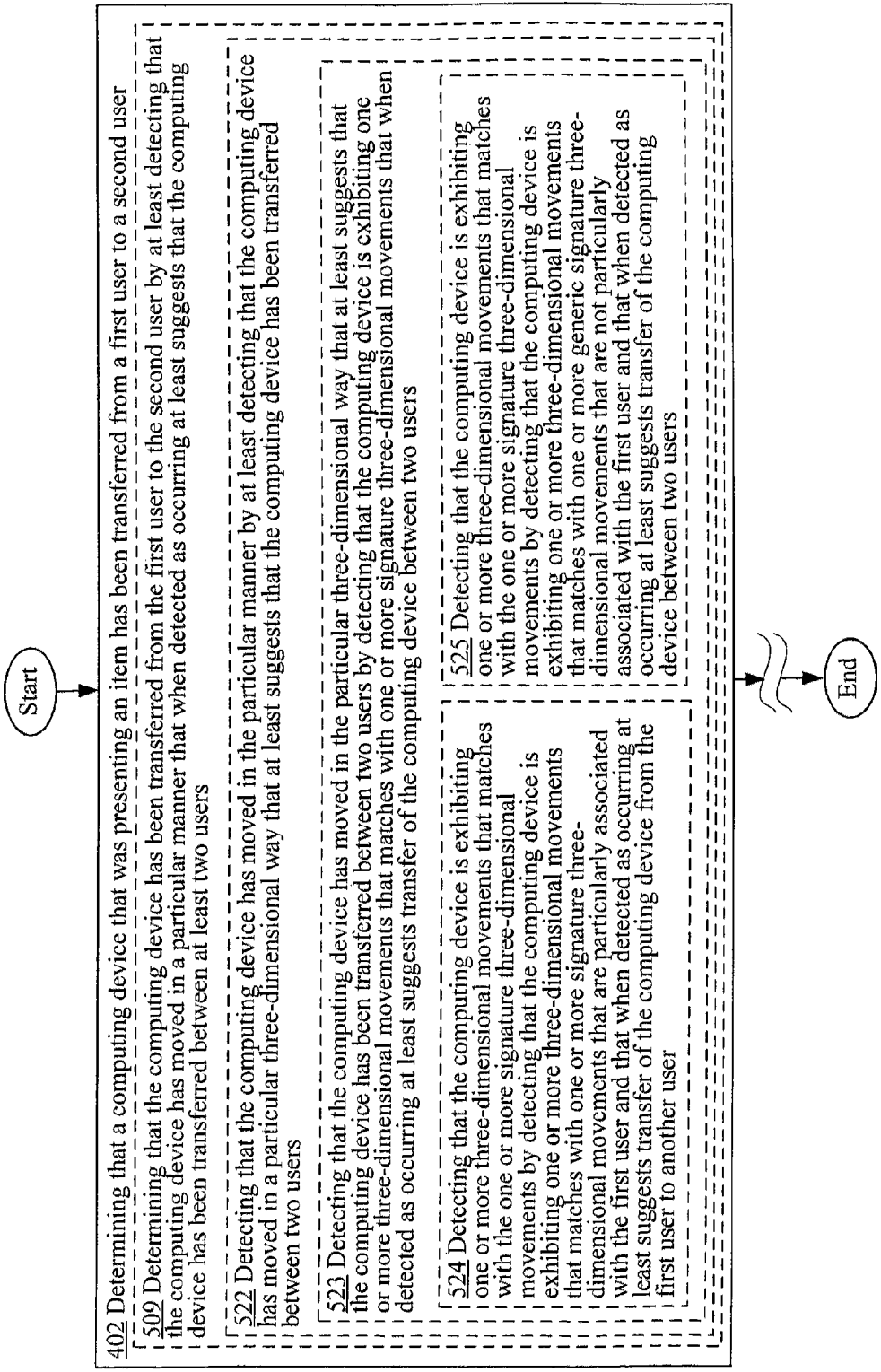

HIGHLIGHTING IN RESPONSE TO DETERMINING DEVICE TRANSFER

CROSS-REFERENCE TO RELATED APPLICATIONS

The present application is related to and claims the benefit of the earliest available effective filing date(s) from the following listed application(s) (the "Related applications") (e.g., claims earliest available priority dates for other than provisional patent applications or claims benefits under 35 USC §119(e) for provisional patent applications, for any and all parent, grandparent, great-grandparent, etc. applications of the Related application(s)). All subject matter of the Related applications and of any and all parent, grandparent, great-grandparent, etc. applications of the Related applications, including any priority claims, is incorporated herein by reference to the extent such subject matter is not inconsistent herewith.

> For purposes of the USPTO extra-statutory requirements, the present application constitutes a continuation of U.S. patent application Ser. No. 13/374,352, entitled HIGHLIGHTING IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 22 Dec. 2011, which is currently co-pending or is an application of which a currently co-pending application is entitled to the benefit of the filing date.

> For purposes of the USPTO extra-statutory requirements, the present application constitutes a continuation-in-part of U.S. patent application Ser. No. 13/065,885, entitled ACCESS RESTRICTION IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 30 Mar. 2011, which is currently co-pending or is an application of which a currently co-pending application is entitled to the benefit of the filing date.

> For purposes of the USPTO extra-statutory requirements, the present application constitutes a continuation-in-part of U.S. patent application Ser. No. 13/065,964, entitled ACCESS RESTRICTION IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 31 Mar. 2011, which is currently co-pending or is an application of which a currently co-pending application is entitled to the benefit of the filing date.

> For purposes of the USPTO extra-statutory requirements, the present application constitutes a continuation-in-part of U.S. patent application Ser. No. 13/066,848, entitled PROVIDING GREATER ACCESS TO ONE OR MORE ITEMS IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 25 Apr. 2011, which is currently co-pending or is an application of which a currently co-pending application is entitled to the benefit of the filing date.

> For purposes of the USPTO extra-statutory requirements, the present application constitutes a continuation-in-part of U.S. patent application Ser. No. 13/066,917, entitled PROVIDING GREATER ACCESS TO ONE OR MORE ITEMS IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 26 Apr. 2011, which is currently co-pending or is an application of which a currently co-pending application is entitled to the benefit of the filing date.

> For purposes of the USPTO extra-statutory requirements, the present application constitutes a continuation-in-part of U.S. patent application Ser. No. 13/135,314, entitled PROVIDING PARTICULAR LEVEL OF ACCESS TO ONE OR MORE ITEMS IN RESPONSE TO DETERMINING PRIMARY CONTROL OF A COMPUTING DEVICE, naming Royce A. Levien; Richard T. Lord; Robert W. Lord; Mark A. Malamud; John D. Rinaldo, Jr.; Clarence T. Tegreene as inventors, filed 29 Jun. 2011, which is currently co-pending or is an application of which a currently co-pending application is entitled to the benefit of the filing date.

> For purposes of the USPTO extra-statutory requirements, the present application constitutes a continuation-in-part of U.S. patent application Ser. No. 13/135,392, entitled PROVIDING PARTICULAR LEVEL OF ACCESS TO ONE OR MORE ITEMS IN RESPONSE TO DETERMINING PRIMARY CONTROL OF A COMPUTING DEVICE, naming Royce A. Levien; Richard T. Lord; Robert W. Lord; Mark A. Malamud; John D. Rinaldo, Jr.; Clarence T. Tegreene as inventors, filed 30 Jun. 2011, which is currently co-pending or is an application of which a currently co-pending application is entitled to the benefit of the filing date.

> For purposes of the USPTO extra-statutory requirements, the present application constitutes a continuation-in-part of U.S. patent application Ser. No. 13/199,237, entitled SELECTIVE ITEM ACCESS PROVISION IN RESPONSE TO ACTIVE ITEM ASCERTAINMENT UPON DEVICE TRANSFER, naming Royce A. Levien; Richard T. Lord; Robert W. Lord; Mark A. Malamud; John D. Rinaldo, Jr.; Clarence T. Tegreene as inventors, filed 22 Aug. 2011, which is currently co-pending or is an application of which a currently co-pending application is entitled to the benefit of the filing date.

> For purposes of the USPTO extra-statutory requirements, the present application constitutes a continuation-in-part of U.S. patent application Ser. No. 13/199,286, entitled SELECTIVE ITEM ACCESS PROVISION IN RESPONSE TO ACTIVE ITEM ASCERTAINMENT UPON DEVICE TRANSFER, naming Royce A. Levien; Richard T. Lord; Robert W. Lord; Mark A. Malamud; John D. Rinaldo, Jr.; Clarence T. Tegreene as inventors, filed 23 Aug. 2011, which is currently co-pending or is an application of which a currently co-pending application is entitled to the benefit of the filing date.

> For purposes of the USPTO extra-statutory requirements, the present application constitutes a continuation-in-part of U.S. patent application Ser. No. 13/200,743, entitled PROVIDING GREATER ACCESS TO ONE OR MORE ITEMS IN RESPONSE TO VERIFYING DEVICE TRANSFER, naming Royce A. Levien; Richard T. Lord; Robert W. Lord; Mark A. Malamud; John D. Rinaldo, Jr.; Clarence T. Tegreene as inventors, filed 28 Sep. 2011, which is currently co-pending or is an application of which a currently co-pending application is entitled to the benefit of the filing date.

> For purposes of the USPTO extra-statutory requirements, the present application constitutes a continuation-inpart of U.S. patent application Ser. No. 13/200,800, entitled PROVIDING GREATER ACCESS TO ONE OR MORE ITEMS IN RESPONSE TO VERIFYING DEVICE TRANSFER, naming Royce A. Levien; Richard T. Lord; Robert W. Lord; Mark A. Malamud; John D. Rinaldo, Jr.; Clarence T. Tegreene as inventors, filed 29 Sep. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/317,827, entitled PRESENTATION FORMAT SELECTION BASED AT LEAST ON DEVICE TRANSFER DETERMINATION, naming Royce A. Levien; Richard T. Lord; Robert W. Lord; Mark A. Malamud; John D. Rinaldo, Jr.; Clarence T. Tegreene as inventors, filed 27 Oct. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/317,832, entitled PRESENTATION FORMAT SELECTION BASED AT LEAST ON DEVICE TRANSFER DETERMINATION, naming Royce A. Levien; Richard T. Lord; Robert W. Lord; Mark A. Malamud; John D. Rinaldo, Jr.; Clarence T. Tegreene as inventors, filed 28 Oct. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/373,679, entitled ASCERTAINING PRESENTATION FORMAT BASED ON DEVICE PRIMARY CONTROL DETERMINATION, naming Royce A. Levien; Richard T. Lord; Robert W. Lord; Mark A. Malamud; John D. Rinaldo, Jr.; Clarence T. Tegreene as inventors, filed 23 Nov. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/373,796, entitled ASCERTAINING PRESENTATION FORMAT BASED ON DEVICE PRIMARY CONTROL DETERMINATION, naming Royce A. Levien; Richard T. Lord; Robert W. Lord; Mark A. Malamud; John D. Rinaldo, Jr.; Clarence T. Tegreene as inventors, filed 29 Nov. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/374,083, entitled MARKING ONE OR MORE ITEMS IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 8 Dec. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/374,213, entitled MARKING ONE OR MORE ITEMS IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 14 Dec. 2011, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

SUMMARY

A computationally implemented method includes, but is not limited to determining that a computing device that was presenting an item has been transferred from a first user to a second user, and presenting, via the computing device, one or more highlighted portions of the item, the one or more highlighted portions being highlighted in response, at least in part, to said determining. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware in one or more machines or article of manufacture configured to effect the herein-referenced method aspects depending upon the design choices of the system designer.

A computationally implemented system includes, but is not limited to: means for determining that a computing device that was presenting an item has been transferred from a first user to a second user; and means for presenting, via the computing device, one or more highlighted portions of the item, the one or more highlighted portions being highlighted in response, at least in part, to said determining. In addition to the foregoing, other system aspects are described in the claims, drawings, and text forming a part of the present disclosure.

A computationally implemented system includes, but is not limited to: circuitry for determining that a computing device that was presenting an item has been transferred from a first user to a second user; and circuitry for presenting, via the computing device, one or more highlighted portions of the item, the one or more highlighted portions being highlighted in response, at least in part, to said determining. In addition to the foregoing, other system aspects are described in the claims, drawings, and text forming a part of the present disclosure.

An article of manufacture including a non-transitory storage medium bearing one or more instructions for determining that a computing device that was presenting an item has been transferred from a first user to a second user; and one or more instructions for presenting, via the computing device, one or more highlighted portions of the item, the one or more highlighted portions being highlighted in response, at least in part, to said determining. In addition to the foregoing, other computer program product aspects are described in the claims, drawings, and text forming a part of the present disclosure.

A method for determining that a computing device that was presenting an item has been transferred from a first user to a second user, wherein said determining that a computing device that was presenting an item has been transferred from a first user to a second user, is performed via at least one of a machine, article of manufacture, or composition of matter; and for presenting, via the computing device, one or more highlighted portions of the item, the one or more highlighted portions being highlighted in response, at least in part, to said determining.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 5d is a high-level logic flowchart of a process depicting alternate implementations of the transfer determining operation 402 of FIG. 4.

DETAILED DESCRIPTION

Figure 1:
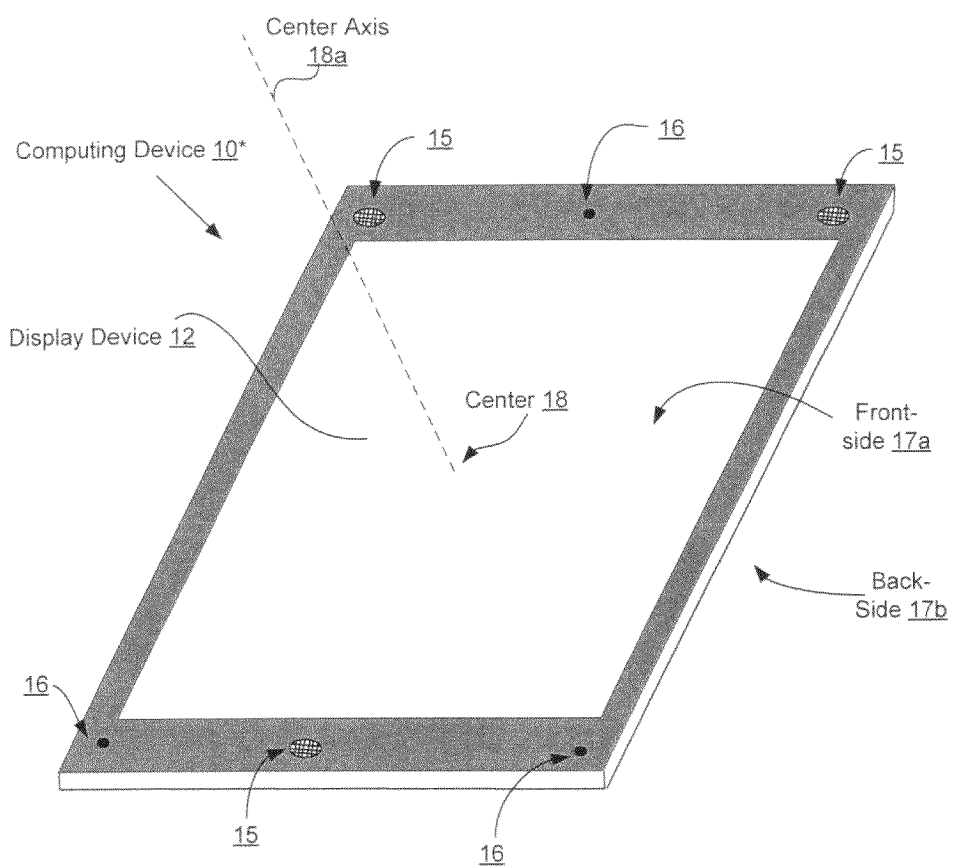
FIG. 1 shows an exemplary computing device 10* in accordance with various embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Advances in computing technologies and related technologies (e.g., visual display technology, battery technology, etc.) in recent years have greatly facilitated in the development of computing devices having increasingly smaller form factors while still maintaining exceptional processing capabilities. Examples of such computing devices include, for example, laptops, Netbooks, tablet computers (i.e., "slate" computers), e-readers, Smartphones, and so forth. Because of their compactness, such devices are becoming much easier to share among multiple users. That is, due to their small form factors, such devices allow users of such devices to easily hand-off such devices to friends, family, co-workers, clients, and so forth, in order to share the content and/or applications being presented through such devices.

For example, suppose a user of a tablet computer is reading an electronic book (e.g., an eBook, a digital book, etc.) through the tablet computer. While reading the electronic book, the user comes across an interesting passage (e.g., a paragraph) located on a particular portion of a particular page of the electronic book that the user wants to share with a friend sitting across a table from the user. Typically, in order to show the passage of interest to the friend, the user will simply pass or handover the tablet computer to the friend thereby allowing the friend to view the passage that the user was interested in. Unfortunately, by simply passing the tablet computer to the friend, the tablet computer, along with displaying the passage of interest, may also be displaying many other passages from the electronic book that may not be of interest to the user (or the friend), thus making it difficult for the friend to easily find the passage of interest without the help of the user. And even after the user helps the friend find the passage of interest, the friend may not be able to digest the passage of interest because it may not be in a format that is easily digestible by the friend (e.g., if the friend is elderly and has poor eyesight and the passage may be in a textual format that is too small to read or if the friend does not read the language that the passage is written in, such as English, then the friend may not be able to understand the passage).

Suppose further that the same user uses a tablet computer at work for a variety of tasks including, for example, to electronically sign documents. Typically business contracts are signed by a number of people including, for example, the owners or representatives of business, clients, vendors, etc. For various legal and business reasons, contracts that are typically signed in the business context (as well as in familial and personal context) tend to be highly complex and difficult to decipher. Thus, it is often difficult and cumbersome for signers of such electronic documents to quickly and easily figure out where in such documents do the signers actually write their signatures upon receiving the tablet computer that the documents are being displayed through.

In accordance with various embodiments, computationally implemented methods, systems, and articles of manufacture are provided that can determine whether a computing device (e.g., a portable or mobile computing device such as a tablet computer, an e-reader, a smartphone, and so forth) that was presenting an electronic item (e.g., an application or an application interface, a productivity document such as a word processing or spreadsheet document, an audio file, a video file, an image file or folder, a website, an electronic or digital book, and so forth) has been transferred from a first user to a second user; and to visually and/or audibly present, via the computing device, one or more highlighted portions of the electronic item (herein simply "item"), the one or more highlighted portions being highlighted in response, at least in part, to determining that the computing device has been transferred from the first user to the second user. In various embodiments, a computing device may be defined as an electronic device having electronic circuitry for executing one or more functionalities. In some cases, a computing device may include one or more processors (e.g., microprocessors, central processing units or CPUs, array processors, vector processors, controllers, and so forth).

In various embodiments, the computing device may have been transferred from the first user to the second user when control over the computing device has been transferred from the first user to the second user. For these embodiments, a user (e.g., the first user or the second user) may have control over the computing device when, for example, the user is, relative to other users, nearest or closest to the computing device, when the user is situated in a particular location relative to the particular orientation of the computing device (e.g., when the user is located on the side of the computing device that a display device is located at and is centered with respect to the display device), and/or when the user has physical possession of the computing device such as by holding the computing device with one or two hands or by simply being in physical contact with the computing device. Thus, a transfer of a computing device from a first user to a second user may have occurred when, for example, the second user replaces the first user as being nearest to the computing device, when the second user replaces the first user generally at a particular location relative to the specific orientation of the computing device and/or when the possession of the computing device transfers from the first user to the second user.

As will be described in greater detail herein, a portion of an item may be highlighted in a variety of different ways in various alternative embodiments. For example, in some cases, highlighting of the portion of the item may be by formatting (e.g., font style or size, color scheme, brightness, zoom view, increased audio volume or audio bass, language, and so forth) the portion differently from how the portion was formatted prior to the transfer of the computing device and/or by having a format that is different from the format of non-highlighted portions of that item that may be concurrently presented with the highlighted portions. Alternatively or additionally, a portion of the item may be highlighted by simply encircling the portion with a boarder or boarders such as a line.

As will be further described herein, the portion or portions of the item to be highlighted as well as the type of highlighting that may be applied to the portion or portions may depend on which user is the computing device being transferred to. For example, in some cases, the determination as to whether the computing device has been transferred from a first user to a second user may include an operation to identify the second user, and based on the identification of the second user select the appropriate portion or portions of the item to highlight and/or the type or types of highlighting to apply. In some embodiments, the second user may be identified based on the biometric characteristics or gestures exhibited by the second user.

Referring now to FIG. 1 illustrating a computing device 10* in the form of a tablet computer in accordance with various embodiments. For the embodiments, the computing device 10* may have at least a front-side 17a that includes a display device 12 (e.g., a display monitor such as a touch screen), and a back-side 17b (not visible in FIG. 1) that is opposite of the front-side 17a. As further illustrated in FIG. 1, the front-side 17a of the computing device 10* may include a center 18 (note that in FIG. 1 a center axis 18a has been drawn-in that represents an axis originating from the center 18 of the front-side 17a of the computing device 10* and perpendicular to the surface of the front-side 17a of the computing device 10*). In various embodiments, the front-side 17a of the computing device 10* may include one or more camera lens or viewing ports 16 (e.g., one or more viewing ports 16 for one or more cameras including one or more digital cameras, webcams, infrared cameras, and/or other types of image capturing devices) and/or one or more audio ports 15 (e.g., one or more audio ports for one or more microphones).

Figure 3A:
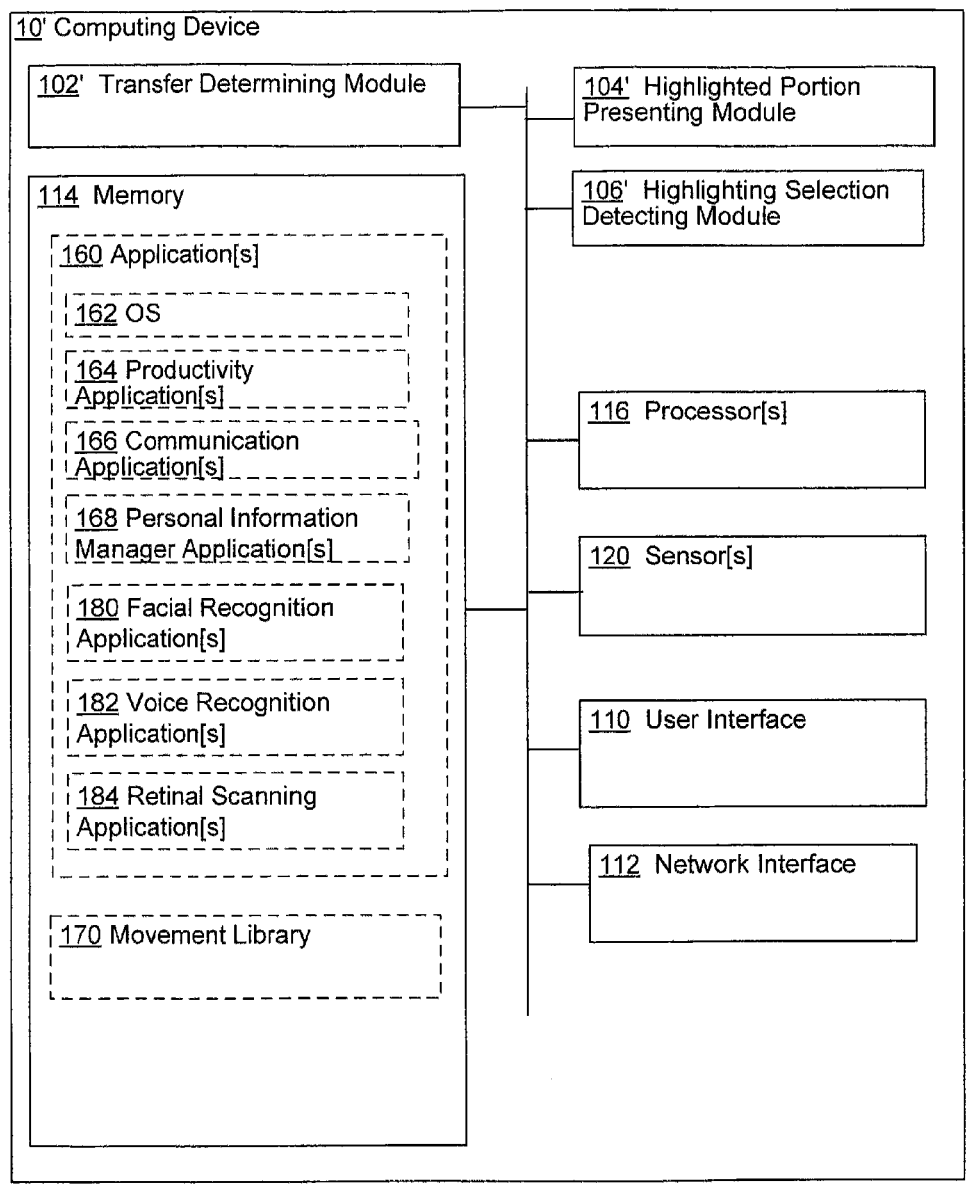
FIG. 3a shows a particular implementation of the computing device 10* of FIG. 1 illustrated as computing device 10'.
Figure 3B:
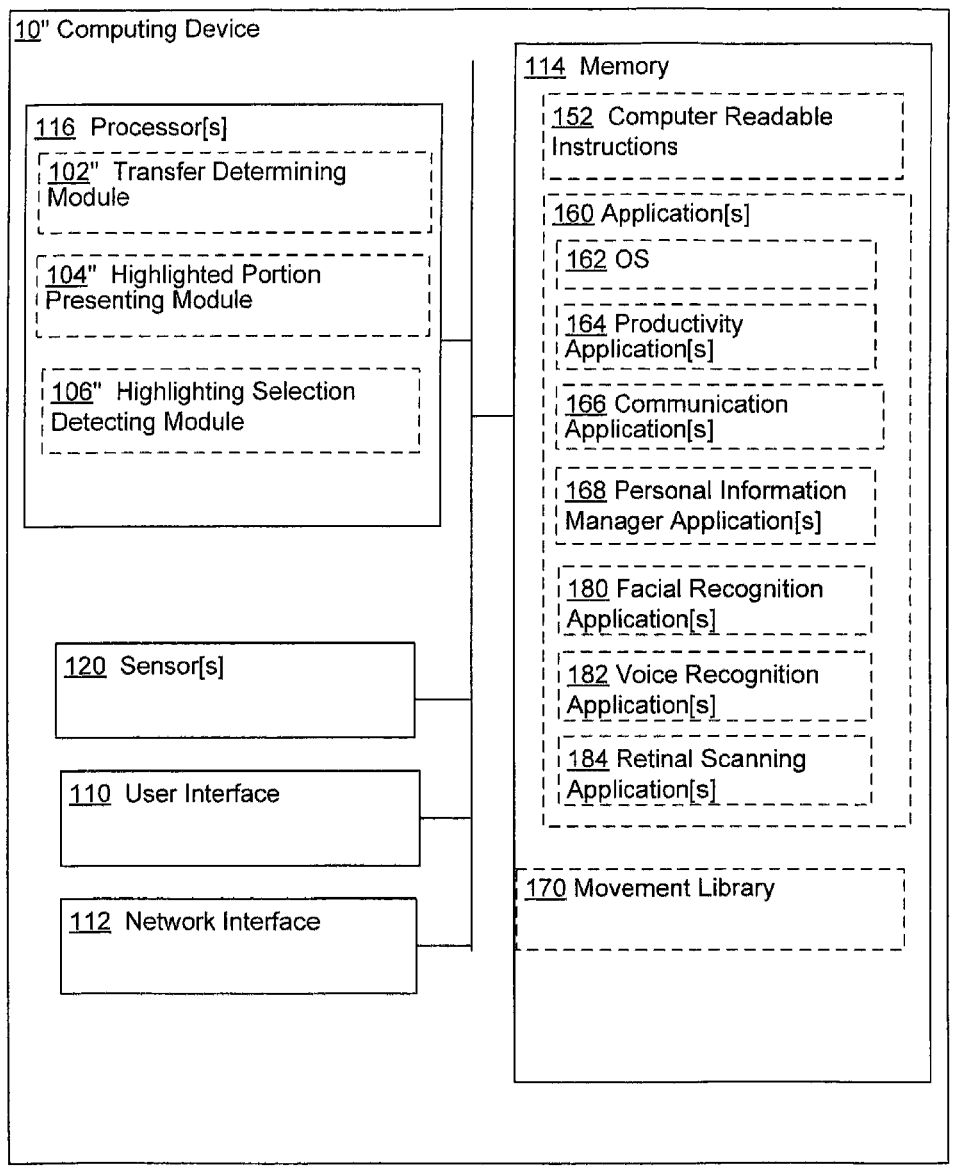
FIG. 3b shows another implementation of the computing device 10* of FIG. 1 illustrated as computing device 10".

Note that although the front-side 17a of the computing device 10* of FIG. 1 is illustrated as having three viewing ports 16 for three image capturing devices 304 (see FIG. 3e) and three audio ports 15 for three audio capturing devices 306 (see FIG. 3e), in alternative embodiments, the front-side 17a may include alternative number of viewing ports 16 and/or audio ports 15 than what is depicted in FIG. 1. Further, and although not shown in FIG. 1, in various embodiments, the backside 17b of the computing device 10* may also include one or more viewing ports 16 and/or audio ports 15. Note that FIGS. 3a and 3b illustrate two different implementations of the computing device 10* of FIG. 1 illustrated in FIG. 3a as computing device 10' and in FIG. 3b as computing device 10". Note further that for purposes of the following, "*" represents a wildcard. Thus, references in the following to the "computing device 10*" may be in reference to the computing device 10* of FIG. 1 as well as to the computing device 10' of FIG. 3a or the computing device 10" of FIG. 3b. Although the computing device 10* illustrated in FIG. 1 is depicted as being a tablet computer, in alternative embodiments, the computationally implemented methods, systems, and articles of manufacture in accordance with various embodiments may be embodied in other types of computer systems having other form factors including form factors of other types of portable computer devices such as, for example, laptops, Netbooks, Smartphones, e-readers, and so forth.

Figure 2A:
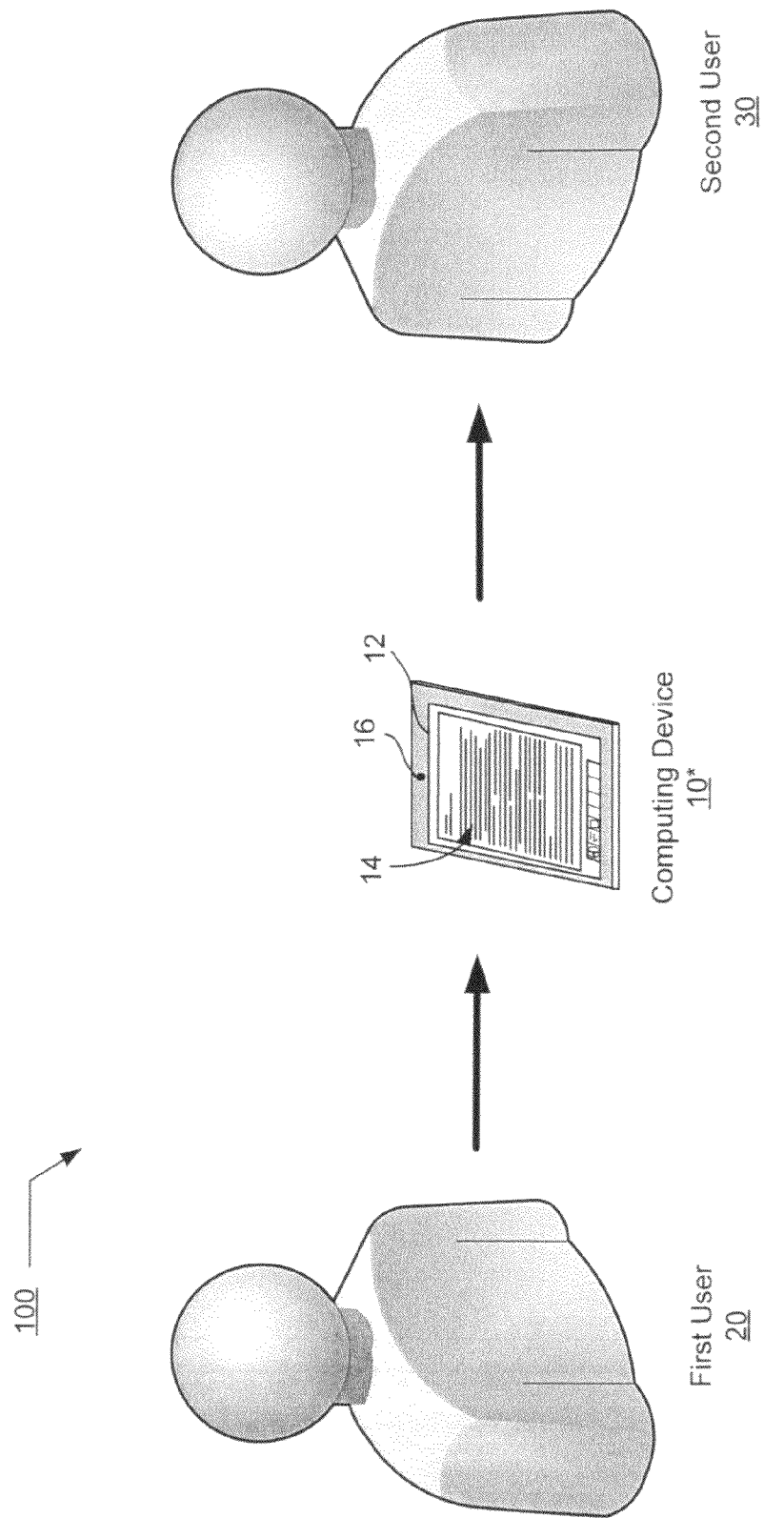
FIG. 2a shows a computing device 10* being transferred between two users in an exemplary environment 100.

Referring now to FIG. 2a illustrating the computing device 10* of FIG. 1 in an exemplary environment 100 being transferred between two users (e.g., a first user 20 and a second user 30). As will be further described herein the illustrated computing device 10* may employ the computationally implemented methods, systems, and articles of manufacture in accordance with various embodiments. The computing device 10*, in various embodiments, may be endowed with logic that is designed to determine that the computing device 10* that was presenting item (in FIG. 2a, the item being presented is a word processing document 14) has been transferred from a first user 20 to a second user 30; and visually and/or audibly present automatically one or more highlighted portions of the item (e.g., word processing document 14), the one or more highlighted portions being highlighted in response, at least in part, to determining that the computing device 10* has been transferred from the first user 20 to the second user 30. The computing device 10* or its endowed logic may further be designed to select the portion or portions of the item to be highlighted and/or to select the type of highlighting to be applied to the portion or portions of the item by identifying the second user 30.

There are a number of ways to determine whether a computing device 10* is or has been transferred from one user to another user. For instance, in some cases, various sensor-provided data may be collected in order to make such a determination. Such data may indicate various environmental aspects surrounding the computing device 10* and/or aspects of the computing device 10* itself (e.g., movements displayed or exhibited by the computing device 10* as a result of being in contact with one or more users). For example, when the computing device 10* of FIG. 1 is passed from, for example, the first user 20 to another user such as the second user 30, the first user 20 may make certain recognizable as well as detectable gestures. Such gestures may include, for example, the first user 20 extending his/her arms out with the computing device 10* in one or both hands (e.g., as if to offer the computing device 10* to the second user 30); the first user 20 passing the computing device 10* from one hand to another hand, and extending the second hand with the computing device 10* out and away from the first user 20; the first user 20 rotating the computing device 10* around using his/her hands so that the front side 17a of the computing device 10* faces away from the first user 20 and faces the second user 30, who is standing or sitting across from the first user 20, and so forth. These movements or gestures made by the first user 20, when detected, may at least infer that the transfer (e.g., change in possession) of the computing device 10* from a first user 20 to a second user 30 has occurred.

One way to track the movements or gestures of the first user 20 is to track the movements of the computing device 10* itself (note that another way to detect the gestures of the first user 20 is to observe visually the gestures—visual cues—exhibited by the first user 20 via one or more image capturing devices 304, which will be described in greater detail below). That is, these gestures that may be exhibited by the first user 20 during the transfer of a computing device 10* from the first user 20 to the second user 30 may cause the computing device 10* to be spatially moved in particular ways. Thus, in order to detect whether a computing device 10* is being transferred from a first user 20 to a second user 30, the spatial movements of the computing device 10* may be tracked in order to detect signature movements that when detected as occurring at least infer the transfer of the computing device 10* between the first user 20 and the second user 30. For example, the computing device 10* may maintain in its memory 114 (see FIGS. 3a and 3b) a movement library 170 (see FIGS. 3a and 3b), which is a catalog or library that identifies those signature spatial movements that when detected as occurring at least infers (e.g., implies) that a transfer of the computing device 10* has occurred between two users (e.g., first user 20 and second user 30).

One way to monitor for such movements of the computing device 10* is to directly detect such movements using one or more "movement" sensors that are designed to directly detect/measure spatial movements of the computing device 10*. Examples of such movement sensors include, for example, inertia sensors, accelerometers (e.g. three-axis or 3D accelerometers), gyroscopes, and so forth. These sensors (herein movement sensors 302—see FIG. 3e which illustrates one or more types of sensors 120 that may be included in the computing device 10* of FIG. 1) when integrated with a computing device 10* may be used to directly detect/track the actual spatial movements/motions of the computing device 10* as the computing device 10* is being transferred from, for example, a first user 20 to a second user 30 (or from the second user 30 back to the first user 20).

Since not all movements of the computing device 10* that may be detected will be as a result of the computing device 10* being transferred between two users, in various embodiments and as will be further described herein, the computing device 10* may be endowed with particular logic for determining (e.g., identifying) which movements associated with the computing device 10* that have been detected indicates or at least suggests that the computing device 10* is or has been transferred from, for example, a first user 20 to a second user 30 and which detected movements may merely be "noise movements."

Various types of movements of the computing device 10* may be tracked in order to determine or at least infer that the computing device 10* is being transferred between, for example, a first user 20 and a second user 30. Examples of the types of movements that may be tracked include, for example, the overall three-dimensional movements of the computing device 10*, or specific types of movements including tilt type movements, spin-rotation type movements, spatial relocation type movements, vibration movements, and so forth of the computing device 10*. In order to determine or at least infer that the computing device 10* has been transferred from a first user 20 to a second user 30, these movements of the computing device 10* may be, individually or in combination, tracked using one or more sensors 120 that may be included with the computing device 10* as illustrated in FIG. 2e. For example, in various embodiments, one or more movement sensors 302 (e.g., inertia devices, accelerometers, etc.) that can directly detect movements, and/or other types of sensors (e.g., image capturing devices 304, audio capturing devices 306, etc.) that may be able to indirectly detect movements may be employed in order to track the movements of the computing device 10* as will be further described herein.

Figure 2B:
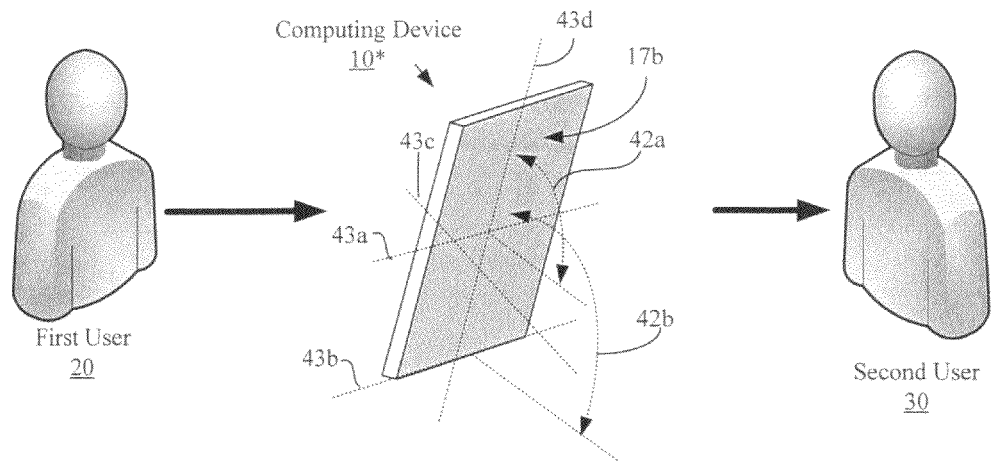
FIG. 2b shows one type of movement that may be detected/monitored by the computing device 10* of FIG. 1.

Referring now to FIG. 2b illustrating various types of tilts and tilt movements of the computing device 10* that may be detected and monitored using one or more sensors 120 (e.g., one or more movement sensors 302) in order to, for example, determine or infer that the computing device 10* has been transferred between two users (e.g., from the first user 20 to the second user 30 or from the second user 30 to the first user 20) in accordance with various embodiments. That is, FIG. 2b shows the backside 17b of the computing device 10* and some of the tilt-type movements that may be monitored by the computing device 10* in order to determine whether the computing device 10* has been transferred from, for example, a first user 20 to a second user 30 (or vice versa). Note that for ease of illustration and understanding the computing device 10* in FIG. 2b (as well as in FIGS. 2c, 2d, and 2e) is not drawn to scale at least with respect to the first user 20 and the second user 30.

One type of tilt that may be detected/monitored is tilt 42a of the computing device 10* that may occur when the computing device 10* is at least partially rotated around a central horizontal axis 43a. A second type of tilt that may be detected is tilt 42b, which may occur when the computing device 10* is at least partially rotated around a bottom horizontal axis 43b. Although not depicted, another type of tilt that may occur and that may be monitored is when the computing device 10* is at least partially rotated around an angular axis 43c that is angular with respect to a horizontal axis (e.g., axis 43a or 43b) and is parallel to the plane of the backside 17b similar to axis 43a and axis 43b. Yet another type of tilt that may occur and that may also be monitored is when the computing device 10* is at least partially rotated around a vertical axis 43d. Note that although the vertical axis 43d is depicted as being centered along the backside 17b of the computing device 10*, just like the horizontal axis 43b, the vertical axis 43d does not have to be centered on the backside 17b and instead, may be offset from the center of the backside 17b of the computing device 10* (e.g., may be closer to one end of the device rather than an opposite end of the device. Although only a few types of tilts were illustrated in FIG. 2b, those of ordinary skill in the art will recognize that other types of tilts or tilt movements of the computing device 10* may alternatively or additionally be monitored in various alternative implementations in order to determine whether the computing device 10* has been transferred between two users.

By detecting that the computing device 10* has been tilted in a particular manner from a first tilt orientation to a second tilt orientation, a determination or an inference may be made that the computing device 10* has been transferred from the first user 20 to the second user 30. In particular, when the first user 20, for example, is handing off or transferring the computing device 10* to the second user 30, the first user 20 may tilt the computing device 10* in a particular way that may be identifiable. Thus, when the computing device 10* is being transferred from a first user 20 to a second user 30 (or vice versa), the computing device 10* (or rather the logic endowed with the computing device 10*) may track the movements of the computing device 10* as it moves from a first tilt orientation (e.g., the tilt of the computing device 10* at the beginning of the transfer or when the first user 20 was using or had possession of the computing device 10*) to a second tilt orientation (e.g., the tilt of the computing device 10* at the end of the transfer or when the second user 30, for example, has obtained possession of the computing device 10*).

In order to make a determination or at least an inference that a transfer was made between two users such as from the first user 20 to the second user 30 (or vice versa), the computing device 10* or at least the logic endowed in the computing device 10* may track and examine the particular movements of the computing device 10* (e.g., how the computing device 10* was reoriented from a first tilt orientation to a second tilt orientation including speed and cadence of the reorientation) as the computing device 10* moves from the first tilt orientation to a second tilt orientation. The computing device 10* may additionally or alternatively analyze the second tilt orientation (e.g., the tilt of the computing device 10* after it has finished being reoriented) at least with respect to the first tilt orientation in order to determine or infer that the computing device 10* has been transferred. To further determine or at least infer that the computing device 10* has been transferred from the first user 20 to the second user 30, for example, the examination/analysis of the detected tilt movements of the computing device 10* may involve comparing the detected tilt movements of the computing device 10* with catalogued or library tilt movements (which may be stored in the memory 114 of the computing device 10*) that are identified as being movements associated with transfer of the computing device 10* between two users.

That is, the computing device 10* may maintain in its memory 114 (see FIGS. 3a and 3b) a movement library 170 that may include a catalogue or library of movements including signature tilt movements that have been previously identified as tilt movements that may occur when, for example, a computing device 10* is transferred between two users (e.g., first user 20 and second user 30). Thus, when tilt movements that match with catalogued or library tilt movements (e.g., signature tilt movements) have been detected, then a determination or at least an inference may be made that a transfer of the computing device 10* between two users has occurred. Note that the above discussed tilt movements relates to the movement of the computing device 10* as it moves from a first tilt orientation to a second tilt orientation.

Thus, another aspect of tilt orientation changes that may be considered in order to determine or infer that a transfer has taken place is to simply look at the end points of the tilt reorientation and their differences. In other words, to analyze the first tilt orientation (e.g., the tilt orientation of the computing device 10* before the computing device 10* being reoriented) and the second tilt orientation (e.g., the end tilt orientation of the computing device 10* after it has been reoriented) with respect to each other, and the differences between the first tilt orientation and the second tilt orientation. Thus, in some embodiments, the computing device 10* may also or additionally maintain a catalogue or library of changes of tilt orientation (e.g., tilt orientation changes) that have been previously identified as tilt changes that occur when, for example, a computing device 10* is transferred between two users. Such catalogue or library of tilt orientation changes may be stored as part of a movement library 170 stored in memory 114 (see FIGS. 3a and 3b) of the computing device 10* of FIG. 1 (e.g., the computing device 10' of FIG. 3a or the computing device 10" of FIG. 3b). Therefore, when tilt orientation changes that match with catalogued or library tilt orientation changes (e.g., as stored in the movement library 170 of the memory 114) have been detected, then at least an inference may be made that a transfer of the computing device 10* between two users has occurred.

Figure 2C:
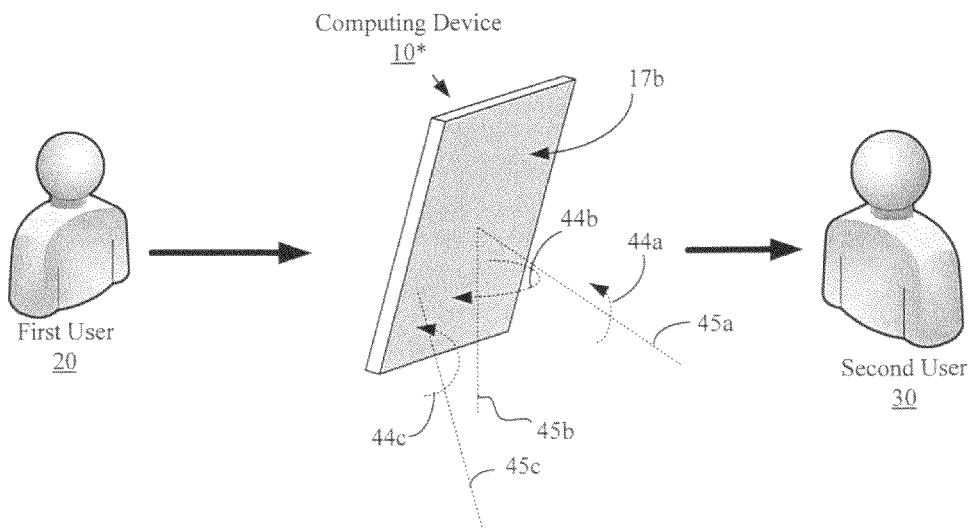
FIG. 2c shows another type of movement that may be detected/monitored by the computing device 10* of FIG. 1.

Referring now to FIG. 2c illustrating another type of movement of the computing device 10* that may be detected/monitored in order to determine or at least infer that the computing device 10* has been transferred between two users. In particular, FIG. 2c shows a couple types of spin rotation and spin rotation movements of the computing device 10* that may be detected/tracked using one or more sensors 120 (e.g., one or more movement sensors 302) in order to determine or infer that a transfer of the computing device 10* has occurred between at least two users. Note that this type of rotation (e.g., spin rotation) is different from the type of rotation associated with the previously described tilt movement where the "tilt" rotation involves the entire backside 17b of the computing device 10* rotating around some axis in a sweeping motion. In a spin rotation, the backside 17b (or the front side 17a) of the computing device 10* substantially spins around an axis without the sweeping motion.

Referring back to FIG. 2c, which shows some of the various types of spin rotations that may be detected/monitored by the computing device 10* in order to, for example, determine whether the computing device 10* has been transferred between two users such as, for example from a first user 20 to a second user 30 (or vice versa). Examples of the type of spin rotations that may be monitored include a spin rotation 44a of the computing device 10* that occurs when the computing device 10* is rotated around a center axis 45a that is centered and vertical to the backside 17b of the computing device 10*. Another type of rotation that may be monitored is a spin rotation 44b of the computing device 10* that occurs when the computing device 10* is rotated around a center axis 45b that may be centered but not vertical to the backside 17b of the computing device 10*. Instead, the center axis 45b is angular to the backside 17b of the computing device 10* such that when the computing device 10* is rotating around the center axis 45b, the computing device 10* will have a constant tilt with respect to the center axis 45b. Another type of rotation that may be monitored is spin rotation 44c of the computing device 10* that may occur when the computing device 10* is rotated around an axis 45c that may not be centered on the backside 17b of the computing device 10* and that may not be vertical to the backside 17b of the computing device 10*.

By detecting that the computing device 10* has been spin rotated in a particular manner, a determination or an inference may be made that the computing device 10* has been transferred from the first user 20 to the second user 30. In particular, when the first user 20 is, for example, handing off or transferring the computing device 10* to the second user 30, the first user 20 may spin rotate the computing device 10* in a particular way. Thus, when the computing device 10* is being transferred from, for example, the first user 20 to the second user 30, the computing device 10*(or rather the logic endowed with the computing device 10*) may track the movements of the computing device 10* as it moves from a first spin orientation (e.g., the orientation of the computing device 10* at the beginning of the transfer or when the first user 20 was using the computing device 10*) to a second spin orientation (e.g., the orientation of the computing device 10* at the end of the transfer or when the second user 30 has obtained possession of the computing device 10*).

Similar to the tilt or tilt movement detection/analysis described earlier, in order to make a determination or at least an inference that a transfer was made from, for example, the first user 20 to the second user 30 (or vice versa), the computing device 10* or at least the logic endowed in the computing device 10* may scrutinize the particular movements of the computing device 10* as the computing device 10* spin rotates from a first orientation to a second orientation. The computing device 10* may additionally or alternatively analyze the second orientation (e.g., the orientation of the computing device 10* after it has finished being spin rotated) at least with respect to the first orientation (e.g., the orientation of the computing device 10* before it was spin rotated) in order to determine or at least infer that the computing device 10* has been transferred.

To further determine or at least infer that the computing device 10* has been transferred from the first user 20 to the second user 30, the examination/analysis of the detected spin rotation of the computing device 10* from the first orientation to the second orientation may involve comparing the detected spin rotation movement of the computing device 10* with catalogued or library spin rotation movements that are identified as being associated with transfer of the computing device 10*. That is, the computing device 10* may maintain in its memory 114 (see FIGS. 3a and 3b) a movement library 170 that may include a catalogue or library of movements including signature spin rotation movements that when detected as occurring may infer that a transfer of the computing device 10* between two users has occurred.

Figure 2D:
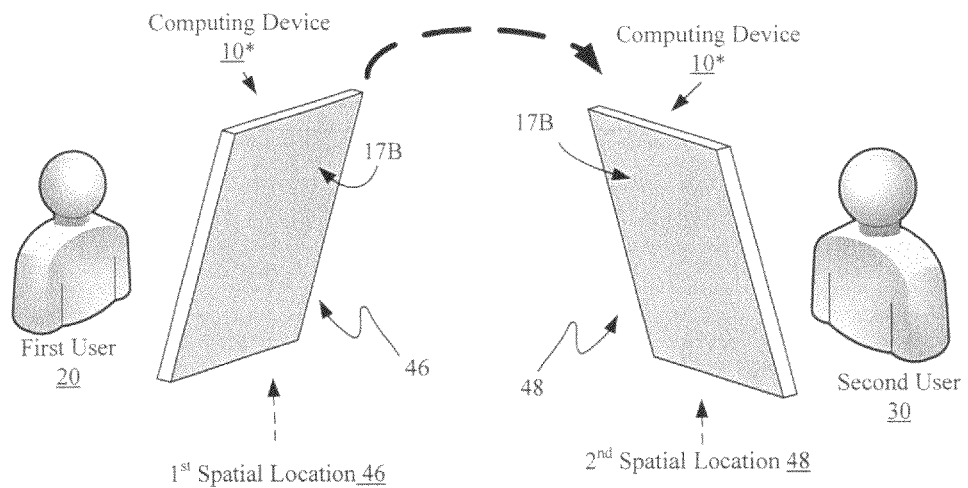
FIG. 2d shows another type of movement that may be detected/monitored by the computing device 10* of FIG. 1.
Figure 2E:
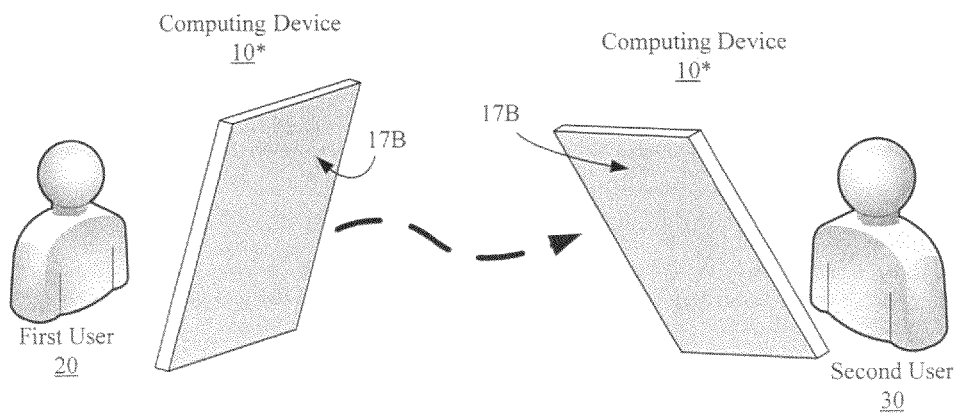
FIG. 2e shows overall 3-dimensional movements of the computing device 10* of FIG. 1 that may be detected/monitored by the computing device 10*.

Turning now to FIG. 2d illustrating yet another type of movement of the computing device 10* that may be detected/monitored in order to determine or infer that the computing device 10* has been transferred between two users. In particular, FIG. 2d shows the computing device 10* being relocated by moving from a first spatial location 46 to a second spatial location 48 when the computing device 10* is transferred between two users such as from a first user 20 to a second user 30 (or vice versa). In various embodiments, such movements from the first spatial location 46 to the second spatial location 48, which will be referred to herein as "spatial relocation movements," may be detected using one or more sensors 120 (e.g., one or more movement sensors 302). In order to make a determination or inference that a transfer was made from the first user 20 to the second user 30, the computing device 10* or at least the logic endowed in the computing device 10* may examine/analyze the particular spatial relocation movements of the computing device 10* as it moves from the first spatial location 46 to the second spatial location 48, and to compare the pattern of spatial relocation movements (e.g., path, speed, acceleration, and so forth) with those catalogued or library signature spatial movements stored in a movement library 170 that when detected as occurring at least infers that the computing device 10* has been transferred between at least two users (e.g., between a first user 20 and a second user 30).

In some cases, the computing device 10*(or rather the logic endowed with the computing device 10*) may additionally or alternatively analyze the second spatial location 48 with respect to the first spatial location 46 in order to determine or at least infer that the computing device 10\* has been transferred from the first user 20 to the second user 30. To further determine or at least infer that the computing device 10\* has been transferred from, for example, the first user 20 to the second user 30, the examination/analysis of the detected spatial relocation movements of the computing device 10\* may be compared with catalogued or library signature spatial relocation movements that have been identified as being associated with the transfer of the computing device 10 between two users. That is, the computing device 10\* may maintain in its memory 114 (see FIGS. 3*a* and 3*b*) a movement library 170 that may include a catalogue or library of movements including signature spatial movements that when detected as occurring may at least infer that a transfer of the computing device 10\* between two users has occurred.

In some embodiments, in order to determine or at least infer that the computing device 10\* has been transferred from the first user 20 to the second user 30 (or vice versa), the computing device 10\* may be endowed with logic that detects/monitors vibrations. That is, each user who may come in contact with the computing device 10\* may pass on to the computing device 10\* unique vibration pattern or signature (e.g., as a result of the heartbeat of the "touching" user). Thus, when the first user 20 is holding the computing device 10\*, the computing device 10\* may vibrate in a particular vibration pattern that is associated with the first user 20. In contrast, when the computing device 10\* has been transferred to the second user 30 and the second user 30 is holding the computing device 10\*, the computing device 10\* may vibrate in a manner that is associated with the second user 30. Therefore, one way to determine whether the computing device 10\* has been transferred from the first user 20 to the second user 30 (or vice versa) is to detect/monitor at least changes in vibrations exhibited by the computing device 10\*.

In some cases, this may involve the computing device 10\* (or at least the logic endowed with the computing device 10\*) initially detecting the particular vibration pattern of the computing device 10\* when the computing device 10\* is being held by, for example, the first user 20, and to detect when the computing device 10\* no longer vibrates in such a manner. In order to determine whether the computing device 10\* has been transferred from the first user 20 to the second user 30, the computing device 10\* in some cases may be further designed to determine that the computing device 10\* is vibrating in a way that matches with a vibration pattern (e.g., signature vibration pattern) of the second user 30. By making such a determination, an inference may be made that the computing device 10\* is being held or is in contact with the second user 30.

In some embodiments, the computing device 10\* may include logic that is designed to determine whether the computing device 10\* has moved away from the first user 20 in order to determine whether, for example, the computing device 10\* has been transferred from the first user 20 to the second user 30. That is, by making such a determination, at least an inference may be made that the computing device 10\* has been transferred from the first user 20 to the second user 30. In some embodiments, in order to make such a determination, data from a combination of sensors 120 may be processed and analyzed. That is, in order to determine whether the computing device 10 has moved away from, for example, the first user 20, a combination of one or more movement sensors 302 (see FIG. 3*f*) for directly detecting movements of the computing device 10\*, one or more image capturing devices 304 (e.g., webcam or digital camera), and/or one or more audio capturing devices 306 (e.g., microphones) may be employed in order to determine whether the computing device 10\* is moving away from the first user 20 (and thus, an inference that the computing device 10\* has been transferred to the second user 30).

For example, the computing device 10\* in some cases may employ one or more movement sensors 302 to detect the actual movements of the computing device 10\* and one or more image capturing devices 304 (along with facial recognition system/application) to determine that a face associated with the first user 20 is moving away from the computing device 10\* and/or to detect gestures made or exhibited by the first user 20 (e.g., such as the first user extending his/her arm out as to offer the computing device 20 to another user) that at least infers that the computing device 10\* is moving away from the first user 20. Based on the data provided by both the movement sensors 302 and the image capturing devices 304, at least an inference may be made that the computing device 10\* has moved away from the first user 20\*.

In some embodiments, and as illustrated in FIG. 2*e*, rather than only detecting/monitoring for a particular type of movement (e.g., tilt-type movements, spin rotation movements, spatial relocation movements, vibration movements, and so forth) the computing device 10\* may be endowed with logic that is designed to detect/monitor/track the overall three-dimensional movements of the computing device 10\* and to determine whether the computing device 10\* has moved in a particular three-dimensional way that at least infers that the computing device 10\* has been transferred from the first user 20 to the second user 30. In order to accomplish this, the computing device 10\* may maintain in its memory 114 (see FIGS. 3*a* and 3*b*) a movement library 170 that may include a catalogue or library of movements including signature three-dimensional movements that when detected as occurring may infer at least that a transfer of the computing device 10\* between two users has occurred.

As described briefly above, in addition to directly detecting the movements of the computing device 10\* using movement sensors 302 (e.g., inertia sensors, accelerometers, gyroscopes, and so forth), other types of environmental aspects may be detected/monitored in order to determine whether the computing device 10\* has been transferred from a first user 20 to a second user 30. For instance, in some cases, the computing device 10\* or the logic endowed with the computing device 10\* may be designed to detect, using one or more image capturing devices 304, certain visual cues that when detected at least infers the transfer of the computing device 10\* from a first user 20 to a second user 30. For example, in some embodiments, the computing device 10\* may be endowed with certain logic that is able to detect certain visual cues, such as gestures made by a first user 20 that when visually detected as occurring at least infers that the computing device 10\* has been transferred from the first user 20 to another user. In the same or alternative embodiments, the computing device 10\* may additionally or alternatively be endowed with logic that at least detects, via one or more image capturing devices 304, changes in lighting in the proximate vicinity of the computing device 10\*. That is, generally when an object is moved from one spatial location to another spatial location, as in the case of a computing device 10\* being transferred between two users, the object will be exposed to changes in lighting conditions. Thus, by merely detecting changes in lighting conditions of the computing device 10\*, at least an inference may be made that the computing device 10\* is being transferred between users.

Alternatively or additionally, in some embodiments, the computing device 10\* may be endowed with a facial recognition system (e.g., facial recognition software or application) that when employed with one or more image capturing devices 304 may be used in order to determine the presence or absence of a face associated with the first user 20 or the second user 30 within the proximate vicinity of the computing device 10*. If the face associated with the first user 20 is not detected in the proximate vicinity of the computing device 10* and/or if a face not associated with the first user 20 is detected in the proximate vicinity of the computing device 10*, such as the face of the second user 30, then a determination or at least an inference may be made by the computing device 10* or by the endowed logic of the computing device 10* that a transfer of the computing device 10* from the first user 20 to the second user 30 may have occurred. The phrase "proximate vicinity" as used here is in reference to the immediate area surrounding the computing device 10* such as within a distance from the computing device 10* from which an object or a person is visually (or audibly) discernable or identifiable by the computing device 10* using, for example, a facial recognition system (or a voice verification/recognition system). Depending on sensitivity of the various systems, this may mean the immediate area around the computing device 10* that is within three feet, within five feet, within six feet, and so forth, of the computing device 10*.

In some cases, an inference that the computing device 10* has been transferred from, for example, the first user 20 to the second user 30 will not be made at least until the computing device 10* (or the logic endowed with the computing device 10*) determines that the face of a person other than the first user 20 is detected as being in the proximate vicinity of the computing device 10* and is detected as being located at one or more specified locations relative to the specific orientation of the computing device 10*. For example, in some cases, the inference that the computing device 10* has been transferred from, for example, the first user 20 to the second user 30 will not be made at least until it is determined that the face of the second user 30 is determined to be in the proximate vicinity of the computing device 10* and is detected as being at or near the center axis 18a of the display side (e.g., front side 17a) of the computing device 10*. Note that since the computing device 10* may be endowed with multiple sensors 120 (e.g., image capturing devices 304 and/or audio capturing devices 306) located on both the front side 17a as well as the backside 17b of the computing device 10*, it may be possible to detect the presence of a person or a face of the person on either side of the computing device 10*.

Another type of visual cues that the computing device 10* or the endowed logic of the computing device 10* may look for in order to determine whether the computing device 10* has been transferred from, for example, a first user 20 to a second user 30 is the presence or absence of one or more eyes (e.g., irises or retinas) in the proximate vicinity of the computing device 10* that are determined to be associated with the first user 20 or the second user 30. In particular, if the eyes of the first user 20 is determined not to be at least in the field of view of an image capturing device 304 (e.g., an image capturing device 304 that employs the viewing port 16 disposed on the front side 17a) of the computing device 10* and/or if one or more eyes of another person (e.g., second user 30) other than the first user 20 is determined to be in the field of view of the image capturing device 304, then at least an inference may be made that the computing device 10* has been transferred from the first user 20 to the second user 30.

In some cases, an inference that the computing device 10* has been transferred from for example, the first user 20 to the second user 30 (or vice versa) will not be made until the computing device 10 (or at least the logic endowed with the computing device 10*) determines that the eye of a person other than the first user 20 is detected in the proximate vicinity of the computing device 10* and is detected as being located at one or more specified locations (e.g., near or along the center axis 18a of the front side 17a) relative to the specific orientation of the computing device 10*. In other words, the inference or determination that the computing device 10* has been transferred from the first user 20 to the second user 30, for example, will not be made at least until it is determined that the eye or eyes of the second user 30 is determined to be in the proximate vicinity of the computing device 10* and is detected as being at one or more specified locations on the display side (e.g., the front side 17a) of the computing device 10*.

In various embodiments, the computing device 10* or at least the logic that may be endowed with the computing device 10* may be designed to detect and/or track absence or presence of one or more audio cues in the proximate vicinity of the computing device 10* in order to determine or at least infer as to whether the computing device 10* has been transferred from, for example, a first user 20 to a second user 30 (or vice versa). For example, in some embodiments, the computing device 10* may be endowed with voice verification system or application that may be designed to detect, via one or more audio capturing devices 306 (e.g., one or more microphones), a voice in the proximate vicinity of the computing device 10* having a voice pattern that may be different from the signature voice pattern of the first user 20. By making such a determination and/or by detecting absence for at least a predefined period of time of a voice pattern associated with the first user 20 in the proximate vicinity of the computing device 10*, an inference may be made that the computing device 10* has been transferred from, for example, the first user 20. In some embodiments, an inference may be made that the computing device 10* has been transferred from, for example, the first user 20 to the second user 30 when a voice pattern belonging to a person other than the first user 20 is detected in the proximate vicinity of the computing device 10* and is detected being originating from a point on the display side (e.g., the front side 17a) of the computing device 10*.

In some embodiments, the computing device 10* or at least the logic endowed with the computing device 10* may be designed to determine the transfer of the computing device 10* from the first user 20 to the second user 30 based on combination of one or more detected movements of the computing device 10*, one or more detected visual cues, and/or one or more detected audio cues. That is, since in many situations, a particular type of data or measurement (e.g., detected movements of the computing device 10* or detected visual cues in the proximate vicinity of the computing device 10*) may not reliably or conclusively indicate that the transfer of the computing device 10* from the first user 20 to the second user 30 has occurred, in various embodiments, the computing device 10* may make the determination as to whether the computing device 10* has been transferred based on different types of measurements (e.g., movements of the computing device 10*, visual cues, and/or audio cues).

As described earlier, in response to determining that the computing device 10* has been transferred from the first user 20 to the second user 30, the computing device 10* or at least the logic that may be endowed with the computing device 10* may selectively highlight one or more selective portions of the item that was being presented by the computing device 10* prior to the transfer of the computing device 10* from the first user 20 to the second user 30. In some cases, the one or more portions to be highlighted may be based, at least in part, to a selection made by a user, such as the first user 20, as to which portion or portions of the item are to be highlighted. Alternatively or additionally the selection of which portion or portions to be highlighted may be based on determining which portion or portions are associated with the second user 30. In order to make such a determination, the computing device 10* or its endowed logic may be designed to identify the second user 30 based on, for example, biometric data collected using one or more sensors 120. These concepts will be described in greater detail herein.

Figure 7A:
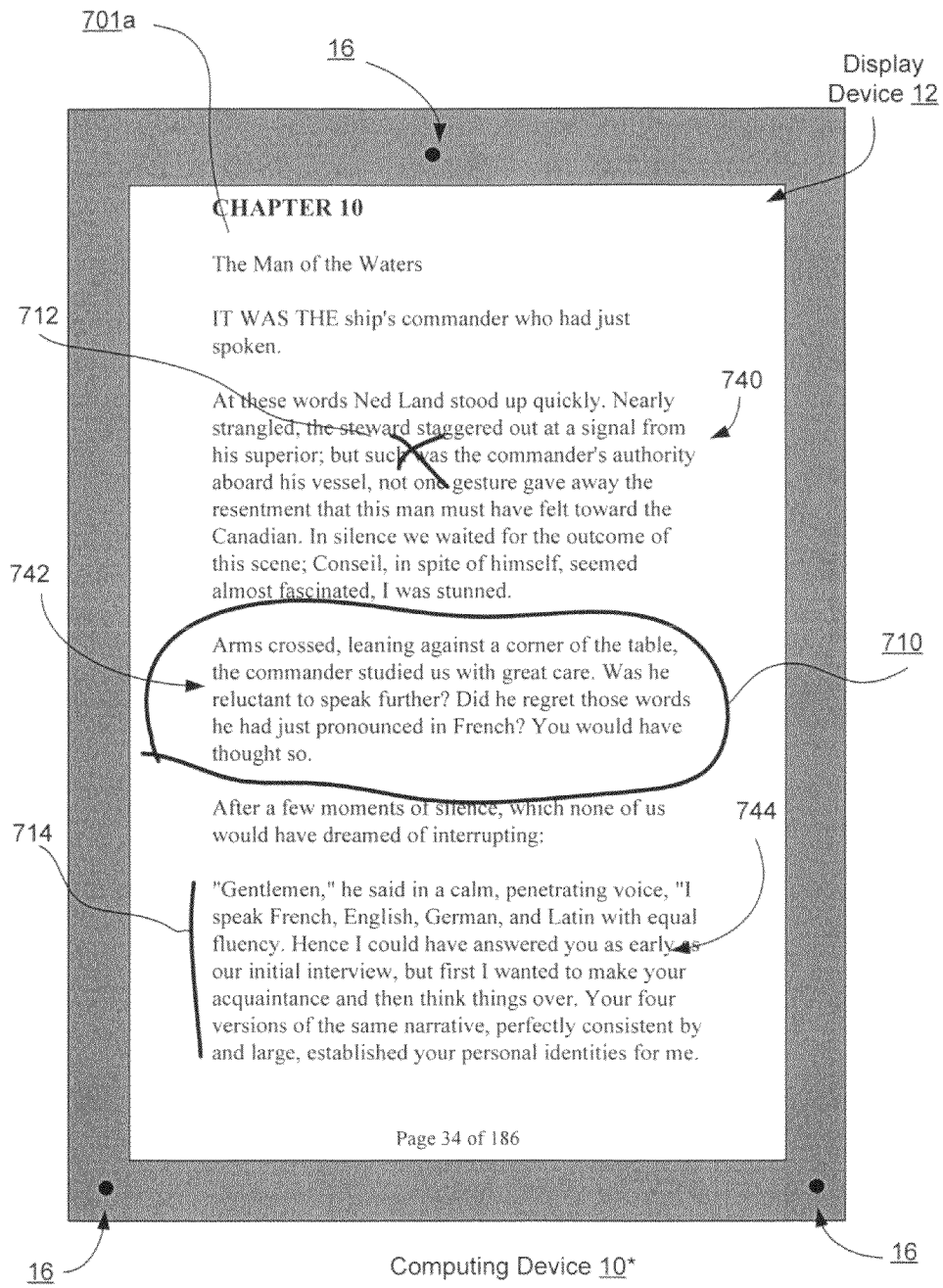
FIG. 7a illustrates an example item 701a being displayed by the computing device 10* of FIG. 1 and various paragraphs of the exemplary item 701a being designated for highlighting in accordance with some implementations.

Referring now to FIG. 7a illustrating various ways that selective portions of an example item 701a that is being presented through the display device 12 (e.g., a touch screen) of the computing device 10* may be selected by a user for highlighting. In this example illustration, the item 701a being presented is an electronic or digital book. In particular, FIG. 7a shows a page from the electronic book that is made up of several paragraphs, and three of the paragraphs 740, 742, and 744 are selected for highlighting using three different approaches. For purposes of this illustration, each paragraph 740, 742, and 744 that is presented through the display device 12 represents a portion of the example item 701a that may or may not need to be highlighted. In various embodiments, the user may not need to select a portion (e.g., a paragraph) of the item 701a entirely (e.g., select or tag an entire paragraph such as paragraph 740) in order to have the entire portion of the item 701a highlighted. Instead, the user may merely select (e.g., tag or mark) only part of the portion of the item 701a in order to have the entire portion highlighted. For example, in some embodiments, an entire paragraph 740 may be selected for highlighting when a user writes (e.g., write via a touch screen or via a mouse) an "x" on part of the paragraph 740 (e.g., a portion of the example item 701a) that the user wishes to highlight. In some embodiments, a user may also designate an entire paragraph 742 for highlighting by drawing an encircling line 710 around the paragraph 742. In the same or different embodiments, a user may select a paragraph 744 (e.g., a portion of the item 701a) for highlighting by drawing a line 714 along the side of the paragraph 744. In still other cases, in order to select a portion (e.g., paragraphs 740, 742, or 744 of FIG. 7a) of an item 701a for highlighting, a user may simply have to click (if there is a mouse available) or tap (if a touch screen is being used to view the item 701a) on a part of the portion of the item 701a to be highlighted.

Figure 7B:
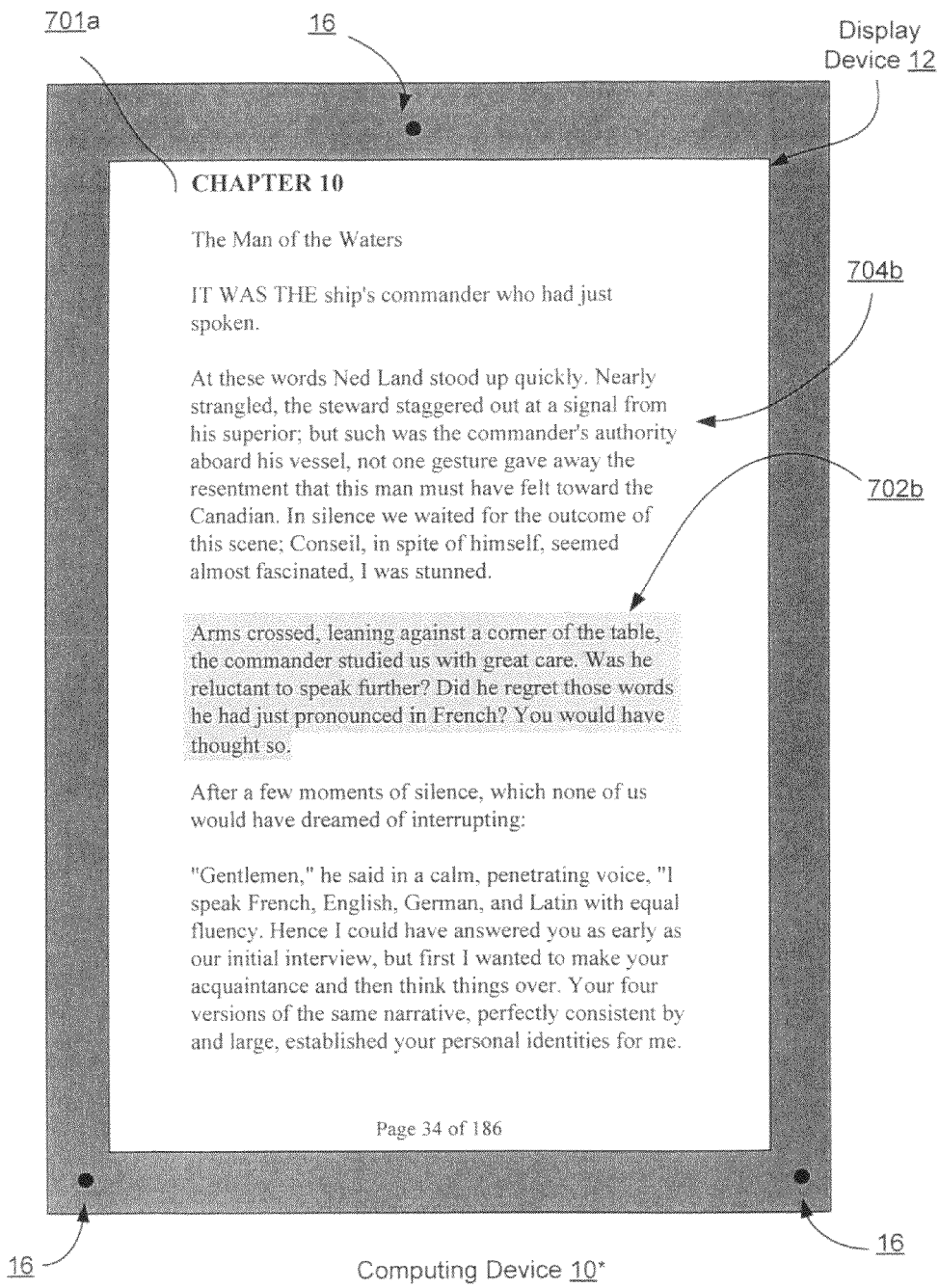
FIG. 7b illustrates an example highlighted portion 702b of the example item 701a of FIG. 7a being highlighted in a particular way in accordance with some implementations.
Figure 7C:
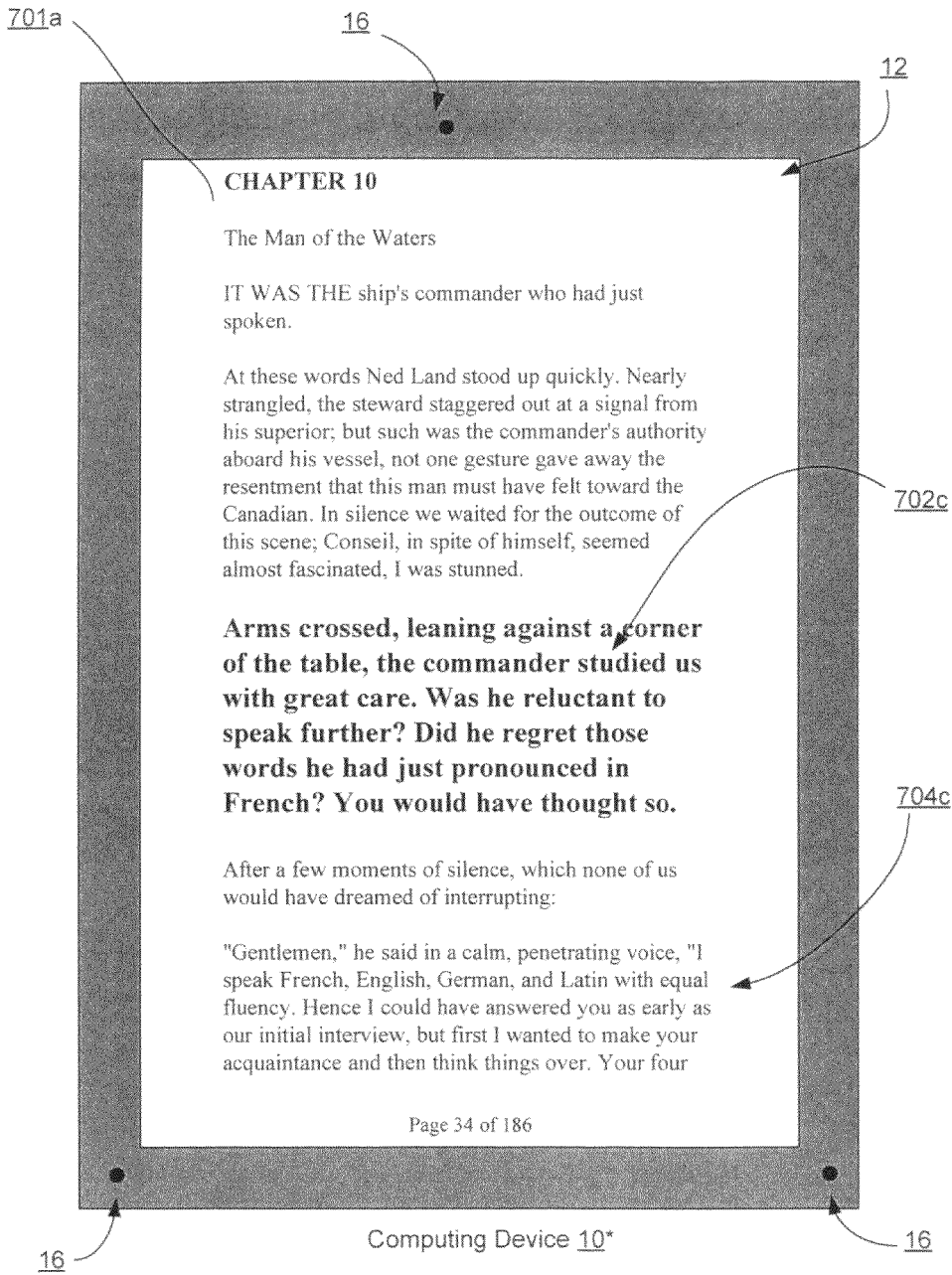
FIG. 7c illustrates another example highlighted portion 702c of the example item 701a of FIG. 7a being highlighted in another particular way in accordance with some implementations.
Figure 7D:
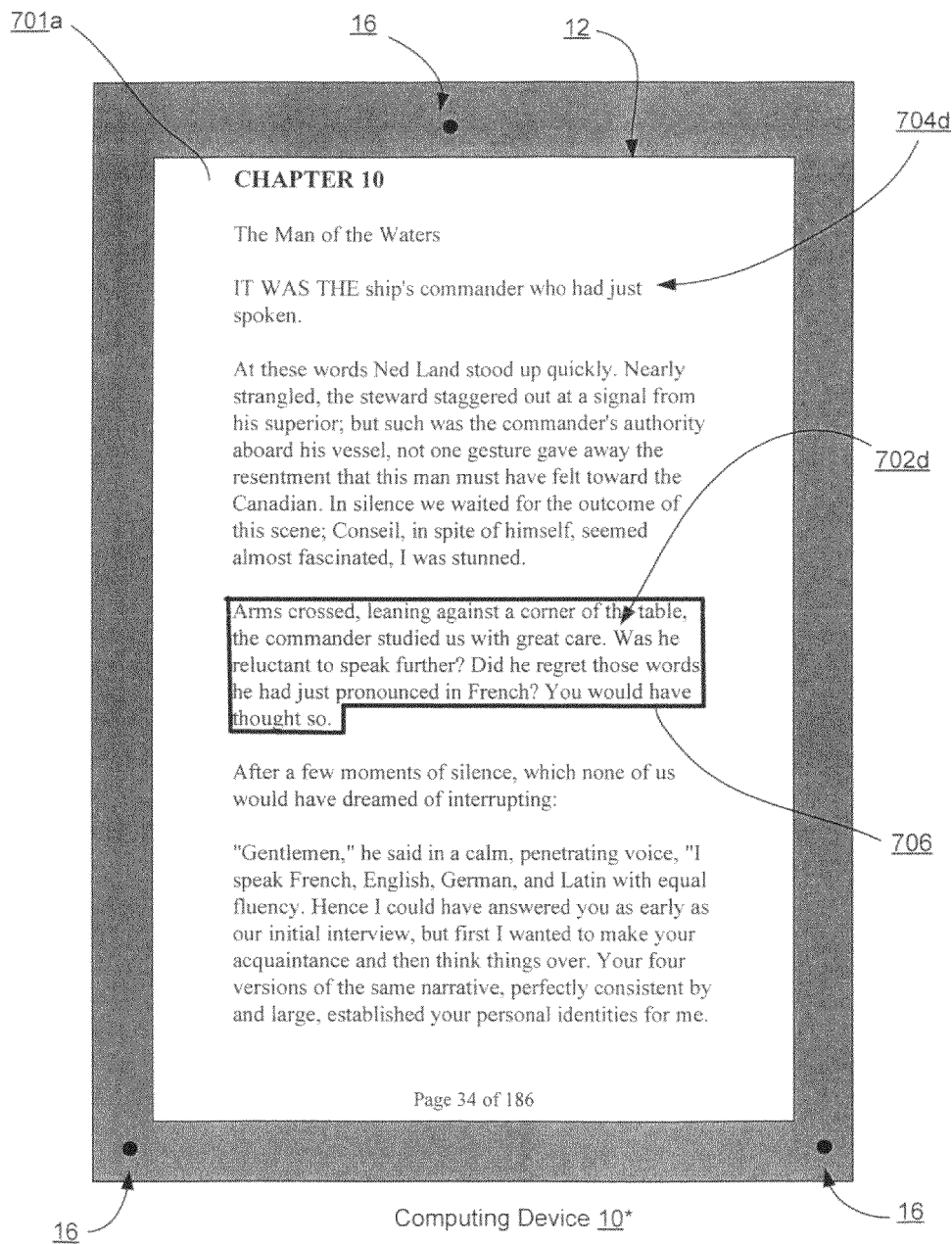
FIG. 7d illustrates another example highlighted portion 702d of the example item 701a of FIG. 7a being highlighted in yet another particular way in accordance with some implementations.

Referring now to FIGS. 7b, 7c and 7d, which illustrates some of the ways in which portions of an example item 701a may be highlighted. Referring particularly now to FIG. 7b, which illustrates a highlighted portion 702b (which corresponds to paragraph 742 of FIG. 7a) of the example item 701a of FIG. 7a being highlighted in a particular way. In this example, the highlighted portion 702b being highlighted by having a different background color from background color of the unhighlighted portions 704b of the example item 701a.

Turning now to FIG. 7c illustrating another highlighted portion 702c (which again corresponds to paragraph 742 of FIG. 7a) of the example item 701a of FIG. 7a being highlighted in another way. In this example, the highlighted portion 702c being highlighted by having text that has a font style (e.g., bigger font and bolded) that is different from the font style of the text included in the unhighlighted portions 704c of the example item 701a.

FIG. 7d illustrates yet another highlighted portion 702d (which again corresponds to paragraph 742 of FIG. 7a) of the example item 701a of FIG. 7a being highlighted in yet another way. In this example, the highlighted portion 702d being highlighted by being encircled by a border, in this an encircling line 706.

Figure 7E:
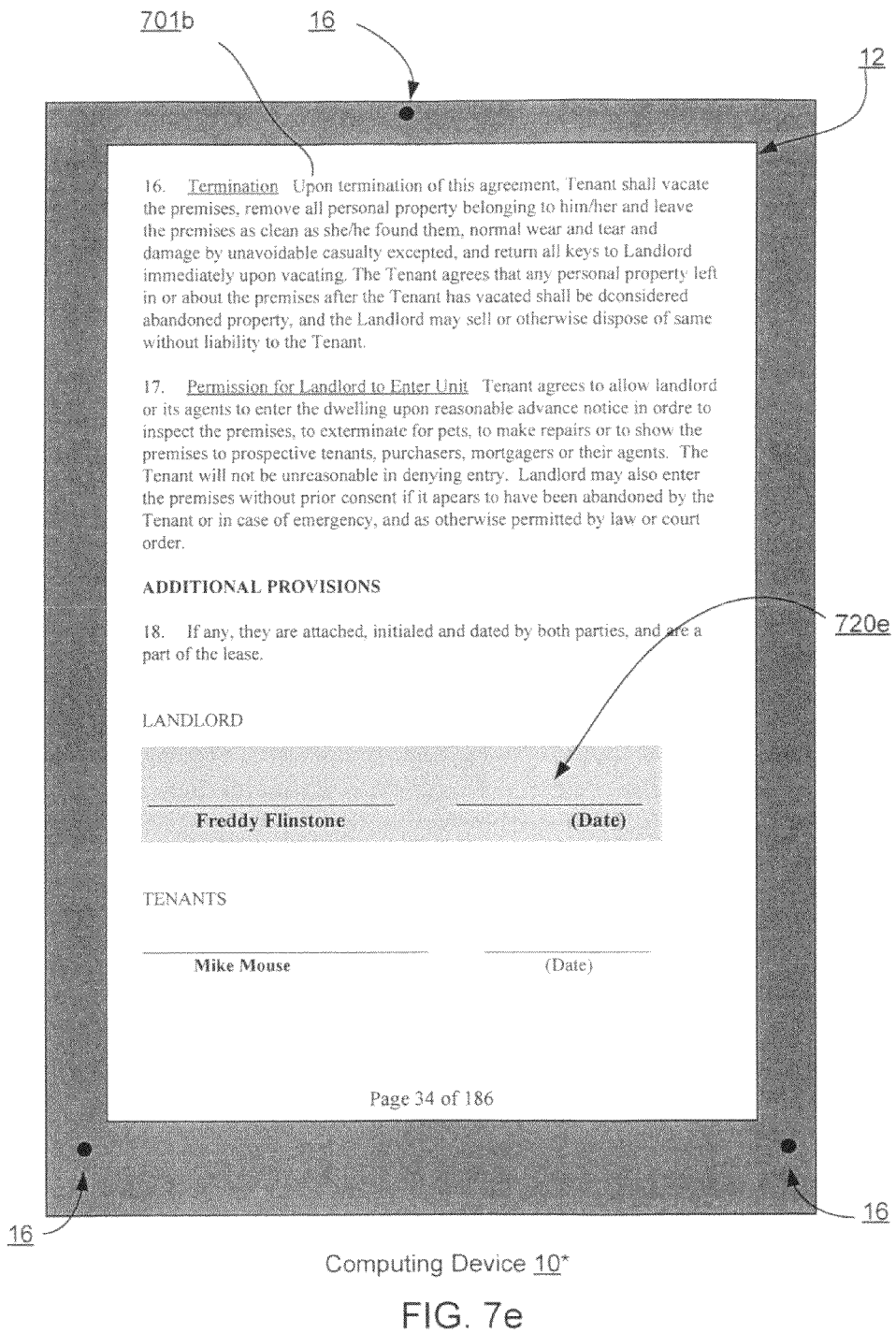
FIG. 7e illustrates an example portion 720e of another example item 701b being highlighted in accordance with some implementations.
Figure 7F:
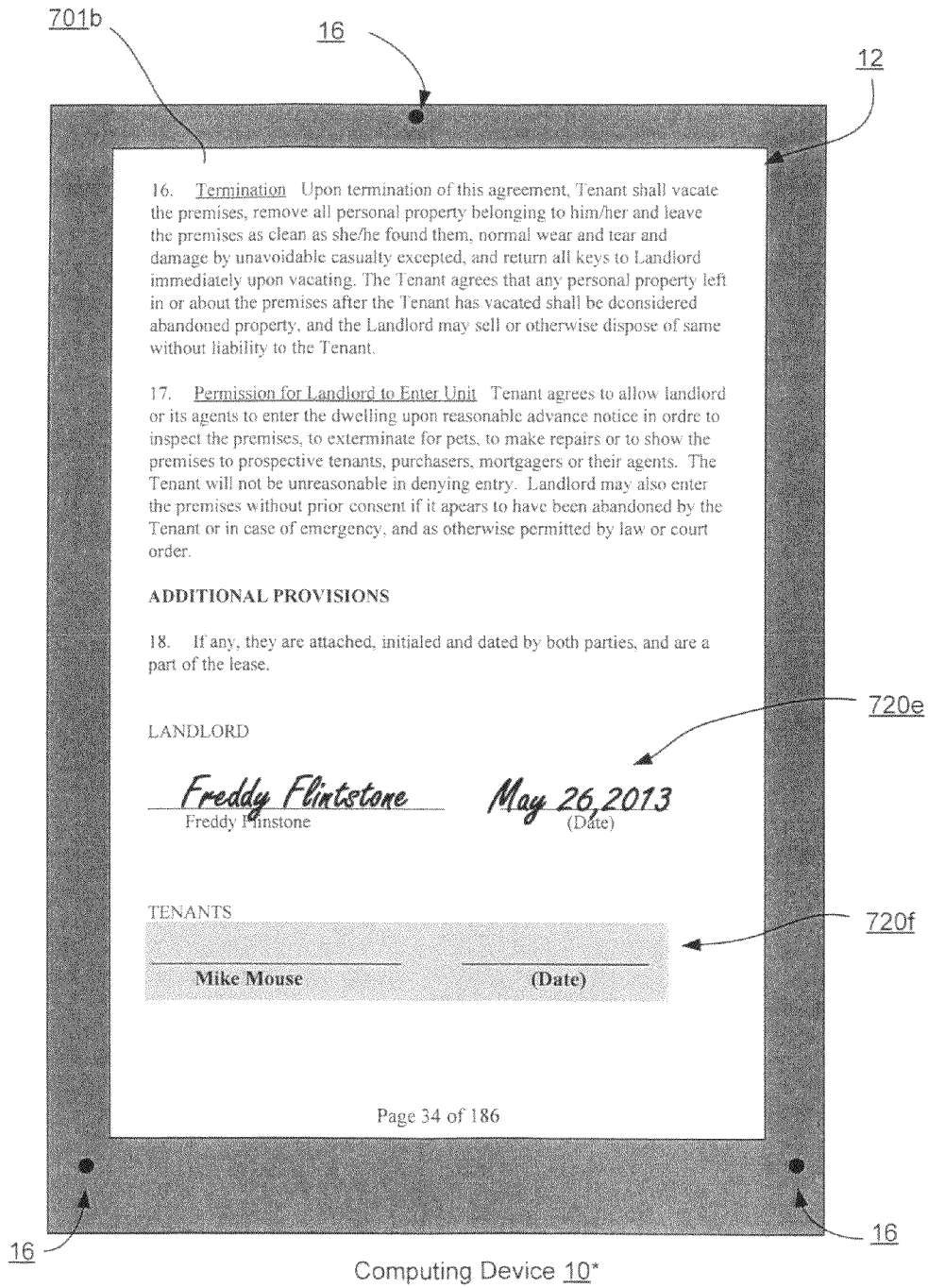
FIG. 7f illustrates another example portion 720f of the example item 701b of FIG. 7e being alternatively highlighted in accordance with some implementations.

FIGS. 7e and 7f illustrates how different portions of an example item 701b may be highlighted based on the determination that the computing device 10* has been transferred from the first user 20 to the second user 30 and in response to ascertaining which portion of the item is associated with which user (e.g., which portions being associated with the first user 20 and which portions being associated with the second user 30). Referring particularly now to FIG. 7e, which shows the computing device 10* displaying an example item 701b, which in this case is an electronic contract between Freddy Flinstone and Mike Mouse. Assume for purposes of this example that both Freddy and Mike are in the immediate vicinity of the computing device 10* ready to sign the item 701b (e.g., contract). Assume further that Freddy initially has control over the computing device 10* (e.g. Freddy may have possession of the computing device 10* by holding or being in contact with the computing device 10* or by being situated next to and on the front-side 17a of the computing device 10*).

In response to a determination that the computing device 10* is in the control of or is being possessed by Freddy (e.g., first user 20), which could be based on detected biometric characteristics (e.g., face, eye, voice, movement, etc.) of Freddy in the proximate vicinity of the computing device 10*, only portion 720e of the example item 701b may be highlighted. That is, the computing device 10* may be endowed with logic that is able to automatically identify Freddy using, for example, sensors 120 that detect biometric characteristics of Freddy, and based on the identification as well as determining that Freddy has control (possession) of the computing device 10* and determining which portions of the item 701b are associated with Freddy (or his identity), the appropriate portion or portions of the item 701b may be highlighted.

After Freddy (e.g., first user 20) has signed the item 701b (e.g., electronic contract) at the portion 720e of the item 701b that has been highlighted, Freddy may then transfer or hand-off the computing device 10* to Mike Mouse (e.g., second user 30) so that Mike can sign the example item 701b. Turning now to FIG. 7f, the computing device 10*, upon detecting that the computing device 10* has been transferred to Mike Mouse, and upon identifying Mike (e.g., identifying based on biometric characteristics exhibited by Mike) and ascertaining that portion 720f of item 701b is associated with Mike Mouse (or his identity), may alternatively highlight portion 720f while unhighlighting portion 720e of the item 701b that was previously highlighted before the transfer of the computing device 10* when Freddy still had possession of the computing device 10*. Thus, in this example illustrated by FIGS. 7e and 7f, different portions 720e and 720f of an item 701b may be highlighted based on their association with different users and based on ascertaining who has, for example, obtained possession of the computing device 10*.

Referring now to FIGS. 3a and 3b, FIGS. 3a and 3b are two block diagrams representing two different implementations of the computing device 10* of FIG. 1 illustrated in FIG. 3a as computing device 10' and in FIG. 3b as computing device 10". In particular, and as will be further described herein, FIG. 3a illustrates a computing device 10' that is the "hardwired" or "hard" implementation of the computing device 10* of FIG. 1 in which certain logic modules including a transfer determining module 102', a highlighted portion presenting module 104', and a highlighting selection detecting module 106' are implemented using purely hardware or circuitry components (e.g., application specific integrated circuit or ASIC). In contrast, FIG. 3b illustrates a computing device 10" that is the "soft" implementation of the computing device 10* of FIG. 1 in which certain logic modules including a transfer determining module 102", a highlighted portion presenting module 104", and a highlighting selection detecting module 106" are implemented using electronic circuitry such as one or more processors (e.g., microprocessors, controllers, etc.) executing one or more programming instructions (e.g., software).

Note that the embodiments of the computing device 10* illustrated in FIGS. 3a and 3b are two extreme or opposite versions/implementations of the computing device 10* of FIG. 1 in which certain logic modules (e.g., the transfer determining module 102*, the highlighted portion presenting module 104*, and the highlighting selection detecting module 106*) are implemented using purely "hardware solutions" (e.g., implemented using circuitry such as ASIC) as illustrated in FIG. 3a, or using purely "software solutions" (e.g., implemented using software executed by hardware such as one or more processors 116) as illustrated in FIG. 3b. That is, those of ordinary skill in the art will recognize that the computing device 10* or at least the logic modules (e.g., the transfer determining module 102*, the highlighted portion presenting module 104*, and the highlighting selection detecting module 106*) illustrated in FIGS. 3a, 3b, 3c, and 3d may be implemented using essentially any combination of hardware and software solutions. Since, there are many ways of combining hardware, software, and/or firmware in order to implement the various logic modules (e.g., the transfer determining module 102*, the highlighted portion presenting module 104*, and the highlighting selection detecting module 106*), only the two extreme implementations (e.g., the purely hardware solution as illustrated in FIG. 3a and the software solution of FIG. 3b) are illustrated here. It should be noted here that with respect to the "soft" implementation illustrated in FIG. 3b, hardware in the form of circuitry such as one or more processors 116 are still needed in order to execute the software. Further details related to the two implementations of computing device 10* illustrated in FIGS. 3a and 3b will be provided in greater detail below.

Referring particularly now to FIG. 3a, which illustrates a computing device 10' that includes a transfer determining module 102', a highlighted portion presenting module 104', a highlighting selection detecting module 106', a memory that may store one or more applications 160 (e.g., an operating system (OS) 162, one or more productivity applications 164 such as a word processing application and/or spreadsheet application, one or more communication applications 166 such as an email or text messaging application, one or more personal information manager applications 168 such as Microsoft Outlook, one or more facial recognition applications 180, one or more voice recognition applications 182, one or more retinal scanning applications 184, and/or other applications including gaming applications) and/or a movement library 170, one or more processors 116 (e.g., microprocessors, controllers, etc.), one or more sensors 120, user interface 110 (e.g., a display monitor such as a touchscreen, a keypad, a mouse, a microphone, a speaker, a camera, etc.), and a network interface 112 (e.g., network interface card or NIC).

In various embodiments, the transfer determining module 102' of FIG. 3a is a logic module that is designed to determine that the computing device 10* has been transferred from the first user 20 to a second user 30. The highlighted portion presenting module 104' is a logic module that is designed to present one or more highlighted portions 702* of an item 701*, the item 701* having been presented by the computing device 10* when the computing device 10* was being transferred from the first user 20 to the second user 30, and the one or more highlighted portions 702* being highlighted in response, at least in part, to determining by the transfer determining module 102* that the computing device 10* has been transferred from the first user 20 to the second user 30. In contrast, the highlighting selection detecting module 106' is a logic module that is designed to, among other things, detect selection or designation by a user of one or more portions of an item 701* for highlighting. For this particular embodiment of the computing device 10* of FIGS. 1, 2a, 2b, 2c, 2d, and 2e, the three logic modules (e.g., the transfer determining module 102', the highlighted portion presenting module 104', and the highlighting selection detecting module 106') are implemented using purely circuitry components such as application specific integrated circuit or ASIC. Thus, and as indicated before, the computing device 10' illustrated in FIG. 3a may be referred to as the "hardwired" version or embodiment of the computing device 10* of FIGS. 1, 2a, 2b, 2c, 2d, and 2e (as well as FIGS. 7a to 7f).

Turning now to FIG. 3b, which illustrates a "soft" version or embodiment of the computing device 10* of FIGS. 1, 2a, 2b, 2c, 2d, 2e, 7a, 7b, 7c, 7d, 7e, and 7f. In particular, FIG. 3b shows a computing device 10" that has components similar or the same as the components of the computing device 10' of FIG. 3a. That is, computing device 10", similar to computing device 10' of FIG. 3a, may comprise of a memory 114 (storing one or more applications 160 and/or a movement library 170), one or more processors 116, one or more sensors 120, user interface 110, and/or a network interface 112. And similar to the computing device 10' of FIG. 3a, the computing device 10" of FIG. 3b may include logic modules including a transfer determining module 102", a highlighted portion presenting module 104", and a highlighting selection detecting module 106" that correspond to and mirror the transfer determining module 102', the highlighted portion presenting module 104', and the highlighting selection detecting module 106' of the computing device 10' of FIG. 3a. However, unlike the logic modules (e.g., the transfer determining module 102', the highlighted portion presenting module 104', and the highlighting selection detecting module 106') of the computing device 10' of FIG. 3a, the logic modules (e.g., the transfer determining module 102", the highlighted portion presenting module 104", and the highlighting selection detecting module 106") of the computing device 10" of FIG. 3b are implemented by the one or more processors 116 executing computer readable instructions 152 (e.g., software and/or firmware) that may be stored in the memory 114.

Note that although FIG. 3a illustrates all of the logic modules (e.g., the transfer determining module 102', the highlighted portion presenting module 104', and the highlighting selection detecting module 106') being implemented using purely circuitry components such as ASIC, and although FIG. 3b illustrates all of the logic modules (e.g., the transfer determining module 102", the highlighted portion presenting module 104", and the highlighting selection detecting module 106") being implemented using one or more processors 116 executing computer readable instructions 152, in other embodiments, these logic modules may be implemented using a combination of specifically designed circuitry such as ASIC and one or more processors 116 (or other types of circuitry such as field programmable gate arrays or FPGAs) executing computer readable instructions 152. For example, in some embodiments, at least one of the logic modules may be implemented using specially designed circuitry (e.g., ASIC) while a second logic module may be implemented using a processor 116 (or other types of programmable circuitry such as FPGA) executing computer readable instructions 152 (e.g., software and/or firmware).

In various embodiments, the memory 114 of the computing device 10' of FIG. 3a and the computing device 10" of FIG. 3b may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices.

Figure 3C:
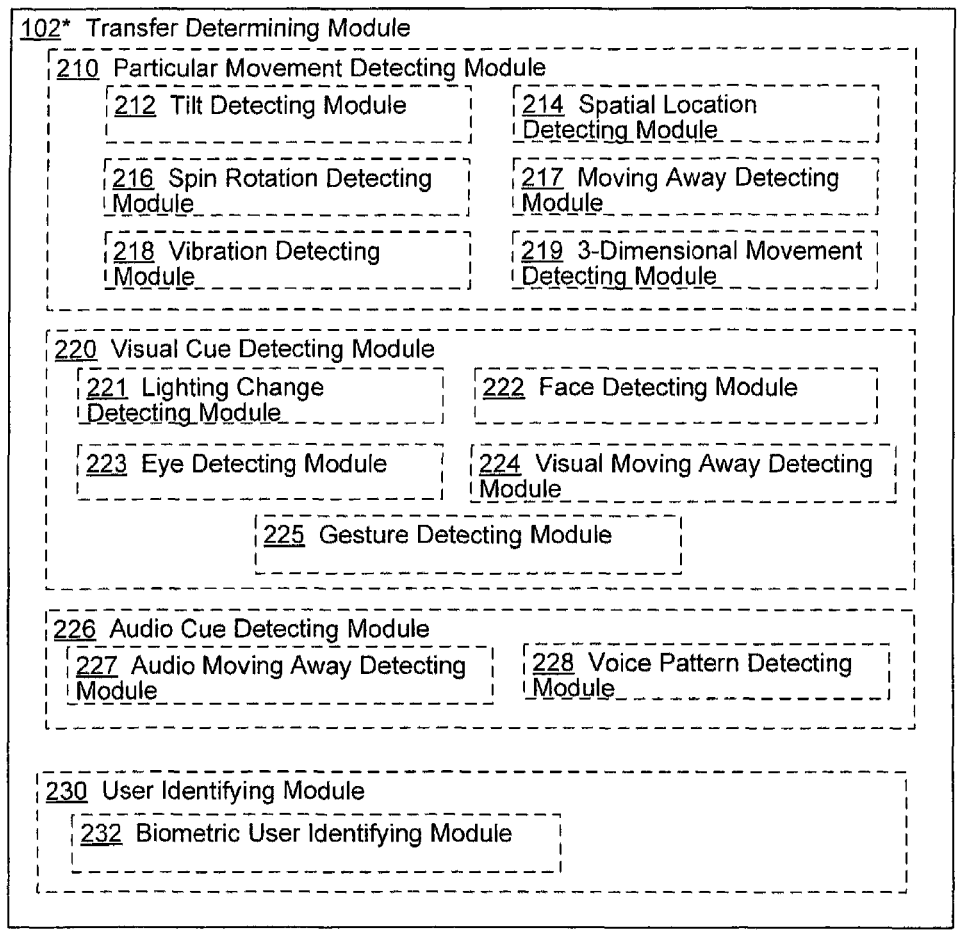
FIG. 3c shows another perspective of the transfer determining module 102* (e.g., the transfer determining module 102' and the transfer determining module 102") of FIGS. 3a and 3b.

Turning now to FIG. 3c illustrating a particular implementation of the transfer determining module 102* (e.g., the transfer determining module 102' or the transfer determining module 102") of FIGS. 3a and 3b. As illustrated, the transfer determining module 102* may include one or more sub-logic modules in various alternative implementations. For example, in various implementations, the transfer determining module 102* may include a particular movement detecting module 210 (which may further include a tilt detecting module 212, a spatial location detecting module 214, a spin rotation detecting module 216, a moving away detecting module 217, a vibration detecting module 218, and/or a three-dimensional movement detecting module 219), a visual cue detecting module 220 (which may further include a lighting change detecting module 221, a face detecting module 222, an eye detecting module 223, a visual moving away detecting module 224, and/or a gesture detecting module 225), an audio cue detecting module 226 (which may further include an audio moving away detecting module 227 and/or a voice pattern detecting module 228), and/or a user identifying module 230 (which may further include a biometric user identifying module 232). Specific details related to the transfer determining module 102* as well as the above-described sub-modules of the transfer determining module 102* will be provided below with respect to the operations and processes to be described herein.

Figure 3D:
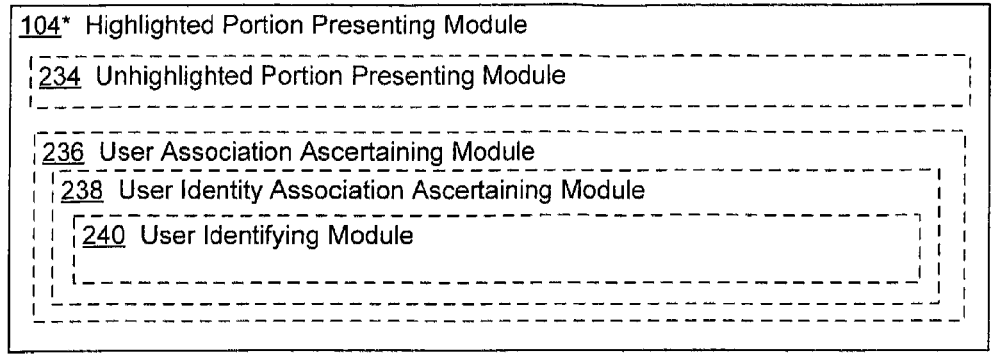
FIG. 3d shows another perspective of the highlighted portion presenting module 104* (i.e., the highlighted portion presenting module 104' and the highlighted portion presenting module 104") of FIGS. 3a and 3b.

Referring now to FIG. 3d illustrating a particular implementation of the highlighted portion presenting module 104* (e.g., the highlighted portion presenting module 104' or the highlighted portion presenting module 104") of FIGS. 3a and 3b. As illustrated, the highlighted portion presenting module 104* may include one or more sub-logic modules in various alternative implementations. For example, in various implementations, the highlighted portion presenting module 104* may include a unhighlighted portion presenting module 234 and/or a user association ascertaining module 236 that may further include a user identity association ascertain module 238 (which may further include a user identifying module 240). Note that in some embodiments, the user identifying module 240 may be the same module as the user identifying module 230 of FIG. 3c. Specific details related to the highlighted portion presenting module 104* as well as the above-described sub-modules of the highlighted portion presenting module 104* will be provided below with respect to the operations and processes to be described herein.

Figure 3E:
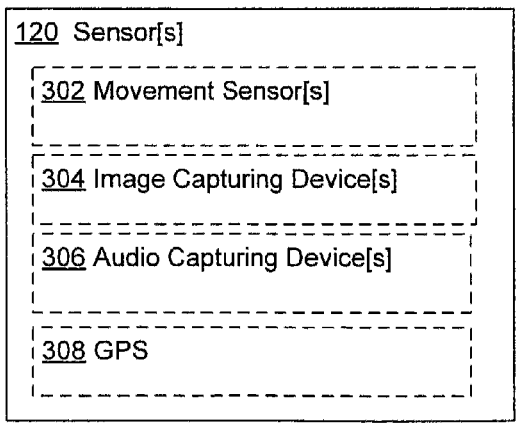
FIG. 3e shows various types of sensors 120 that may be included in the computing device 10' and the computing device 10" of FIGS. 3a and 3b.

FIG. 3e illustrates the various types of sensors 120 that may be included with the computing device 10* (e.g., the computing device 10' of FIG. 3a or the computing device 10" of FIG. 3b) of FIGS. 1, 2a, 2b, 2c, 2d, 2e, 7a, 7b, 7c, 7d, 7e, and 7f. As illustrated, the sensors 120 that may be included with the computing device 10* may include one or more movement sensors 302 (e.g., one or more accelerometers, inertia sensors, and/or gyro sensors), one or more image capturing devices 304 (e.g., one or more web cams, digital cameras, etc.), one or more audio capturing devices 306 (e.g., microphones), and/or a global positioning system (GPS) 308 (which may include any device that can determine its geographic location including those devices that determine its geographic location using triangulation techniques applied to signals transmitted by satellites or by communication towers such as cellular towers).

Figure 4:
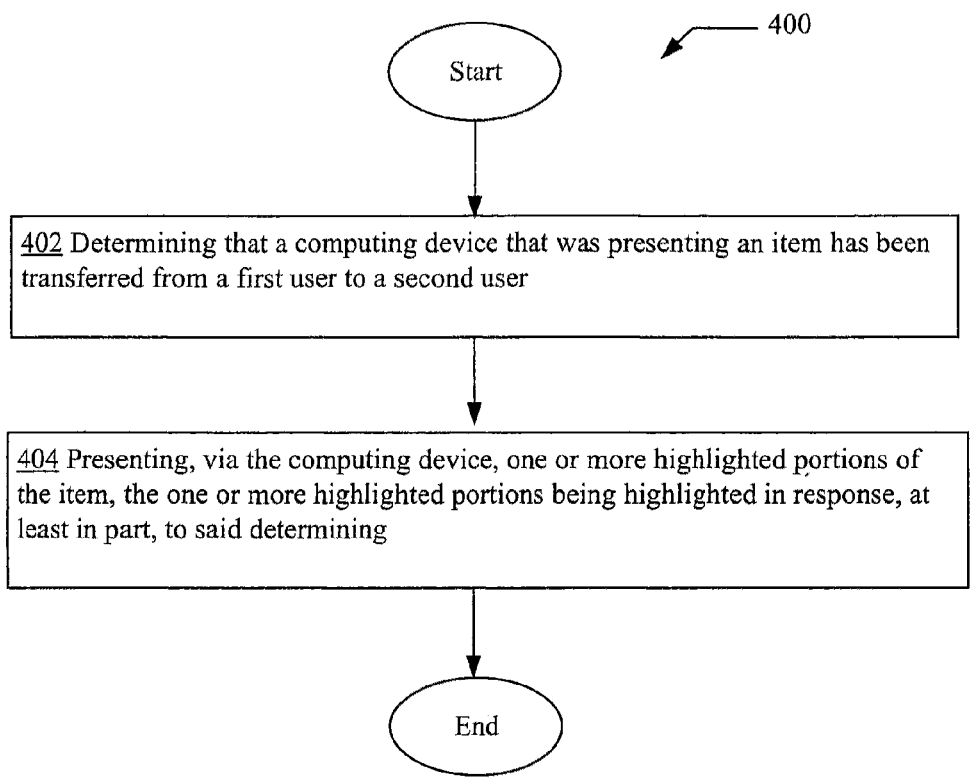
FIG. 4 is a high-level logic flowchart of a process.

A more detailed discussion related to the computing device 10* of FIGS. 1, 2a, 2b, 2c, 2d, 2e, 7a, 7b, 7c, 7d, 7e, and 7f (e.g., the computing device 10' of FIG. 3a or the computing device 10" of FIG. 3b) will now be provided with respect to the processes and operations to be described herein. FIG. 4 illustrates an operational flow 400 representing example operations for, among other things, determining that a computing device 10* that was presenting an item 701* (e.g., a textual document or a portion thereof, an electronic or digital book or a portion thereof, an application or application interface or a portion thereof, a website or a portion thereof, an image file or a portion thereof, a video file or a portion thereof, or other types of electronic items) has been transferred from a first user 20 to a second user 30; and presenting, via the computing device 10*, one or more highlighted portions 702* of the item 701*, the one or more highlighted portions 702* being highlighted in response, at least in part, to said determining that the computing device 10* has been transferred from the first user 20 to the second user 30. In FIG. 4 and in the following figures that include various examples of operational flows, discussions and explanations will be provided with respect to the computing device 10* described above and as illustrated in FIG. 1 and/or with respect to other examples (e.g., as provided in FIGS. 2a, 2b, 2c, 2d, 2e, 3a, 3b, 3c, 3d, 3e, 7a, 7b, 7c, 7d, 7e, and 7f) and contexts. However, it should be understood that the operational flows may be executed in a number of other environments and contexts, and/or in modified versions of FIGS. 1, 2a, 2b, 2c, 2d, 2e, 3a, 3b, 3c, 3d, 3e, 7a, 7b, 7c, 7d, 7e, and 7f. Also, although the various operational flows are presented in the sequence(s) illustrated, it should be understood that the various operations may be performed in other orders other than those which are illustrated, or may be performed concurrently.

Further, in FIG. 4 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 4 as well as the other operations to be described herein are performed by at least one of a machine, an article of manufacture, or a composition of matter unless indicated otherwise.

In any event, after a start operation, the operational flow 400 of FIG. 4 may move to a transfer determining operation 402 for determining that a computing device that was presenting an item has been transferred from a first user to a second user. For instance, and as an illustration, the transfer determining module 102* (e.g., the transfer determining module 102' of FIG. 3a or the transfer determining module 102" of FIG. 3b) of the computing device 10* of FIG. 1 (e.g., the computing device 10' of FIG. 3a or the computing device 10" of FIG. 3b) determining that a computing device 10* that was presenting an item 701* has been transferred from a first user 20 to a second user 30 (e.g., transferred from the possession of the first user 20 to the possession of the second user 30). Note that in various embodiments a user (e.g., the first user 20 or the second user 30) may have possession of the computing device 10* when the user has control over the computing device 10* by holding the computing device 10*, by being in contact with the computing device 10*, by being in close proximity of the computing device (e.g., such as within arm's length of the computing device 10*), and/or by being closest to the computing device 10*.

In addition to the transfer determining operation 402, operational flow 400 may include a highlighted portion presenting operation 404 for presenting, via the computing device, one or more highlighted portions of the item, the one or more highlighted portions being highlighted in response, at least in part, to said determining. For instance, the highlighted portion presenting module 104* (e.g., the highlighted portion presenting module 104' of FIG. 3a or the highlighted portion presenting module 104" of FIG. 3b) of the computing device 10* of FIG. 1 (e.g., the computing device 10' of FIG. 3a or the computing device 10" of FIG. 3b) presenting (e.g., displaying and/or audibly presenting via display device 12 and/or one or more speakers), via the computing device 10*, one or more highlighted portions 702* of the item 701*, the one or more highlighted portions being highlighted in response, at least in part, to determining that the computing device 10* has been transferred from the first user 20 to the second user 30.

Figure 5A:
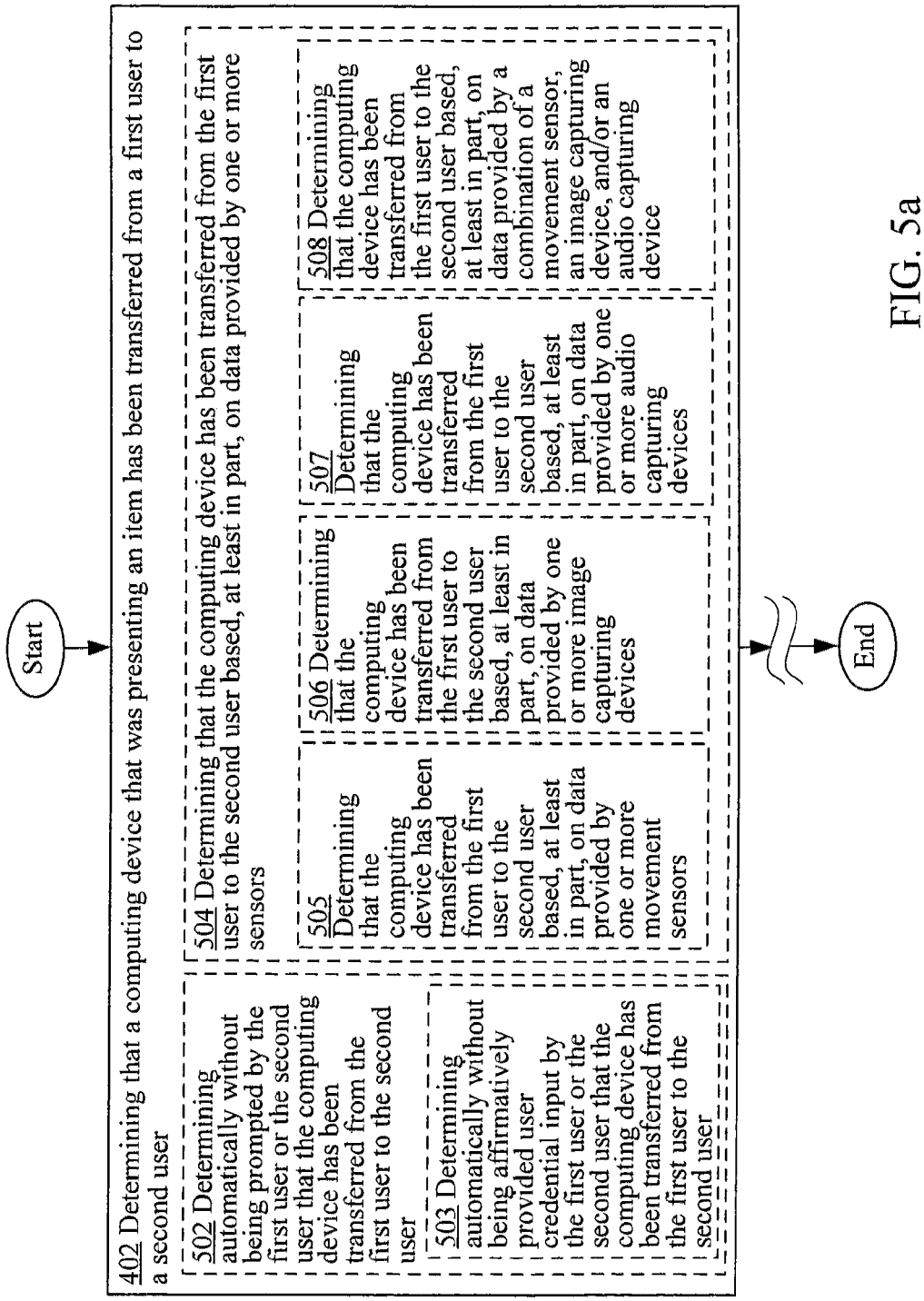
FIG. 5a is a high-level logic flowchart of a process depicting alternate implementations of the transfer determining operation 402 of FIG. 4.

As will be further described herein, the transfer determining operation 402 and the highlighted portion presenting operation 404 of FIG. 4 may be executed in a variety of different ways in various alternative implementations. FIGS. 5a, 5b, 5c, 5d, 5e, 5f, 5g, 5h, 5i, and 5j, for example, illustrate at least some of the alternative ways that the transfer determining operation 402 of FIG. 4 may be executed in various alternative implementations. For example, in various implementations, the transfer determining operation 402 of FIG. 4 may include an operation 502 for determining automatically without being prompted by the first user or the second user that the computing device has been transferred from the first user to the second user as depicted in FIG. 5a. For instance, the transfer determining module 102*(see, for example, the transfer determining module 102' of FIG. 3a or the transfer determining module 102" of FIG. 3b) of the computing device 10* of FIG. 1 (e.g., the computing device 10' of FIG. 3a or the computing device 10" of FIG. 3b) determining automatically without being prompted by the first user 20 or the second user 30 that the computing device 10* has been transferred from the first user 20 to the second user 30.

As further illustrated in FIG. 5a, in some implementations, the transfer determining operation 502 may further include an operation 503 for determining automatically without being affirmatively provided user credential input by the first user or the second user that the computing device has been transferred from the first user to the second user. For instance, the transfer determining module 102* of the computing device 10* of FIG. 1 (e.g., the computing device 10' of FIG. 3a or the computing device 10" of FIG. 3b) determining automatically without being affirmatively provided user credential input (e.g., user identification input such as a username and/or a user password) by the first user 20 or the second user 30 that the computing device 10* has been transferred from the first user 20 to the second user 30. In this case, the phrase "determining automatically without being affirmatively provided user credential input" is in reference to making the determination automatically that the computing device 10* has been transferred from the first user 20 to the second user 30 without the first user 20 or the second user 30 inputting user credential data such as a username or a password. For example, the computing device 10* may be designed to make the transfer determination that the computing device 10* has been transferred from the first user 20 to the second user 30 without the second user 30 having to input a username or password as is sometimes required in order to use or log on to a computing device 10*.

In the same or different implementations, the transfer determining operation 402 may additionally or alternatively include an operation 504 for determining that the computing device has been transferred from the first user to the second user based, at least in part, on data provided by one or more sensors. For instance, the transfer determining module 102* of the computing device 10* of FIG. 1 determining that the computing device 10* has been transferred from the first user 20 to the second user 30 based, at least in part, on data provided by one or more sensors 120 (see FIGS. 3a, 3b, and 3e).

Data from various types of sensors 120 may be used in order to determine whether the computing device 10* has been transferred. For example, and as further illustrated in FIG. 5a, operation 504 may include an operation 505 for determining that the computing device has been transferred from the first user to the second user based, at least in part, on data provided by one or more movement sensors. For instance, the transfer determining module 102* of the computing device 10* of FIG. 1 determining that the computing device 10* has been transferred from the first user 20 to the second user 30 based, at least in part, on data provided by one or more movement sensors 302 (e.g., an accelerometer, an inertia sensor, or a gyro sensor) that are designed to sense (e.g., directly detect) movements of the computing device 10*.

In the same or different implementations, operation 504 may include an operation 506 for determining that the computing device has been transferred from the first user to the second user based, at least in part, on data provided by one or more image capturing devices as further depicted in FIG. 5a. For instance, the transfer determining module 102* of the computing device 10* of FIG. 1 determining that the computing device 10* has been transferred from the first user 20 to the second user 30 based, at least in part, on data provided by one or more image capturing devices 304 (e.g., a webcam, a digital camera, and so forth), which may be integrated in the computing device 10*. Note that references to "computing device 10*" in the following description, unless indicated otherwise, may be in reference to the computing device 10' of FIG. 3a or to the computing device 10" of FIG. 3b.

In the same or alternative implementations, operation 504 may include an operation 507 for determining that the computing device has been transferred from the first user to the second user based, at least in part, on data provided by one or more audio capturing devices. For instance, the transfer determining module 102* of the computing device 10* of FIG. 1 determining that the computing device 10* has been transferred from the first user 20 to the second user 30 based, at least in part, on data provided by one or more audio capturing devices 306 (e.g., microphone), which may be integrated in the computing device 10*.

In some cases, operation 504 may include an operation 508 for determining that the computing device has been transferred from the first user to the second user based, at least in part, on data provided by a combination of a movement sensor, an image capturing device, and/or an audio capturing device. For instance, the transfer determining module 102* of the computing device 10* of FIG. 1 determining that the computing device 10* has been transferred from the first user 20 to the second user 30 based, at least in part, on data provided by a combination of a movement sensor 302, an image capturing device 304, and/or an audio capturing device 306.

Figure 5B:
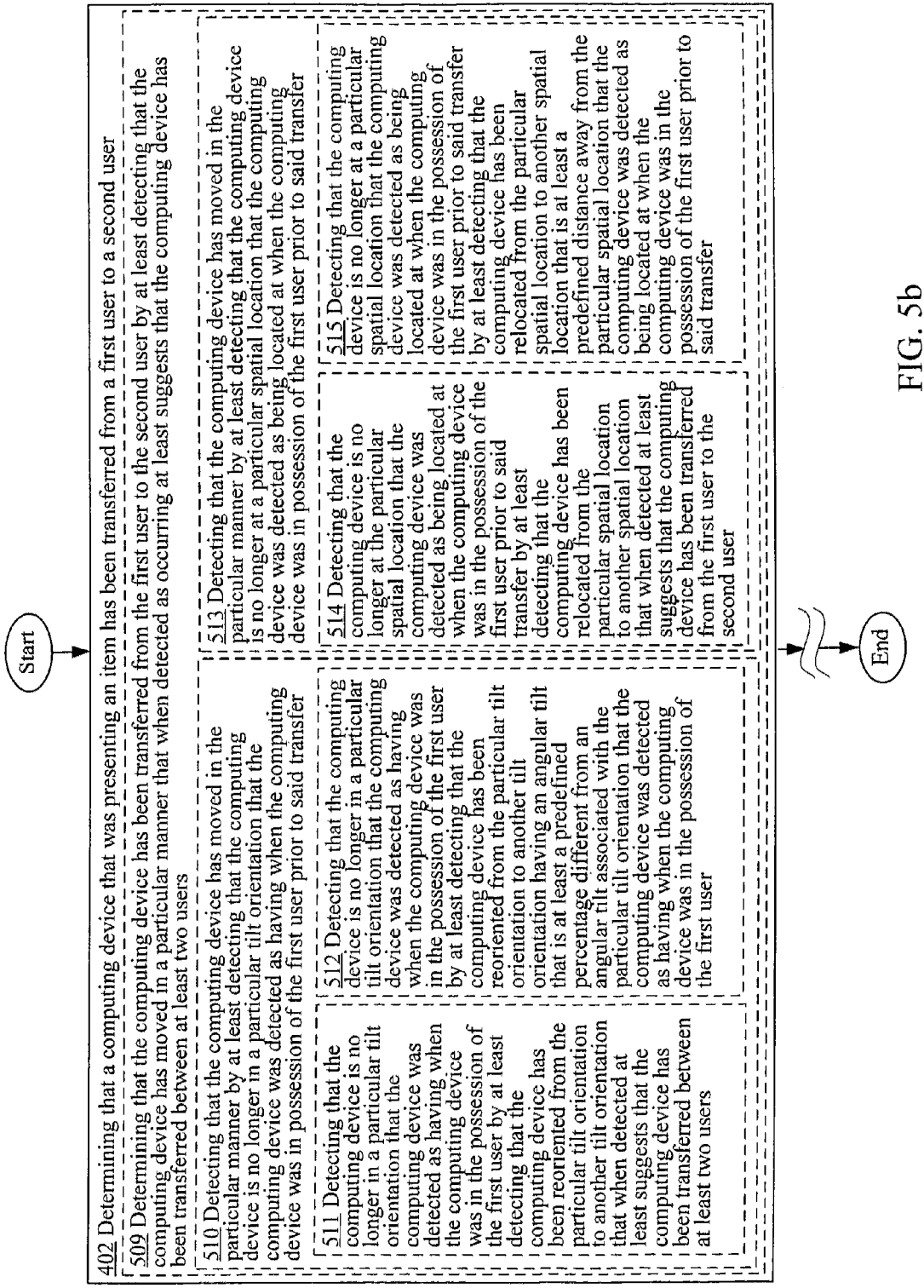
FIG. 5b is a high-level logic flowchart of a process depicting alternate implementations of the transfer determining operation 402 of FIG. 4.

In various implementations, the transfer determining operation 402 of FIG. 4 may involve making the determination that the computing device 10* has been transferred from the first user 20 to the second user 30 based, at least in part, on the detected movements of the computing device 10*. For example, in some implementations, the transfer determining operation 402 may include an operation 509 for determining that the computing device has been transferred from the first user to the second user by at least detecting that the computing device has moved in a particular manner that when detected as occurring at least suggests that the computing device has been transferred between at least two users as depicted in FIG. 5b. For instance, the transfer determining module 102* including a particular movement detecting module 210 (see FIG. 3c) of the computing device 10* determining that the computing device 10* has been transferred from the first user 20 to the second user 30 when the particular movement detecting module 210 at least detects that the computing device 10* has moved in a particular manner (e.g., has spatially moved along a particular three-dimensional path or moved to a particular spatial location with respect to its initial spatial location) that when detected as occurring at least suggests (e.g., infers or implies) that the computing device 10* has been transferred between two users.

Figure 5C:
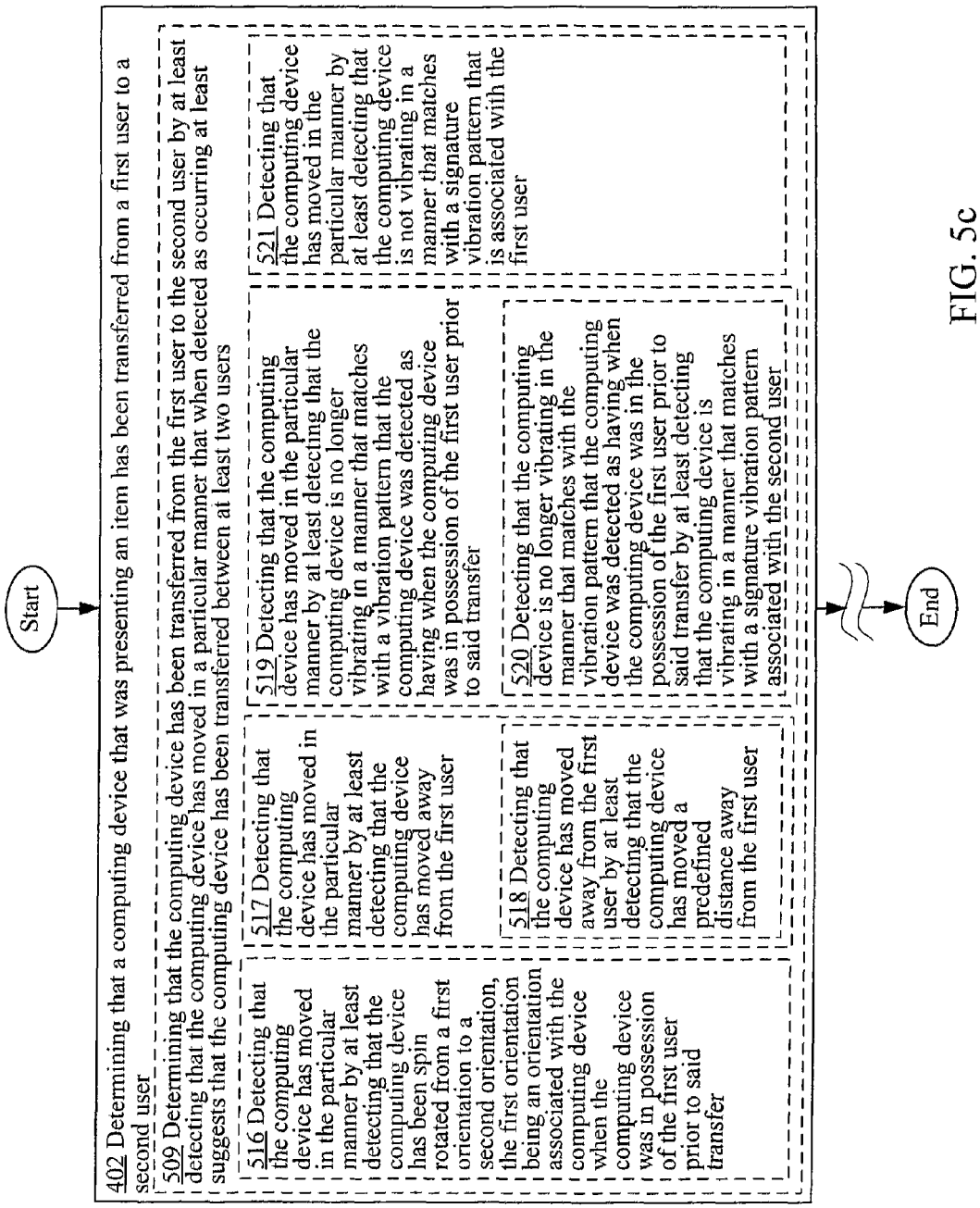
FIG. 5c is a high-level logic flowchart of a process depicting alternate implementations of the transfer determining operation 402 of FIG. 4.

As further illustrated in FIGS. 5b, 5c, and 5d, operation 509 may, in some cases, involve one or more operations for detecting various types of movements of the computing device 10* in order to determine or at least infer that the computing device 10* has been transferred from a first user 20 to a second user 30. For example, in some implementations, operation 509 may include an operation 510 for detecting that the computing device has moved in the particular manner by at least detecting that the computing device is no longer in a particular tilt orientation that the computing device was detected as having when the computing device was in possession of the first user prior to said transfer as illustrated in FIG. 5b. For instance, the particular movement detecting module 210 including the tilt detecting module 212 (see FIG. 3c) of the computing device 10*detecting that the computing device 10* has moved in the particular manner when the tilt detecting module 212 at least detects that the computing device 10* is no longer in a particular tilt orientation that the computing device 10* was detected as having when the computing device 10* was in possession of the first user 20 prior to the transfer of the computing device 10* from the first user 20 to the second user 30. Thus, in various implementations, the computing device 10* may also be endowed with logic to determine whether the computing device 10 was in the possession of the first user 20. Such a determination for determining whether the computing device 10* was in the possession of a particular user, such as the first user 20, may be made using a variety of sensing means to automatically detect at least the presence of a user in the immediate area (e.g., within arm's length or within some other distances such as five feet) surrounding the computing device 10*.

For example, a facial recognition system or application may be used in order to determine whether the face of the first user 20* is detected in the vicinity of the computing device 10* (e.g., in the visual range of a webcam or other types of image capturing devices 304 that may be part of the computing device 10*). In other cases, a voice recognition system or application may be used in order to determine whether the voice of the first user 20 is detected in the vicinity of the computing device 10*. In still other cases, other sensing or detecting means for detecting indicators (e.g., signature movements or vibration) that indicate the presence or absence of the first user 20 in the proximate vicinity (e.g., close vicinity) of the computing device 10* may be employed in order to determine whether the first user 20 has possession of the computing device 10*.

In some cases, operation 510 may, in turn, include an operation 511 for detecting that the computing device is no longer in a particular tilt orientation that the computing device was detected as having when the computing device was in the possession of the first user by at least detecting that the computing device has been reoriented from the particular tilt orientation to another tilt orientation that when detected at least suggests that the computing device has been transferred between at least two users as further depicted in FIG. 5b. For instance, the tilt detecting module 212 of the computing device 10* detecting that the computing device 10* is no longer in a particular tilt orientation that the computing device 10* was detected as having when the computing device 10* was in the possession of the first user 20 by at least detecting that the computing device 10* has been reoriented from the particular tilt orientation of the computing device 10* that the computing device 10* was detected as having when the computing device 10* was in the possession of the first user 20 to another tilt orientation that when detected at least suggests that the computing device 10* has been transferred between at least two users.

In the same or different implementations, operation 510 may include an operation 512 for detecting that the computing device is no longer in a particular tilt orientation that the computing device was detected as having when the computing device was in the possession of the first user by at least detecting that the computing device has been reoriented from the particular tilt orientation to another tilt orientation having an angular tilt that is at least a predefined percentage different from an angular tilt associated with the particular tilt orientation that the computing device was detected as having when the computing device was in the possession of the first user as further depicted in FIG. 5b. For instance, the tilt detecting module 212 of the computing device 10* detecting that the computing device 10* is no longer in a particular tilt orientation that the computing device 10* was detected as having when the computing device 10* was in the possession of the first user 20 by at least detecting that the computing device 10* has been reoriented from the particular tilt orientation of the computing device 10* that the computing device 10* was detected as having when the computing device 10* was in the possession of the first user 20 to another tilt orientation having an angular tilt that is at least a predefined percentage different from an angular tilt associated with the particular tilt orientation that the computing device 10* was detected as having when the computing device 10* was in the possession of the first user 20. Such an operation may be executed in order to, for example, filter out "noise" tilts (e.g., random changes in tilt caused by the first user 20 when, for example, the first user 20 accidentally or intentionally moves his/her body or hands in order to, for example, get in a more comfortable body position causing the computing device 10* to move and change in tilt orientation).

In various implementations, the operation 509 for determining that the computing device has been transferred from the first user to the second user by at least detecting that the computing device has moved in a particular manner that when detected as occurring at least suggests that the computing device has been transferred between at least two users may involve detecting that the computing device 10* has at least been relocated away from a particular location. For example, in some implementations, operation 509 may include an operation 513 for detecting that the computing device has moved in the particular manner by at least detecting that the computing device is no longer at a particular spatial location that the computing device was detected as being located at when the computing device was in possession of the first user prior to said transfer as depicted in FIG. 5b. For instance, the particular movement detecting module 210 including the spatial location detecting module 214 (see FIG. 3c) of the computing device 10* detecting that the computing device 10* has moved in a particular manner when the spatial location detecting module 214 at least detects that the computing device 10* is no longer at a particular spatial location (e.g., see spatial location 46 of FIG. 2d) that the computing device 10* was detected as being located at when the computing device 10* was in the possession of the first user 20 prior to the transfer of the computing device 10*.

In various implementations, operation 513 may include an operation 514 for detecting that the computing device is no longer at the particular spatial location that the computing device was detected as being located at when the computing device was in the possession of the first user prior to said transfer by at least detecting that the computing device has been relocated from the particular spatial location to another spatial location that when detected at least suggests that the computing device has been transferred from the first user to the second user. For instance, the spatial location detecting module 214 of the computing device 10* detecting that the computing device 10* is no longer at the particular spatial location 46 (see FIG. 3d) that the computing device 10* was detected as being located at when the computing device 10* was in the possession of the first user 20 prior to the transfer of the computing device 10*, the detecting by at least detecting that the computing device 10* has been relocated from the particular spatial location 46 to another spatial location 48 that when detected at least suggests that the computing device 10* has been transferred from the first user 20 to the second user 30.

In the same or different implementations, operation 513 may include an operation 515 for detecting that the computing device is no longer at a particular spatial location that the computing device was detected as being located at when the computing device was in the possession of the first user prior to said transfer by at least detecting that the computing device has been relocated from the particular spatial location to another spatial location that is at least a predefined distance away from the particular spatial location that the computing device was detected as being located at when the computing device was in the possession of the first user prior to said transfer. For instance, the spatial location detecting module 214 of the computing device 10* detecting that the computing device 10* is no longer at a particular spatial location (e.g., spatial location 46 of FIG. 3d) that the computing device 10* was detected as being located at when the computing device 10* was in the possession of the first user 20 prior to said transfer of the computing device 10*, the detecting by at least detecting that the computing device 10* has been relocated from the particular spatial location 46 to another spatial location 48 that is at least a predefined distance away from the particular spatial location 46 that the computing device 10* was detected as being located at when the computing device 10* was in the possession of the first user 20 prior to the transfer of the computing device 10*.

Turning to FIG. 5c, in various implementations, operation 509 for determining that the computing device has been transferred from the first user to the second user by at least detecting that the computing device has moved in a particular manner that when detected as occurring at least suggests that the computing device has been transferred between at least two users may include an operation 516 for detecting that the computing device has moved in the particular manner by at least detecting that the computing device has been spin rotated from a first orientation to a second orientation, the first orientation being an orientation associated with the computing device when the computing device was in possession of the first user prior to said transfer. For instance, the particular movement detecting module 210 including the spin rotation detecting module 216 (see FIG. 3c) of the computing device 10* detecting that the computing device 10* has moved in the particular manner when the spin rotation detecting module 216 at least detects that the computing device 10* has been spin rotated from a first orientation to a second orientation, the first orientation being an orientation associated with the computing device 10* when the computing device 10* was in possession of the first user 20 prior to the transfer of the computing device 10*.

In the same or different implementations, operation 509 may include an operation 517 for detecting that the computing device has moved in the particular manner by at least detecting that the computing device has moved away from the first user. For instance, the particular movement detecting module 210 including the moving away detecting module 217 (see FIG. 3c) of the computing device 10* detecting that the computing device 10* has moved in a particular manner when the moving away detecting module 217 at least detects that the computing device 10* has moved away from the first user 20. Such detection may be based on data provided by one or more sensors 120 including one or more movement sensors 302, one or more image capturing devices 304 (which may detect the face of the first user 20 moving away from the computing device 10*), and/or one or more audio capturing devices 306 (which may detect a voice having the voice signature of the first user 20 diminishing in volume thus inferring or suggesting that the first user 20 is or was moving away from the computing device 10*).

In some implementations, operation 517 may further include an operation 518 for detecting that the computing device has moved away from the first user by at least detecting that the computing device has moved a predefined distance away from the first user. For instance, the moving away detecting module 217 of the computing device 10* detecting that the computing device 10* has moved away from the first user 20 by at least detecting that the computing device 10* has moved a predefined distance away from the first user 20. In doing so, the computing device 10* may filter out movements that may be considered "noise" (e.g., random or accidental relocation movements of the computing device 10* caused by, for example, the random or accidental movements of the first user 20 holding the computing device 10*).

In various embodiments, operation 509 may involve tracking or sensing one or more vibrations that may be exhibited by the computing device 10* through its physical contact with one or more users. That is, users may each be associated with different and relatively distinct signature vibration patterns (e.g., distinct heart rates). Thus, by detecting at least a change in vibration as exhibited by the computing device 10* as a result of, for example, the computing device 10* being passed from one user to another user, at least an inference may be made that a transfer of the computing device 10* has occurred. Thus, in various implementations, operation 509 may include an operation 519 for detecting that the computing device has moved in the particular manner by at least detecting that the computing device is no longer vibrating in a manner that matches with a vibration pattern that the computing device was detected as having when the computing device was in possession of the first user prior to said transfer as further illustrated in FIG. 5c. For instance, the particular movement detecting module 210 including the vibration detecting module 218 (see FIG. 3*c*) of the computing device 10\* detecting that the computing device 10\* has moved in a particular manner when the vibration detecting module 218 at least detects that the computing device 10\* is no longer vibrating in a manner that matches with a vibration pattern that the computing device 10\* was detected having when the computing device 10\* was in possession of the first user 20 prior to the transfer of the computing device 10\*.

As further illustrated in FIG. 5*c*, in some implementations, operation 519 may further include an operation 520 for detecting that the computing device is no longer vibrating in the manner that matches with the vibration pattern that the computing device was detected as having when the computing device was in the possession of the first user prior to said transfer by at least detecting that the computing device is vibrating in a manner that matches with a signature vibration pattern associated with the second user. For instance, the vibration detecting module 218 of the computing device 10\* detecting that the computing device 10\* is no longer vibrating in a manner that matches with a vibration pattern that the computing device 10\* was detected as having when the computing device 10\* was in the possession of the first user 20 prior to the transfer of the computing device 10\*, the detecting by at least detecting that the computing device 10\* is vibrating in a manner that matches with a signature vibration pattern associated with the second user 30. For example, if the second user 30 is a regular user, a primary user, or an owner of the computing device 10\* than the computing device 10\* may store in its memory 114 the signature vibration pattern of the second user 30.

In the same or different implementations, operation 509 may include an operation 521 for detecting that the computing device has moved in the particular manner by at least detecting that the computing device is not vibrating in a manner that matches with a signature vibration pattern that is associated with the first user. For instance, particular movement detecting module 210 including the vibration detecting module 218 of the computing device 10\* determining that the computing device 10\* has moved in a particular manner when the vibration detecting module 218 at least detects that the computing device 10\* is not vibrating in a manner that matches with a signature vibration pattern that is associated with the first user 20.

Referring now to FIG. 5*d*, in various implementations, operation 509 for determining that the computing device has been transferred from the first user to the second user by at least detecting that the computing device has moved in a particular manner that when detected as occurring at least suggests that the computing device has been transferred between at least two users may involve tracking the overall movements of the computing device 10\* rather than tracking any particular type of movements (e.g., tilt movements, spin rotation movements, spatial relocation movements, vibration movements, etc.) in order to determine whether the computing device 10\* has been transferred from the first user 20 to the second user 30. For example, in some implementations, operation 509 may include an operation 522 for detecting that the computing device has moved in the particular manner by at least detecting that the computing device has moved in a particular three-dimensional way that at least suggests that the computing device has been transferred between two users. For instance, the particular movement detecting module 210 including the three-dimensional movement detecting module 219 (see FIG. 3*c*) of the computing device 10\* detecting that the computing device 10\* has moved in the particular manner when the three-dimensional movement detecting module 219 at least detects that the computing device 10\* has moved in a particular three-dimensional way that at least suggests that the computing device 10\* has been transferred between two users.

As further illustrated in FIG. 5*d*, operation 522 may include one or more additional operations in various alternative implementations. For example, in some implementations, operation 522 may include an operation 523 for detecting that the computing device has moved in the particular three-dimensional way that at least suggests that the computing device has been transferred between two users by detecting that the computing device is exhibiting one or more three-dimensional movements that matches with one or more signature three-dimensional movements that when detected as occurring at least suggests transfer of the computing device between two users. For instance, the three-dimensional movement detecting module 219 of the computing device 10\* detecting that the computing device 10\* has moved in the particular three-dimensional way that at least suggests that the computing device 10\* has been transferred between two users (e.g., between the first user 20 and the second user 30) by detecting that the computing device 10\* is exhibiting one or more three-dimensional movements that matches with one or more signature three-dimensional movements (e.g., one or more signature three-dimensional movements that may be stored in the movement library 170 of the memory 114) that when detected as occurring at least suggests transfer of the computing device 10\* between two users.

In some cases, operation 523 may further include an operation 524 for detecting that the computing device is exhibiting one or more three-dimensional movements that matches with the one or more signature three-dimensional movements by detecting that the computing device is exhibiting one or more three-dimensional movements that matches with one or more signature three-dimensional movements that are particularly associated with the first user and that when detected as occurring at least suggests transfer of the computing device from the first user to another user. For instance, the three-dimensional movement detecting module 219 of the computing device 10\* detecting that the computing device 10\* is exhibiting one or more three-dimensional movements that matches with the one or more signature three-dimensional movements by detecting that the computing device 10\* is exhibiting one or more three-dimensional movements that matches with one or more signature three-dimensional movements (e.g., as indicated in the movement library 170 of the memory 114) that are particularly associated with the first user 20 and that when detected as occurring at least suggests transfer of the computing device 10\* from the first user 20 to another user (e.g., the second user 30).

In some implementations, the one or more signature three-dimensional movements of the computing device 10\* may be the one or more signature movements of the computing device 10\* that may be exhibited by the computing device 10\* when the first user 20 is passing-off (e.g., transferring) the computing device 20 to another user. For these implementations, the computing device 10\* may be endowed with logic that may allow the computing device 10\* to detect and learn its own movements when the computing device 10\* is being handed-off from the first user 20 to another user, and based on such detected/learned movements (e.g., signature movements) the computing device 10\* (or its endowed logic) may determine or at least infer that the computing device 10\* has been transferred from the first user 20 to another user whenever it detects movements that matches with the previously detected/learned movements. In various implementations, the movements of the computing device 10\* may be monitored using one or more movements sensors 302 and/or one or more image capturing devices 304.

In the same or different implementations, operation 523 may include an operation 525 for detecting that the computing device is exhibiting one or more three-dimensional movements that matches with the one or more signature three-dimensional movements by detecting that the computing device is exhibiting one or more three-dimensional movements that matches with one or more generic signature three-dimensional movements that are not particularly associated with the first user and that when detected as occurring at least suggests transfer of the computing device between two users. For instance, the three-dimensional movement detecting module 219 of the computing device 10* detecting that the computing device 10* is exhibiting one or more three-dimensional movements that matches with the one or more signature three-dimensional movements by detecting that the computing device 10* is exhibiting one or more three-dimensional movements that matches with one or more generic signature three-dimensional movements that are not particularly associated with the first user 20 (e.g., one or more generic signature three-dimensional movements of the computing device 10* that are not associated with any specific user) and that when detected as occurring at least suggests transfer of the computing device 10* between two users.

Figure 5E:
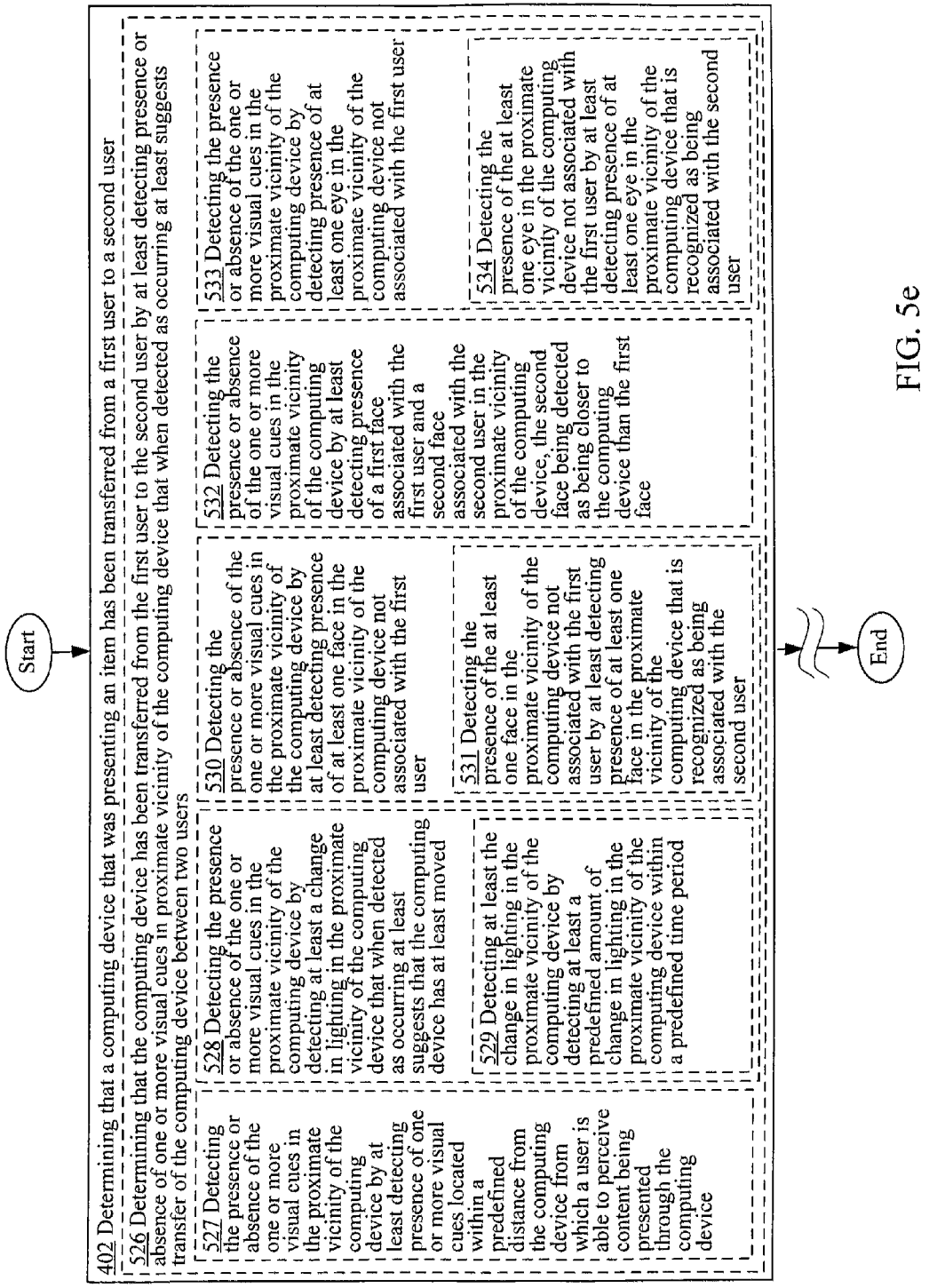
FIG. 5e is a high-level logic flowchart of a process depicting alternate implementations of the transfer determining operation 402 of FIG. 4.

Referring now to FIG. 5e, in various implementations, the transfer determining operation 402 of FIG. 4 may involve determining that the computing device 10* has been transferred from the first user 20 to the second user 30 based, at least in part, on one or more visual cues. For example, in some implementations, the transfer determining operation 402 may include an operation 526 for determining that the computing device has been transferred from the first user to the second user by at least detecting presence or absence of one or more visual cues in proximate vicinity of the computing device that when detected as occurring at least suggests transfer of the computing device between two users as illustrated in FIG. 5e. For instance, the transfer determining module 102* including the visual cue detecting module 220 (see FIG. 3c) of the computing device 10* determining that the computing device 10* has been transferred from the first user 20 to the second user 30 when the visual cue detecting module 220 at least detects presence or absence of one or more visual cues (e.g., detecting presence or absence of faces of the first user 20 and/or second user 30, detecting background movement relative to the computing device 10*, and so forth) in proximate vicinity (e.g., within a distance from the computing device 10* from which an object or a person is visually discernable or identifiable by the computing device 10*) of the computing device 10* that when detected as occurring at least suggests transfer of the computing device 10* between two users (e.g., between the first user 20 and the second user 30).

Figure 5F:
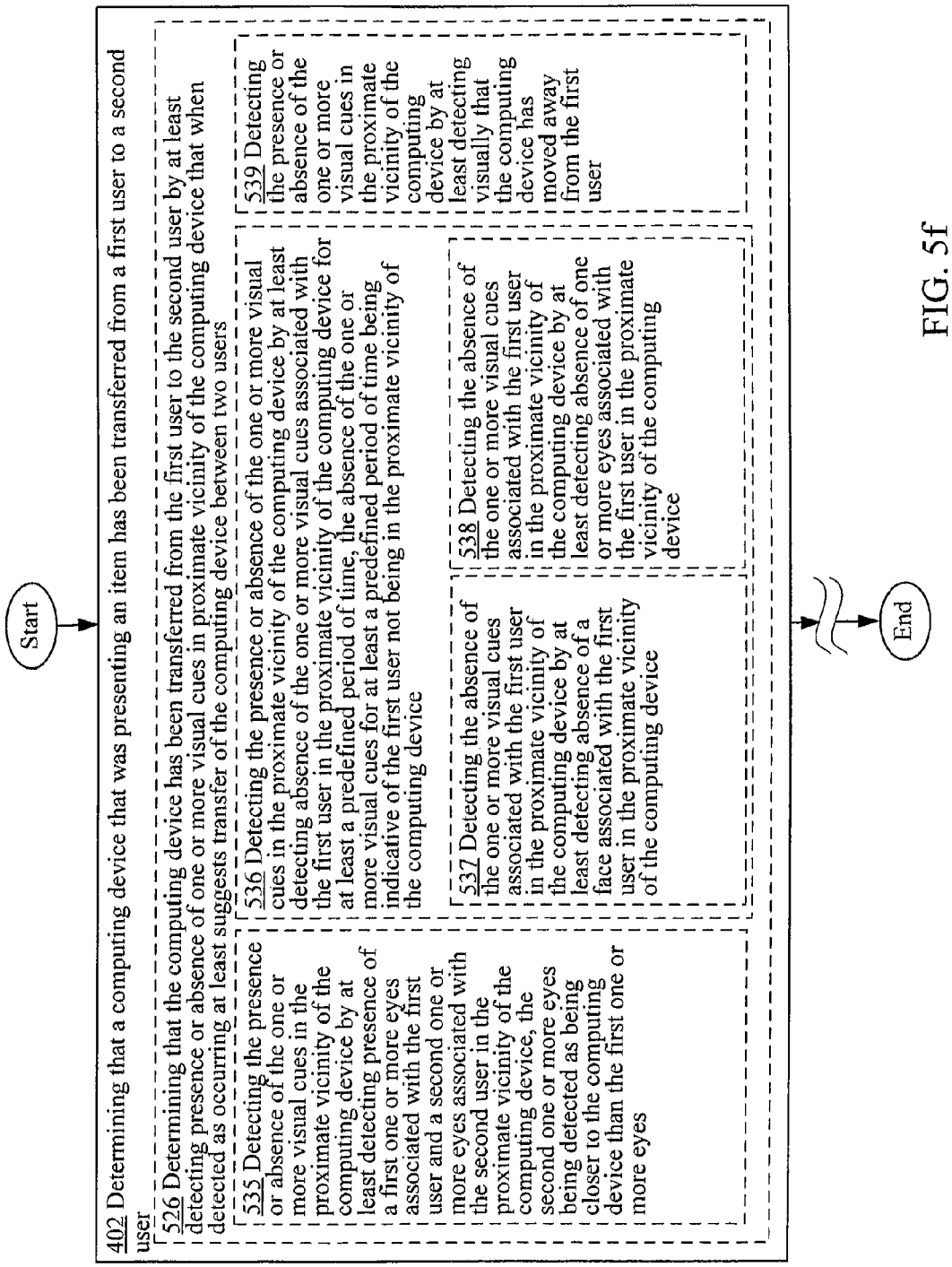
FIG. 5f is a high-level logic flowchart of a process depicting alternate implementations of the transfer determining operation 402 of FIG. 4.
Figure 5G:
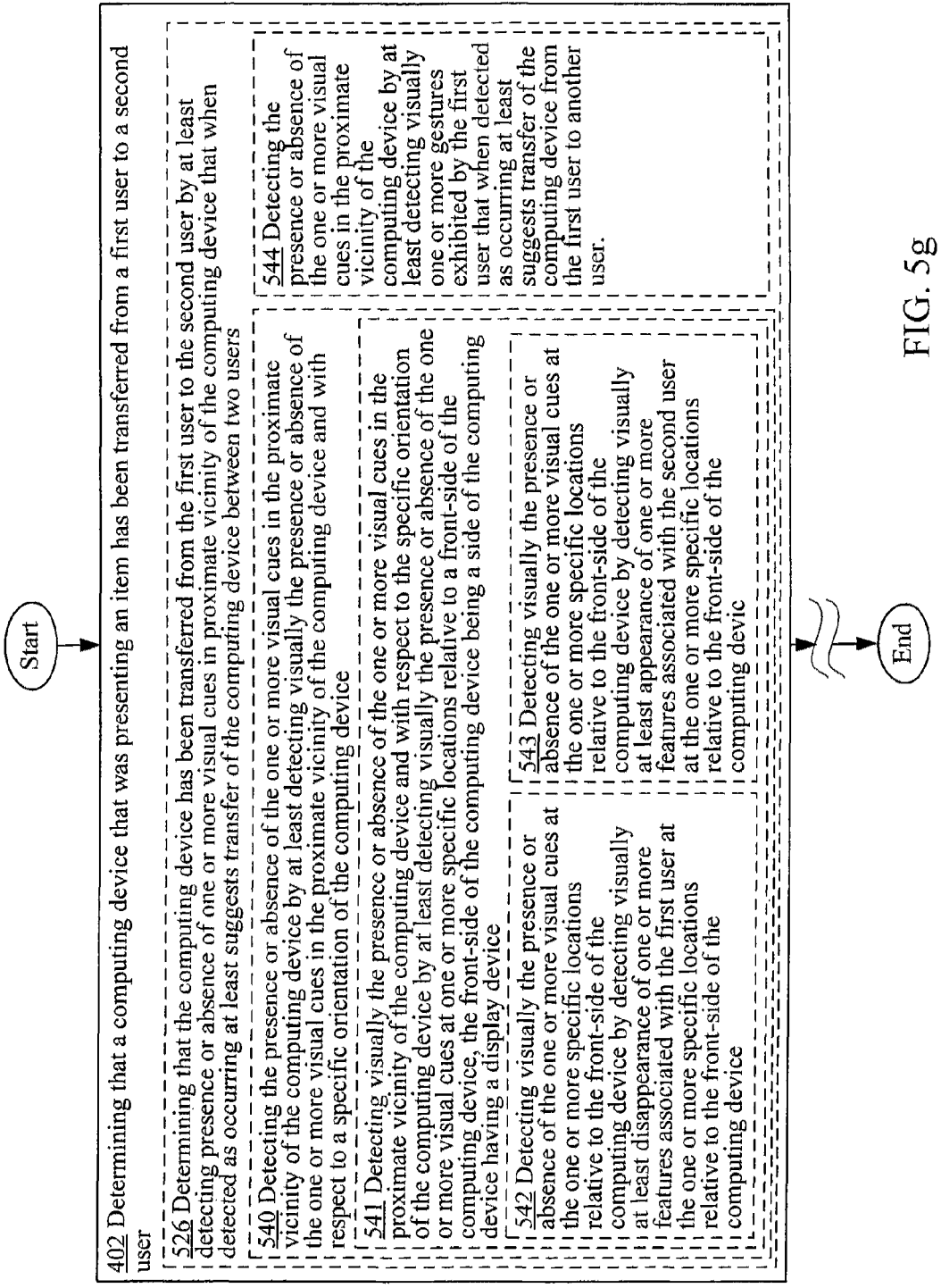
FIG. 5g is a high-level logic flowchart of a process depicting alternate implementations of the transfer determining operation 402 of FIG. 4.

As further illustrated in FIGS. 5e, 5f, and 5g, operation 526 may be implemented in a number of different ways in various alternative implementations. For example, in some implementations, operation 526 may include an operation 527 for detecting the presence or absence of the one or more visual cues in the proximate vicinity of the computing device by at least detecting presence of one or more visual cues located within a predefined distance from the computing device from which a user is able to perceive content being presented through the computing device as illustrated in FIG. 5e. For instance, the visual cue detecting module 220 of the computing device 10* detecting the presence or absence of the one or more visual cues in the proximate vicinity of the computing device 10* by at least detecting presence of one or more visual cues located within a predefined distance from the computing device 10* from which a user is able to (e.g., user can) perceive content being presented through the computing device 10*. For example, if the face (or eyes) of the second user 30 is determined to be within a distance (e.g., four feet) from the computing device 10* from which the second user 30 is able to visually ascertain what is being displayed through the computing device 10*, then determining that the transfer of the computing device 10* has occurred from the first user 20 to the second user 30.

In the same or different implementations, operation 526 may include an operation 528 for detecting the presence or absence of the one or more visual cues in the proximate vicinity of the computing device by detecting at least a change in lighting in the proximate vicinity of the computing device that when detected as occurring at least suggests that the computing device has at least moved. For instance, the visual cue detecting module 220 including the lighting change detecting module 221 (see FIG. 3c) of the computing device 10* detecting the presence or absence of the one or more visual cues in the proximate vicinity of the computing device 10* when the lighting change detecting module 221 detects at least a change in lighting in the proximate vicinity of the computing device 10* that when detected as occurring at least suggests that the computing device 10* has at least moved. That is, typically when a device such as a computing device 10* is moved from one location to another location, there may be a variation in the type/amount of light being exposed to the device. Thus, by merely detecting changes in lighting conditions surrounding the computing device 10*, an inference could be made that, for example, a computing device 10* is being moved/transferred.

In some cases, operation 528 may further include an operation 529 for detecting at least the change in lighting in the proximate vicinity of the computing device by detecting at least a predefined amount of change in lighting in the proximate vicinity of the computing device within a predefined time period as further depicted in FIG. 5e. For instance, the lighting change detecting module 221 of the computing device 10* detecting at least the change in lighting in the proximate vicinity of the computing device 10* by detecting at least a predefined amount of change in lighting in the proximate vicinity of the computing device 10* within a predefined time period. In doing so, inconsequential lighting changes will be filtered out such as those as a result of changes in daylight, which typically occurs slowly.

In the same or different implementations, operation 526 may include an operation 530 for detecting the presence or absence of the one or more visual cues in the proximate vicinity of the computing device by at least detecting presence of at least one face in the proximate vicinity of the computing device not associated with the first user. For instance, the visual cue detecting module 220 including the face detecting module 222 (see FIG. 3c) of the computing device 10* detecting the presence or absence of the one or more visual cues in the proximate vicinity of the computing device 10* when the face detecting module 222 at least detects presence of at least one face (e.g., detecting presence of the at least one face based on image data provided by an image capturing device 304) in the proximate vicinity (e.g., close vicinity such as within five feet) of the computing device 10* not associated with the first user 20.

As further illustrated in FIG. 5e, in some implementations, operation 530 may include an operation 531 for detecting the presence of the at least one face in the proximate vicinity of the computing device not associated with the first user by at least detecting presence of at least one face in the proximate vicinity of the computing device that is recognized as being associated with the second user. For instance, the face detecting module 222 of the computing device 10* detecting the presence of the at least one face in the proximate vicinity of the computing device 10* not associated with the first user 20 by at least detecting presence of at least one face in the proximate vicinity of the computing device 10* that is recognized or detected as being associated with the second user 30. In some cases, the computing device 10* may store in its memory 114 facial characteristics of one or more users in the form of one or more facial images including, for example, a facial image of the second user 30.

In some cases, operation 526 may alternatively or additionally include an operation 532 for detecting the presence or absence of the one or more visual cues in, the proximate vicinity of the computing device by at least detecting presence of a first face associated with the first user and a second face associated with the second user in the proximate vicinity of the computing device, the second face being detected as being closer to the computing device than the first face. For instance, the visual cue detecting module 220 including the face detecting module 222 of the computing device 10* detecting the presence or absence of the one or more visual cues in the proximate vicinity of the computing device 10* when the face detecting module 222 at least detects presence of a first face associated with the first user 20 and a second face associated with the second user 30 in the proximate vicinity of the computing device 10*, the second face being detected as being closer to the computing device 10* than the first face of the first user 20. Note that in this particular implementation, the computing device 10* or at least the logic endowed with the computing device 10* may only need to recognize that the first face and the second face are two different faces belonging to, for example, two different users.

In the same or different implementations, operation 526 may include an operation 533 for detecting the presence or absence of the one or more visual cues in the proximate vicinity of the computing device by detecting presence of at least one eye in the proximate vicinity of the computing device not associated with the first user as further depicted in FIG. 5e. For instance, the visual cue detecting module 220 including the eye detecting module 223 (see FIG. 3c) of the computing device 10* detecting the presence or absence of the one or more visual cues in the proximate vicinity of the computing device 10* when the eye detecting module 223 detects presence of at least one eye (e.g., iris or retina characteristics) in the proximate vicinity of the computing device 10* not associated with the first user 20. In other words, determining that there is at least one eye having, for example, iris or retina characteristics in the proximate vicinity of the computing device 10* that is different from the iris or retina characteristics of the eye or eyes of the first user 20.

In some cases operation 533 may further include an operation 534 for detecting the presence of the at least one eye in the proximate vicinity of the computing device not associated with the first user by at least detecting presence of at least one eye in the proximate vicinity of the computing device that is recognized as being associated with the second user. For instance, the eye detecting module 223 of the computing device 10* detecting the presence of the at least one eye in the proximate vicinity of the computing device 10* not associated with the first user 20 by at least detecting presence of at least one eye in the proximate vicinity of the computing device 10* that is recognized by, for example, the endowed logic of the computing device 10* as being associated with the second user 30. Thus, in some cases, the computing device 10* may store in its memory 114 images of eyes (e.g., images of irises or retinas) belonging to one or more users including, for example, the second user 30.

In the same or different implementations, operation 526 may include an operation 535 for detecting the presence or absence of the one or more visual cues in the proximate vicinity of the computing device by at least detecting presence of a first one or more eyes associated with the first user and a second one or more eyes associated with the second user in the proximate vicinity of the computing device, the second one or more eyes being detected as being closer to the computing device than the first one or more eyes as illustrated in FIG. 5f. For instance, the visual cue detecting module 220 including the eye detecting module 223 of the computing device 10* detecting presence or absence of one or more visual cues in the proximate vicinity of the computing device 10* when the eye detecting module 223 at least detects presence of a first one or more eyes associated with the first user 20 and a second one or more eyes associated with the second user 30 in the proximate vicinity (e.g., immediate proximity) of the computing device 10*, the second one or more eyes being detected as being closer to the computing device 10* than the first one or more eyes.

In the same or different implementations, operation 526 may include an operation 536 for detecting the presence or absence of the one or more visual cues in the proximate vicinity of the computing device by at least detecting absence of the one or more visual cues associated with the first user in the proximate vicinity of the computing device for at least a predefined period of time, the absence of the one or more visual cues for at least a predefined period of time being indicative of the first user not being in the proximate vicinity of the computing device as further illustrated in FIG. 5f. For instance, the visual cue detecting module 220 of the computing device 10* detecting the presence or absence of the one or more visual cues in the proximate vicinity of the computing device 10* by at least detecting absence of the one or more visual cues associated with the first user 20 in the proximate vicinity of the computing device 10* for at least a predefined period of time, the absence of the one or more visual cues (e.g., an eye or a face associated with the first user 20*) for at least a predefined period of time being indicative of the first user 20 not being in the proximate vicinity of the computing device 10*. Note that since it is possible for the one or more visual cues (e.g., an eye or a face) of the first user 20 to disappear momentarily for short periods of time (such as when the head of the first user 20 turns to look at something other than the computing device 10*) even though the first user 20 has not actually given up control of the computing device 10* or has not transferred the computing device 10* to another user (e.g., the second user 30), the computing device 10*(or its logic) may not infer, much less conclude, that the computing device 10* has been actually transferred to the second user 30 unless the visual cue (e.g., eye or face of the first user 20) is detected as being absent in the proximate vicinity of the computing device 10* for at least a certain amount of predefined time (e.g., 10 second, 20 seconds, 25 seconds, or some other time period). Further, in some cases, additional indicators (e.g., additional visual cues, detected movements, and/or audio cues) may be required to confirm that the computing device 10* has been transferred from the first user 20 to the second user 30 since the mere detection of the absence of one or more visual cues (e.g., face of the first user 20) may be a weak inference that the computing device 10* has been transferred to the second user 30.

As further illustrated in FIG. 5f, in some implementations, operation 536 may include one or more additional operations including an operation 537 for detecting the absence of the one or more visual cues associated with the first user in the proximate vicinity of the computing device by at least detecting absence of a face associated with the first user in the proximate vicinity of the computing device. For instance, the visual cue detecting module 220 including the face detecting module 222 of the computing device 10 detecting the absence of the one or more visual cues associated with the first user 20 in the proximate vicinity of the computing device 10* when the face detecting module 222 at least detects absence of a face associated with the first user 20 in the proximate vicinity of the computing device 10*. For example, if the computing device 10* includes an image capturing device 304, such as a webcam, then the computing device 10* may detect the absence of a visual cue of the first user 20 that indicates the presence of the first user 20 when the webcam does not detect the face of the first user 20* in the proximate vicinity of the computing device 10* (e.g., within 3 feet, 5 feet, 10 feet, or within some other distance from the computing device 10* that a face of the first user 20 can be detected/identified by the computing device 10*).

In the same or different implementations, operation 536 may include an operation 538 for detecting the absence of the one or more visual cues associated with the first user in the proximate vicinity of the computing device by at least detecting absence of one or more eyes associated with the first user in the proximate vicinity of the computing device as further depicted in FIG. 5f. For instance, the visual cue detecting module 220 including the eye detecting module 223 of the computing device 10* detecting the absence of the one or more visual cues associated with the first user 20 in the proximate vicinity of the computing device 10* when the eye detecting module 223 at least detects absence of one or more eyes associated with the first user 20 in the proximate vicinity of the computing device 10*. For example, if the computing device 10* includes an image capturing device 304, then the computing device 10* may detect the absence of the visual cue of the first user 20 that indicates the presence of the first user 20 when the image capturing device 304 does not detect the one or more eyes of the first user 20* near the computing device 10* (e.g., within 2 feet, 4 feet, 6 feet, or within some other distance from the computing device 10* that a characteristics of an eye, such as a retinal or iris characteristic, of the first user 20 can be detected/identified by the computing device 10*).

In various implementations, operation 526 for determining that the computing device has been transferred from the first user to the second user by at least detecting presence or absence of one or more visual cues in proximate vicinity of the computing device that when detected as occurring at least suggests transfer of the computing device between two users may further include an operation 539 for detecting the presence or absence of the one or more visual cues in the proximate vicinity of the computing device by at least detecting visually that the computing device has moved away from the first user as further depicted in FIG. 5f. For instance, the visual cue detecting module 220 including the visual moving away detecting module 224 (see FIG. 3c) of the computing device 10* detecting the presence or absence of the one or more visual cues in the proximate vicinity of the computing device 10* when the visual moving away detecting module 224 at least detects visually (e.g., via an image capturing device 304) that the computing device 10* has moved away from the first user 20.

Turning now to FIG. 5g, in various implementations, operation 526 may include an operation 540 for detecting the presence or absence of the one or more visual cues in the proximate vicinity of the computing device by at least detecting visually the presence or absence of the one or more visual cues in the proximate vicinity of the computing device and with respect to a specific orientation of the computing device. For instance, the visual cue detecting module 220 of the computing device 10* detecting the presence or absence of the one or more visual cues in the proximate vicinity of the computing device 10* by at least detecting visually (e.g., via one or more image capturing devices 304) the presence or absence of the one or more visual cues in the proximate vicinity of the computing device 10* and with respect to a specific orientation of the computing device 10*. For example detecting the presence or absence of one or more visual cues (e.g., user faces or eyes) on the front-side 17a of the computing device 10* rather than on the back-side 17b of the computing device 10*.

As further illustrated in FIG. 5g, operation 540 may include one or more additional operations in various alternative implementations. For example, in some implementations, operation 540 may include an operation 541 for detecting visually the presence or absence of the one or more visual cues in the proximate vicinity of the computing device and with respect to the specific orientation of the computing device by at least detecting visually the presence or absence of the one or more visual cues at one or more specific locations relative to a front-side of the computing device, the front-side of the computing device being a side of the computing device having a display device. For instance, the visual cue detecting module 220 of the computing device 10* detecting visually the presence or absence of the one or more visual cues in the proximate vicinity of the computing device 10* and with respect to the specific orientation of the computing device 10* by at least detecting visually the presence or absence of the one or more visual cues at one or more specific locations (e.g., predefined locations) relative to a front-side 17a of the computing device 10*, the front-side 17a of the computing device 10* being a side of the computing device 10* having a display device 12.

In some cases, operation 541 may include an operation 542 for detecting visually the presence or absence of the one or more visual cues at the one or more specific locations relative to the front-side of the computing device by detecting visually at least disappearance of one or more features associated with the first user at the one or more specific locations relative to the front-side of the computing device. For instance, the visual cue detecting module 220 of the computing device 10* detecting visually the presence or absence of the one or more visual cues at the one or more specific locations (e.g., predefined locations) relative to the front-side 17a of the computing device 10* by detecting visually at least disappearance of one or more features (e.g., face or one or more eyes) associated with the first user 20 at the one or more specific locations (e.g., predefined locations) relative to the front-side 17a of the computing device 10*.

In some cases, operation 541 may include an operation 543 for detecting visually the presence or absence of the one or more visual cues at the one or more specific locations relative to the front-side of the computing device by detecting visually at least appearance of one or more features associated with the second user at the one or more specific locations relative to the front-side of the computing device. For instance, the visual cue detecting module 220 of the computing device 10* detecting visually the presence or absence of the one or more visual cues at the one or more specific locations relative to the front-side 17a of the computing device 10* by detecting visually at least appearance of one or more features (e.g., a face or one or more eyes) associated with the second user 30 at the one or more specific locations relative to the front-side 17a of the computing device 10*. As those of ordinary skill will recognize, the visual detection of the second user 30 (e.g., the face or one or more eyes of the second user 30) in the proximate vicinity (e.g., immediate surrounding area such as within three, four, or five feet) of the computing device 10* may be in many cases a better indicator that the computing device 10* has been transferred to the second user 30 than the detection of the absence of the first user 20 (e.g., the face or one or more eyes of the first user 20) in the proximate vicinity of the computing device 10*.

In some implementations, operation 426 may include an operation 544 for detecting the presence or absence of the one or more visual cues in the proximate vicinity of the computing device by at least detecting visually one or more gestures exhibited by the first user that when detected as occurring at least suggests transfer of the computing device from the first user to another user. For instance, the visual cue detecting module 220 including the gesture detecting module 225 of the computing device 10* detecting the presence or absence of the one or more visual cues in the proximate vicinity of the computing device 10* when the gesture detecting module 225 detecting visually one or more gestures exhibited by the first user 20 (e.g., the first user 20 extending his/her arm out as if to offer/transfer the computing device 10* to the second user 30) that when detected as occurring at least suggests transfer of the computing device 10* from the first user 20 to another user 30.

Figure 5H:
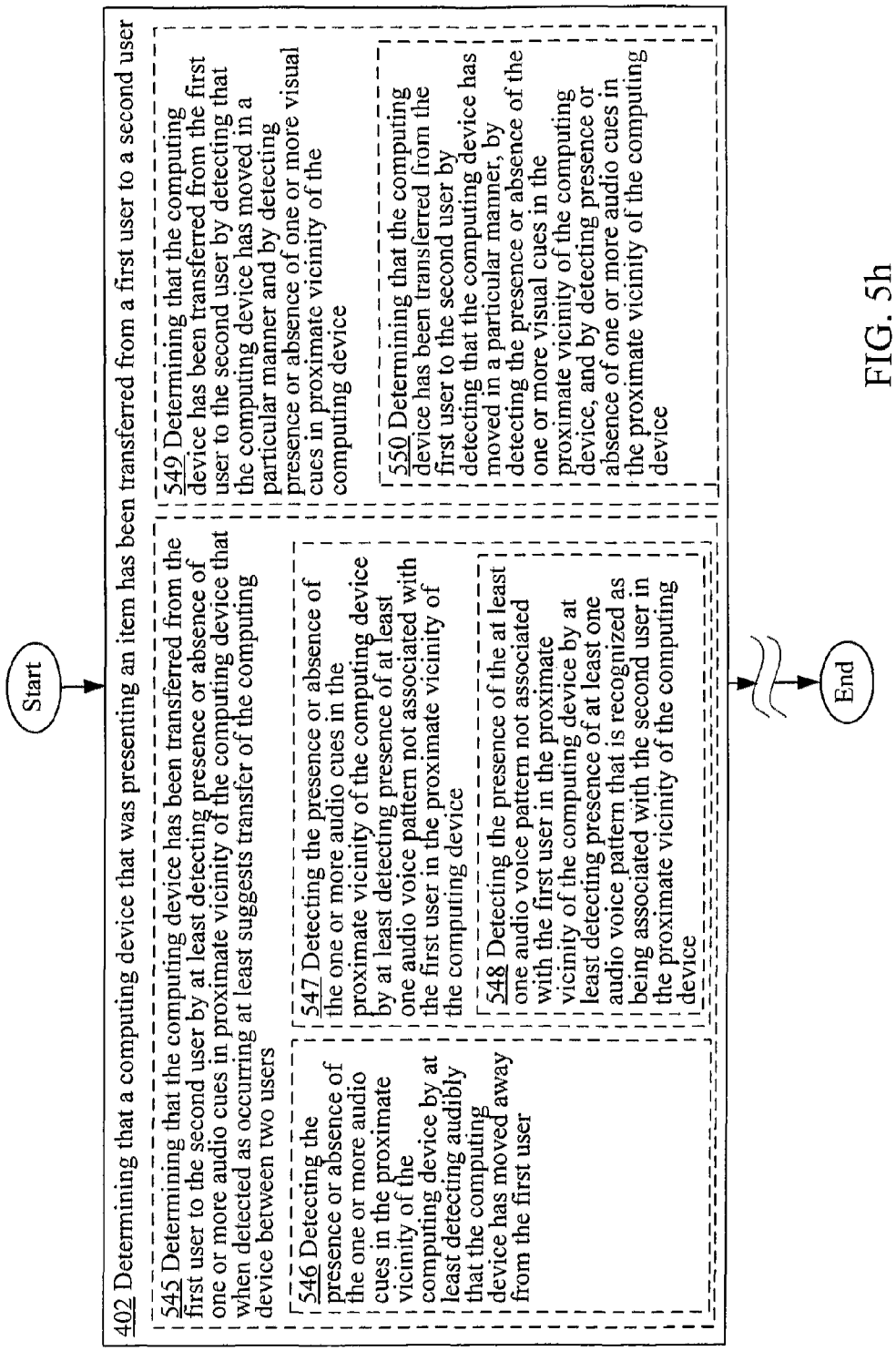
FIG. 5h is a high-level logic flowchart of a process depicting alternate implementations of the transfer determining operation 402 of FIG. 4.

Turning now to FIG. 5h, in some implementations, the transfer determining operation 402 of FIG. 4 may include an operation 545 for determining that the computing device has been transferred from the first user to the second user by at least detecting presence or absence of one or more audio cues in proximate vicinity of the computing device that when detected as occurring at least suggests transfer of the computing device between two users. For instance, the transfer determining module 102* including an audio cue detecting module 226 (see FIG. 3c) of the computing device 10* determining that the computing device 10* has been transferred from the first user 20 to the second user 30 by at least detecting presence or absence of one or more audio cues in proximate vicinity of the computing device 10* that when detected as occurring at least suggests transfer of the computing device 10* between two users.

As further illustrated in FIG. 5h, operation 545 may include one or more additional operations in various alternative implementations. For example, in some implementations, operation 545 may include an operation 546 for detecting the presence or absence of the one or more audio cues in the proximate vicinity of the computing device by at least detecting audibly that the computing device has moved away from the first user. For instance, the audio cue detecting module 226 including the audio moving away detecting module 227 (see FIG. 3c) of the computing device 10* detecting presence or absence of one or more audio cues in the proximate vicinity of the computing device 10* when the audio moving away detecting module 227 at least detects audibly (e.g., using one or more audio capturing device 306) that the computing device 10* has moved away from the first user 20. For example, the audio moving away detecting module 227 detecting that the volume of an audio cue, such as a voice pattern, that is associated with the first user 20 is diminishing or has diminished, which may be an inference that the computing device 10* may be or may have moved away from the first user 20.

In the same or different implementations, operation 545 may additionally or alternatively include an operation 547 for detecting the presence or absence of the one or more audio cues in the proximate vicinity of the computing device by at least detecting presence of at least one audio voice pattern not associated with the first user in the proximate vicinity of the computing device. For instance, the audio cue detecting module 226 including the voice pattern detecting module 228 (see FIG. 3c) of the computing device 10* detecting the presence or absence of the one or more audio cues in the proximate vicinity of the computing device 10* by at least detecting presence of at least one audio voice pattern (e.g., voice of the second user 30) not associated with the first user 20 in the proximate vicinity of the computing device 10*.

In some implementations, operation 547 may further include an operation 548 for detecting the presence of the at least one audio voice pattern not associated with the first user in the proximate vicinity of the computing device by at least detecting presence of at least one audio voice pattern that is recognized as being associated with the second user in the proximate vicinity of the computing device. For instance, the voice pattern detecting module 228 of the computing device 10* detecting the presence of the at least one audio voice pattern not associated with the first user 20 in the proximate vicinity of the computing device 10* by at least detecting presence of at least one audio voice pattern that is recognized by, for example, the endowed logic of the computing device 10* as being associated with the second user 30 in the proximate vicinity of the computing device 10*.

In various implementations, the transfer determining operation 402 of FIG. 4 for determining that a computing device that was presenting an item has been transferred from a first user to a second user may involve determining the transfer of the computing device 10* based on a combination of detecting direct movements of the computing device 10*, detecting visual cues, and/or detecting audio cues. For example, in some implementations and as illustrated in FIG. 5h, the transfer determining operation 402 may include an operation 549 for determining that the computing device has been transferred from the first user to the second user by detecting that the computing device has moved in a particular manner and by detecting presence or absence of one or more visual cues in proximate vicinity of the computing device. For instance, the transfer determining module 102* including the particular movement detecting module 210 and the visual cue detecting module 220 of the computing device 10* determining that the computing device 10* has been transferred from the first user 20 to the second user 30 when the particular movement detecting module 210 detects that the computing device 10* has moved in a particular manner and the visual cue detecting module 220 detects presence or absence of one or more visual cues in proximate vicinity of the computing device 10*.

As further illustrated in FIG. 5h, in some cases, operation 549 may further include an operation 550 for determining that the computing device has been transferred from the first user to the second user by detecting that the computing device has moved in a particular manner, by detecting the presence or absence of the one or more visual cues in the proximate vicinity of the computing device, and by detecting presence or absence of one or more audio cues in the proximate vicinity of the computing device. For instance, the transfer determining module 102* including the particular movement detecting module 210, the visual cue detecting module 220, and the audio cue detecting module 226 of the computing device 10* determining that the computing device 10* has been transferred from the first user 20 to the second user 30 when the particular movement detecting module 210 detects that the computing device 10* has moved in a particular manner, the visual cue detecting module 220 detects the presence or absence of the one or more visual cues in the proximate vicinity of the computing device 10*, and the audio cue detecting module 226 detects presence or absence of one or more audio cues in the proximate vicinity of the computing device 10*.

Figure 5I:
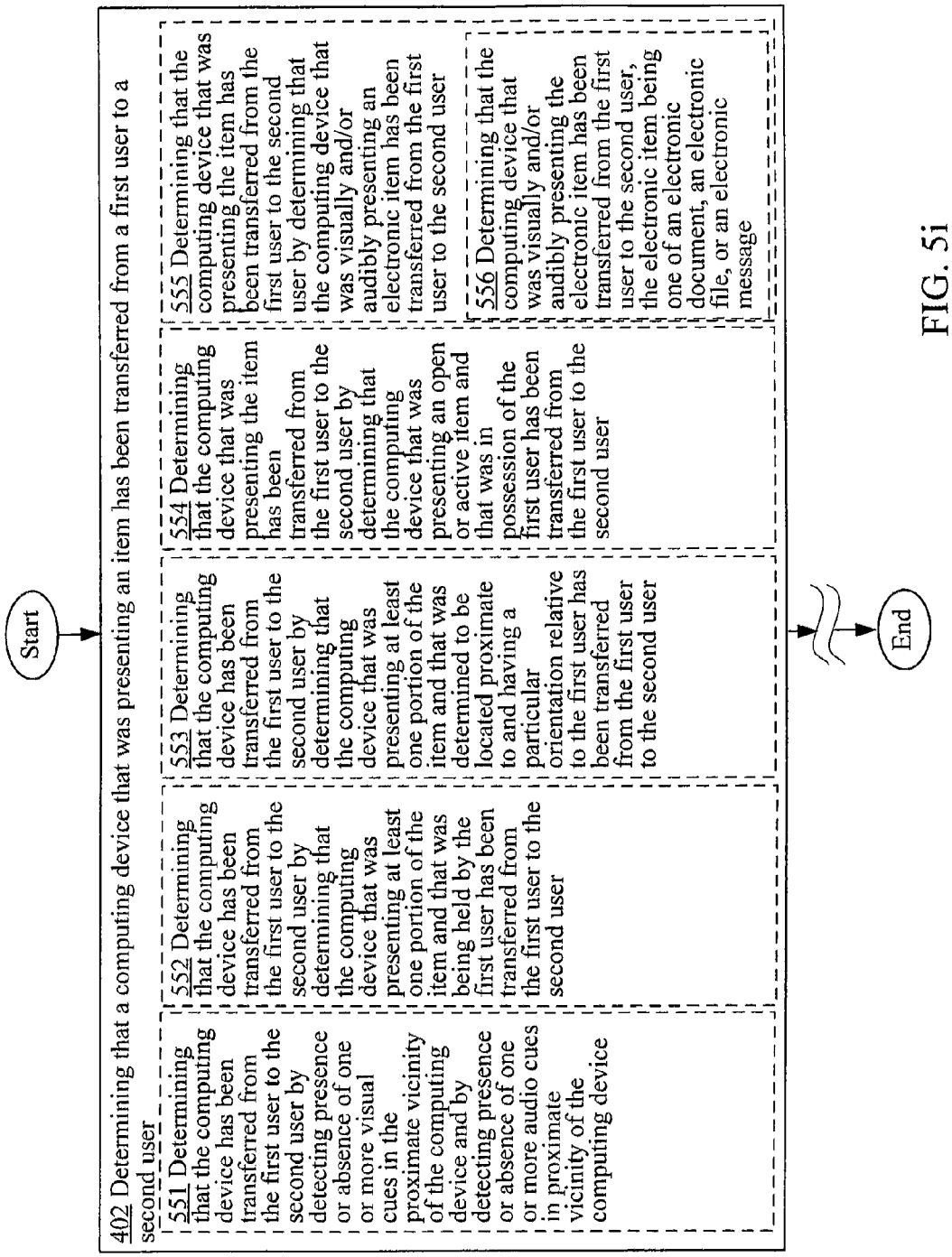
FIG. 5i is a high-level logic flowchart of a process depicting alternate implementations of the transfer determining operation 402 of FIG. 4.

In some alternative implementations, the transfer determining operation 402 may include an operation 551 for determining that the computing device has been transferred from the first user to the second user by detecting presence or absence of one or more visual cues in the proximate vicinity of the computing device and by detecting presence or absence of one or more audio cues in proximate vicinity of the computing device as depicted in FIG. 5i. For instance, the transfer determining module 102* including the visual cue detecting module 220 and the audio cue detecting module 226 of the computing device 10* determining that the computing device 10* has been transferred from the first user 20 to the second user 30 when the visual cue detecting module 220 detects presence or absence of one or more visual cues in the proximate vicinity of the computing device 10* and when the audio cue detecting module 226 detects presence or absence of one or more audio cues in proximate vicinity of the computing device 10*.

As further illustrated in FIG. 5i, in the same or alternative implementations, the transfer determining operation 402 may include an operation 552 for determining that the computing device has been transferred from the first user to the second user by determining that the computing device that was presenting at least one portion of the item and that was being held by the first user has been transferred from the first user to the second user. For instance, the transfer determining module 102* of the computing device 10* determining that the computing device 10* has been transferred from the first user 20 to the second user 30 by determining that the computing device 10* that was presenting at least one portion of the item (e.g., a page from a digital book or a portion of a webpage) and that was being held by the first user 20 (e.g., being in physical contact with the first user 20) has been transferred from the first user 20 to the second user 30.

In the same or different implementations, the transfer determining operation 402 may include an operation 553 for determining that the computing device has been transferred from the first user to the second user by determining that the computing device that was presenting at least one portion of the item and that was determined to be located proximate to and having a particular orientation relative to the first user has been transferred from the first user to the second user. For instance, the transfer determining module 102* of the computing device 10* determining that the computing device 10* has been transferred from the first user 20 to the second user 30 by determining that the computing device 10* that was presenting at least one portion of the item and that was determined to be located proximate to (e.g., within five feet) and having a particular orientation relative to the first user 20 (e.g., front-side 17a facing the first user 20) has been transferred from the first user 20 to the second user 30.

In the same or different implementations, the transfer determining operation 402 may include an operation 554 for determining that the computing device that was presenting the item has been transferred from the first user to the second user by determining that the computing device that was presenting an open or active item and that was in possession of the first user has been transferred from the first user to the second user. For instance, the transfer determining module 102* of the computing device 10* determining that the computing device 10* that was presenting the item has been transferred from the first user 20 to the second user 30 by determining that the computing device 10* that was presenting an open or active item (e.g., an open electronic document or file, an open website, an active application, and so forth) and that was in possession of the first user 20 has been transferred from the first user 20 to the second user 30.

In the same or different implementations, the transfer determining operation 402 may include an operation 555 for determining that the computing device that was presenting the item has been transferred from the first user to the second user by determining that the computing device that was visually and/or audibly presenting an electronic item has been transferred from the first user to the second user. For instance, the transfer determining module 102* of the computing device 10* determining that the computing device 10* that was presenting the item has been transferred from the first user 20 to the second user 30 by determining that the computing device 10* that was visually and/or audibly presenting an electronic item (e.g., a digital book, a video file such as a feature movie, an email, and so forth) has been transferred from the first user 20 to the second user 30.

In some cases, operation 555 may further include an operation 556 for determining that the computing device that was visually and/or audibly presenting the electronic item has been transferred from the first user to the second user, the electronic item being one of an electronic document, an electronic file, or an electronic message. For instance, the transfer determining module 102* of the computing device 10* determining that the computing device 10* that was visually and/or audibly presenting the electronic item has been transferred from the first user 20 to the second user 30, the electronic item being one of an electronic document (e.g., a productivity document such as a word processing or spreadsheet document), an electronic file (e.g., electronic photo album), or an electronic message (e.g., email or text message).

Figure 5J:
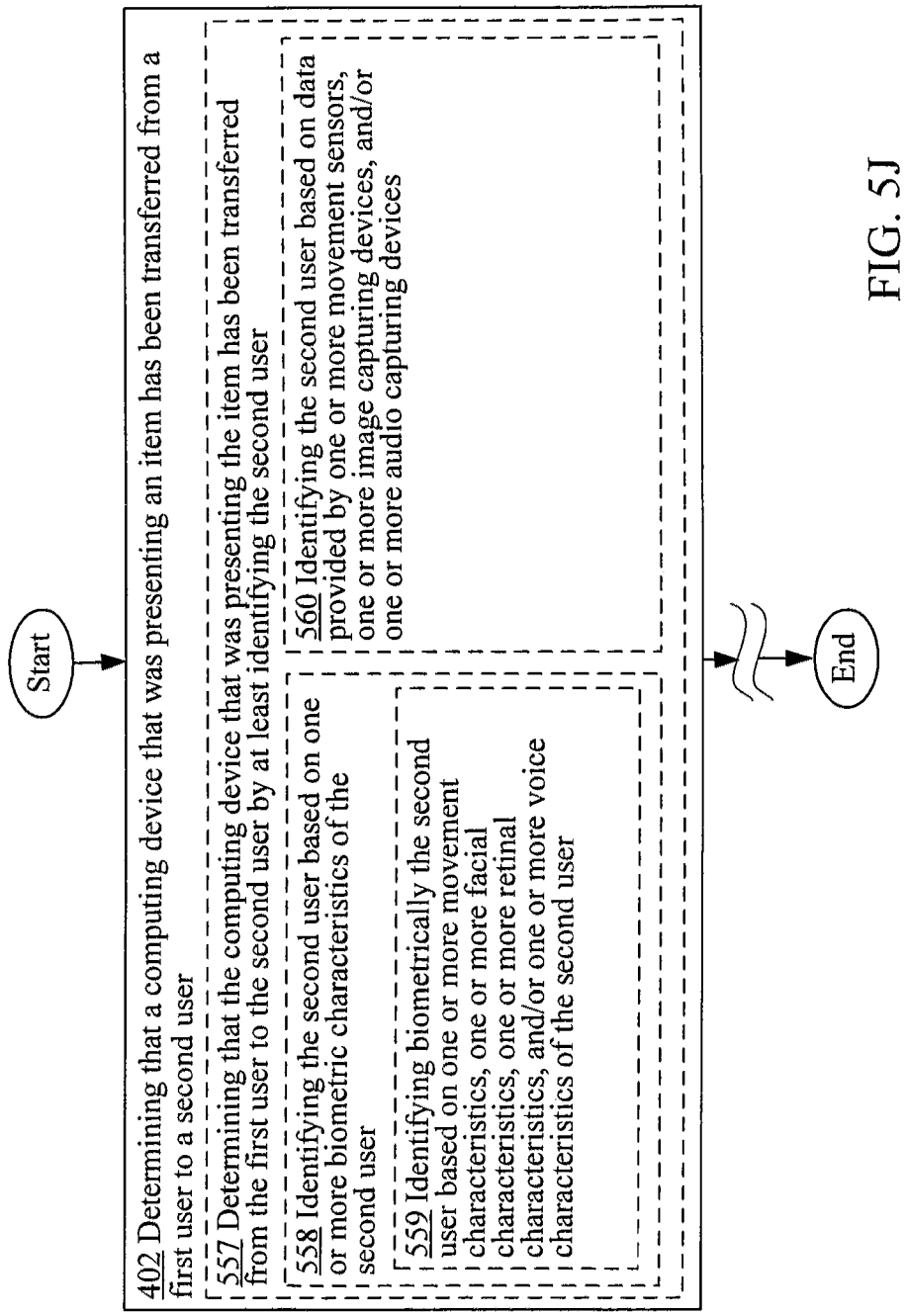
FIG. 5j is a high-level logic flowchart of a process depicting alternate implementations of the transfer determining operation 402 of FIG. 4.

Referring now to FIG. 5J, in various implementations, the transfer determining operation 402 of FIG. 4 may include an operation 557 for determining that the computing device that was presenting the item has been transferred from the first user to the second user by at least identifying the second user. For instance, the transfer determining module 102* including a user identifying module 230 determining that the computing device 10* that was presenting the item has been transferred from the first user 20 to the second user 30 when the user identifying module 230 at least identifies (e.g., recognizes) the second user 30. For example, determining who the second user 30 is and/or determining or recognizing whether the second user 30 has a profile that indicates whether the second user 30 is associated with any specific portion or portions of the item that is being presented by the computing device 10* prior to the transfer of the computing device 10* from the first user 20 to the second user 30.

As further illustrated in FIG. 5J, in various implementations, operation 557 may include one or more operations including in some cases an operation 558 for identifying the second user based on one or more biometric characteristics of the second user. For instance, the biometric user identifying module 232 (see FIG. 3c) of the computing device 10* identifying the second user 30 based on one or more biometric characteristics of the second user 30 as sensed by, for example, one or more sensors 120.

In some implementations, operation 558 may further include an operation 559 for identifying biometrically the second user based on one or more movement characteristics, one or more facial characteristics, one or more retinal characteristics, and/or one or more voice characteristics of the second user. For instance, the biometric user identifying module 232 of the computing device 10* identifying biometrically the second user 30 based on one or more movement characteristics (e.g., as sensed by, for example, one or more movement sensors 302), one or more facial characteristics (e.g., as sensed by one or more image capturing devices 304), one or more retinal characteristics (e.g., as sensed by one or more image capturing devices 304), and/or one or more voice characteristics of the second user 30 (e.g., as sensed by one or more audio capturing devices 306).

In various implementations, operation 557 may include an operation 560 for identifying the second user based on data provided by one or more movement sensors, one or more image capturing devices, and/or one or more audio capturing devices. For instance, the user identifying module 230 of the computing device 10\* identifying the second user 30 based on data provided by one or more movement sensors 302, one or more image capturing devices 304, and/or one or more audio capturing devices 306.

Figure 6A:
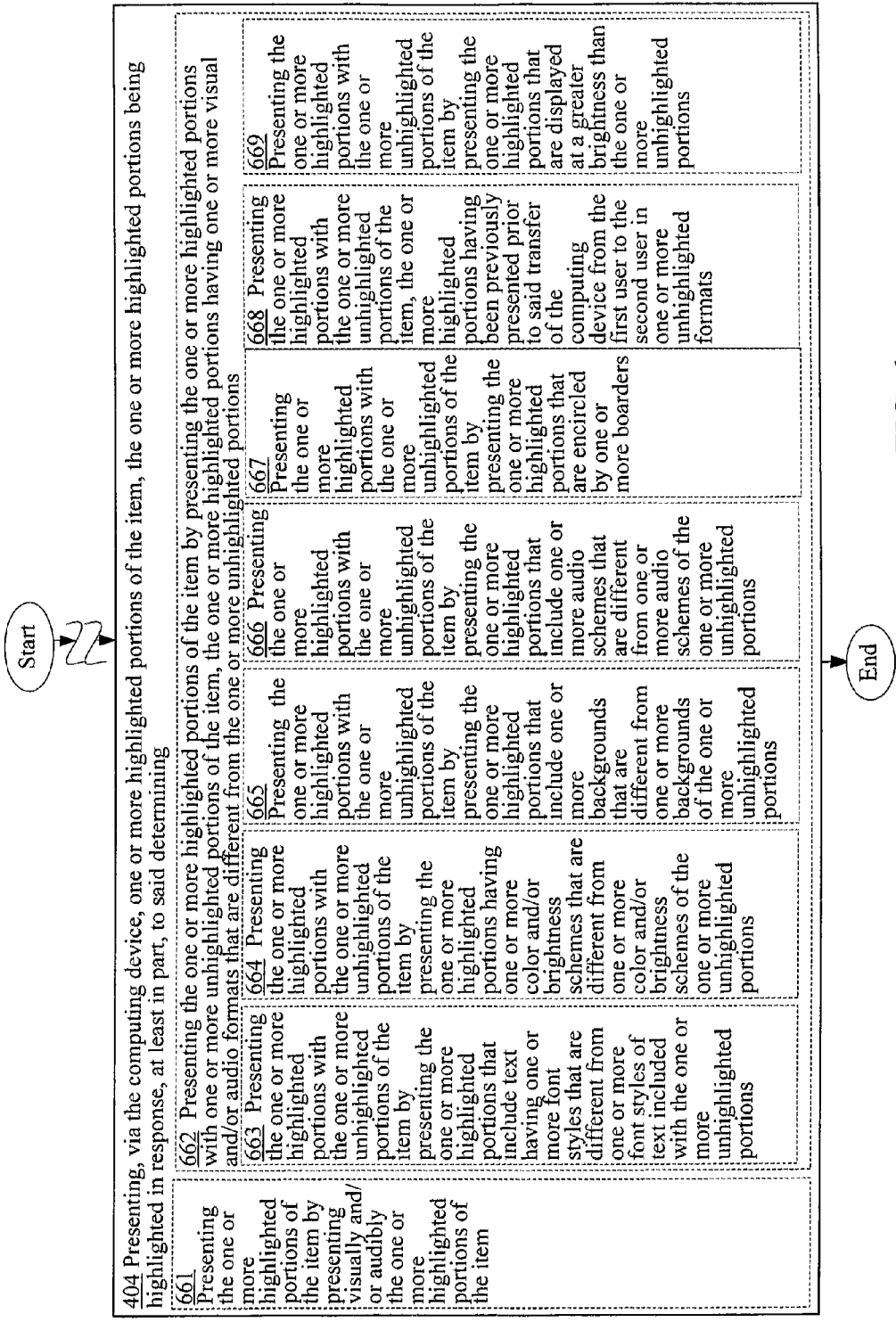
FIG. 6a is a high-level logic flowchart of a process depicting alternate implementations of the highlighted portion presenting operation 404 of FIG. 4.
Figure 6B:
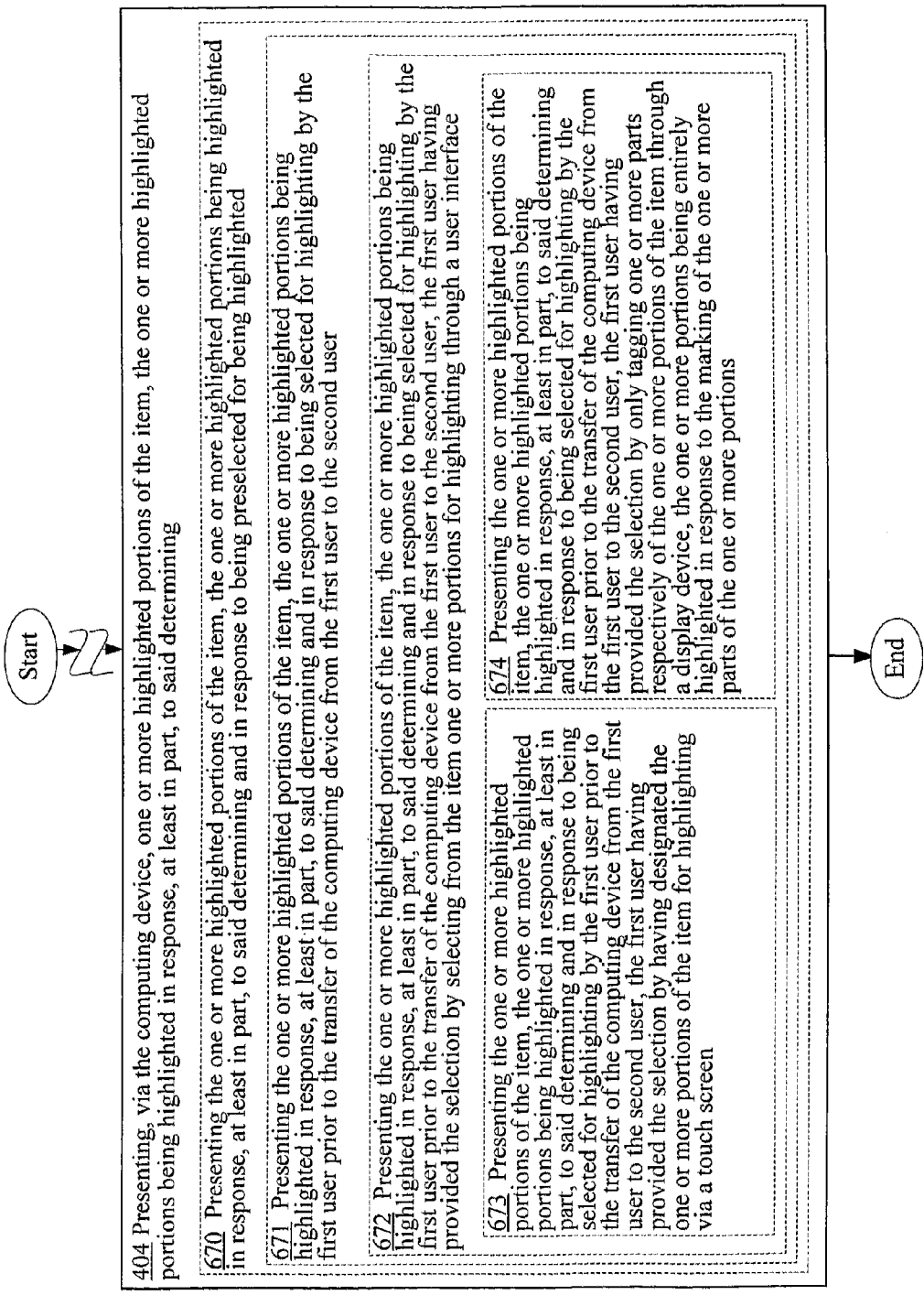
FIG. 6b is a high-level logic flowchart of a process depicting alternate implementations of the highlighted portion presenting operation 404 of FIG. 4.
Figure 6C:
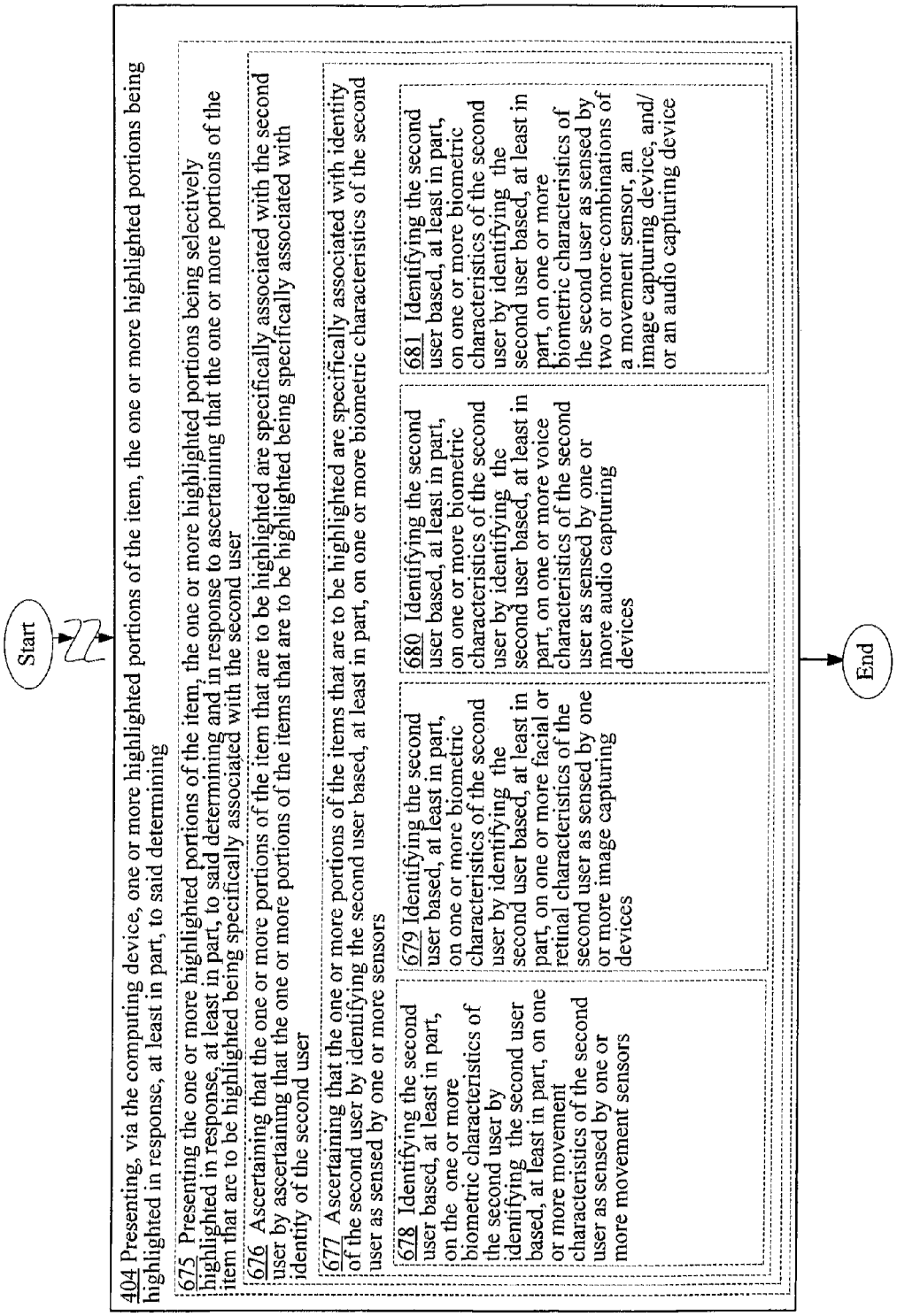
FIG. 6c is a high-level logic flowchart of a process depicting alternate implementations of the highlighted portion presenting operation 404 of FIG. 4.

Referring back to the highlighted portion presenting operation 404 of FIG. 4, the highlighted portion presenting operation 404 similar to the transfer determining operation 402 of FIG. 4 may be executed in a number of different ways in various alternative embodiments as illustrated in FIGS. 6a, 6b, and 6c. In some implementations, for example, the highlighted portion presenting operation 404 of FIG. 4 for presenting, via the computing device, one or more highlighted portions of the item, the one or more highlighted portions being highlighted in response, at least in part, to said determining may include an operation 661 for presenting the one or more highlighted portions of the item by presenting visually and/or audibly the one or more highlighted portions of the item as illustrated in FIG. 6a. For instance, the highlighted portion presenting module 104\* of the computing device 10\* presenting the one or more highlighted portions 702\* of the item 701\* by presenting visually and/or audibly (e.g. via a display monitor 12 such as a touchscreen and/or one or more speakers) the one or more highlighted portions 702\* of the item 701\*.

In the same or alternative implementations, the highlighted portion presenting operation 404 of FIG. 4 may include an operation 662 for presenting the one or more highlighted portions of the item by presenting the one or more highlighted portions with one or more unhighlighted portions of the item, the one or more highlighted portions having one or more visual and/or audio formats that are different from the one or more unhighlighted portions. For instance, the highlighted portion presenting module 104\* including the unhighlighted portion presenting module 234 (see FIG. 3d) of the computing device 10\* presenting the one or more highlighted portions 702\* of the item 701\* by presenting the one or more highlighted portions 792\* with one or more unhighlighted portions 704\* of the item as presented by the unhighlighted portion presenting module 234, the one or more highlighted portions 702\* having one or more visual and/or audio formats (e.g., text or image size and/or audio volume) that are different from the one or more unhighlighted portions 704\*. In various implementations, the one or more visual and/or audio formats to be applied to the one or more highlighted portions may have been selected based, at least in part, on determination that the computing device 10\* was transferred from the first user 20 to the second user 30.

As further illustrated in FIG. 6a, operation 662 may include one or more additional operations in various alternative implementations. For example, in some implementations, operation 662 may include an operation 663 for presenting the one or more highlighted portions with the one or more unhighlighted portions of the item by presenting the one or more highlighted portions that include text having one or more font styles that are different from one or more font styles of text included with the one or more unhighlighted portions. For instance, the highlighted portion presenting module 104\* including the unhighlighted portion presenting module 234 of the computing device 10\* presenting the one or more highlighted portions 702\* with the one or more unhighlighted portions 704\* of the item 701\* by presenting the one or more highlighted portions 702\* that include text having one or more font styles that are different from one or more font styles of text included with the one or more unhighlighted portions 704\*.

In the same or different implementations, operation 662 may include an operation 664 for presenting the one or more highlighted portions with the one or more unhighlighted portions of the item by presenting the one or more highlighted portions having one or more color and/or brightness schemes that are different from one or more color and/or brightness schemes of the one or more unhighlighted portions. For instance, the highlighted portion presenting module 104\* including the unhighlighted portion presenting module 234 of the computing device 10\* presenting the one or more highlighted portions 702\* with the one or more unhighlighted portions 704\* of the item 701\* by presenting the one or more highlighted portions 702\* having one or more color and/or brightness schemes (e.g., increased brightness or different color or colors for the background of the highlighted portion or portions 702\*) that are different from one or more color and/or brightness schemes of the one or more unhighlighted portions 704\*.

In the same or different implementations, operation 662 may include an operation 665 for presenting the one or more highlighted portions with the one or more unhighlighted portions of the item by presenting the one or more highlighted portions that include one or more backgrounds that are different from one or more backgrounds of the one or more unhighlighted portions. For instance, the highlighted portion presenting module 104\* including the unhighlighted portion presenting module 234 of the computing device 10\* presenting the one or more highlighted portions 702\* with the one or more unhighlighted portions 704\* of the item 701\* by presenting the one or more highlighted portions 702\* that include one or more backgrounds (e.g., having different background color or pattern) that are different from one or more backgrounds of the one or more unhighlighted portions 704\*.

In the same or different implementations, operation 662 may include an operation 666 for presenting the one or more highlighted portions with the one or more unhighlighted portions of the item by presenting the one or more highlighted portions that include one or more audio schemes that are different from one or more audio schemes of the one or more unhighlighted portions. For instance, the highlighted portion presenting module 104\* including the unhighlighted portion presenting module 234 of the computing device 10\* presenting the one or more highlighted portions 702\* with the one or more unhighlighted portions 704\* of the item 701\* by presenting the one or more highlighted portions 702\* that include one or more audio schemes (e.g., increase audio volume or more bass) that are different from one or more audio schemes of the one or more unhighlighted portions 704\*.

In the same or different implementations, operation 662 may include an operation 667 for presenting the one or more highlighted portions with the one or more unhighlighted portions of the item by presenting the one or more highlighted portions that are encircled by one or more boarders. For instance, the highlighted portion presenting module 104\* including the unhighlighted portion presenting module 234 of the computing device 10* presenting the one or more highlighted portions 702* with the one or more unhighlighted portions 704* of the item 701* by presenting the one or more highlighted portions 702* that are encircled by one or more boarders 706 (see FIG. 7d). In various embodiments, the one or more boarders 706 to encircle the one or more highlighted portions 702* may be in the form of one or more lines or other types of boarders.

In the same or different implementations, operation 662 may include an operation 668 for presenting the one or more highlighted portions with the one or more unhighlighted portions of the item, the one or more highlighted portions having been previously presented prior to said transfer of the computing device from the first user to the second user in one or more unhighlighted formats. For instance, the highlighted portion presenting module 104* including the unhighlighted portion presenting module 234 of the computing device 10* presenting the one or more highlighted portions 702* with the one or more unhighlighted portions 704* of the item 701*, the one or more highlighted portions 702* having been previously presented prior to said transfer of the computing device 10* from the first user 20 to the second user 30 in one or more unhighlighted formats.

In the same or different implementations, operation 662 may include an operation 669 for presenting the one or more highlighted portions with the one or more unhighlighted portions of the item by presenting the one or more highlighted portions that are displayed at a greater brightness than the one or more unhighlighted portions. For instance, the highlighted portion presenting module 104* including the unhighlighted portion presenting module 234 of the computing device 10* presenting the one or more highlighted portions 702* with the one or more unhighlighted portions 704* of the item 701* by presenting the one or more highlighted portions 702* that are displayed via, for example, a display device 12 at a greater brightness than the one or more unhighlighted portions 704*.

In some cases the one or more highlighted portions 702* of the item 701* to be presented through the highlighted portion presenting operation 404 of FIG. 4 may have been previously selected form of highlighting. For example, and referring now to FIG. 6b, in various implementations, the highlighted portion presenting operation 404 of FIG. 4 may include an operation 670 for presenting the one or more highlighted portions of the item, the one or more highlighted portions being highlighted in response, at least in part, to said determining and in response to being preselected for being highlighted. For instance, the highlighted portion presenting module 104* of the computing device 10* presenting the one or more highlighted portions 702* of the item 701*, the one or more highlighted portions 702* being highlighted in response, at least in part, to determining that the computing device 10* has been transferred from the first user 20 to the second user 30 and in response to being preselected (e.g., selected by the first user 20 or by a third party prior to the transfer of the computing device 10*) for being highlighted.

As further illustrated in FIG. 6b, operation 670 may include one or more additional operations in various alternative implementations. For example, in some implementations, operation 670 may include an operation 671 for presenting the one or more highlighted portions of the item, the one or more highlighted portions being highlighted in response, at least in part, to said determining and in response to being selected for highlighting by the first user prior to the transfer of the computing device from the first user to the second user. For instance, the highlighted portion presenting module 104* of the computing device 10* presenting the one or more highlighted portions 702* of the item 701*, the one or more highlighted portions 702* being highlighted in response, at least in part, to the determining that the computing device 10* has been transferred from the first user 20 to the second user 30 and in response to being selected for highlighting by the first user 20 as detected by, for example, the highlighting selection detecting module 106*(see FIGS. 3a and 3b) prior to the transfer of the computing device 10* from the first user 20 to the second user 30.

Operation 671, in turn, may include an operation 672 for presenting the one or more highlighted portions of the item, the one or more highlighted portions being highlighted in response, at least in part, to said determining and in response to being selected for highlighting by the first user prior to the transfer of the computing device from the first user to the second user, the first user having provided the selection by selecting from the item one or more portions for highlighting through a user interface in some implementations. For instance, the highlighted portion presenting module 104* of the computing device 10* presenting the one or more highlighted portions 702* of the item 701*, the one or more highlighted portions 702* being highlighted in response, at least in part, to determining that the computing device 10* has been transferred from the first user 20 to the second user 30 and in response to being selected for highlighting by the first user 20 as detected by, for example, the highlighting selection detecting module 106* prior to the transfer of the computing device 10* from the first user 20 to the second user 30, the first user 20 having provided the selection by selecting from the item 701b one or more portions (e.g., highlighted portions 702* prior to transfer) for highlighting through a user interface 110 (e.g., a touch screen, a keypad or a keyboard, a mouse, and so forth).

In some cases, operation 672 may further include an operation 673 for presenting the one or more highlighted portions of the item, the one or more highlighted portions being highlighted in response, at least in part, to said determining and in response to being selected for highlighting by the first user prior to the transfer of the computing device from the first user to the second user, the first user having provided the selection by having designated the one or more portions of the item for highlighting via a touch screen. For instance, the highlighted portion presenting module 104* of the computing device 10* presenting the one or more highlighted portions 702* of the item 701*, the one or more highlighted portions 702* being highlighted in response, at least in part, to determining that the computing device 10* has been transferred from the first user 20 to the second user 30 and in response to being selected for highlighting by the first user 20* as detected by, for example, the highlighting selection detecting module 106* prior to the transfer of the computing device 10* from the first user 20 to the second user 30, the first user 20 having provided the selection by having designated the one or more portions of the item 701* for highlighting via a touch screen (e.g., display device 12). In various implementations, the first user 20 may select one or more portions of an item 701* for highlighting by simply marking (e.g., tagging) the one or more portions to be highlighted via, for example, a touch screen. The marking of the one or more portions may be by, for example, circling 710, checking or x-ing 712, writing a line 714, next to the portion to be highlighted, and so forth as illustrated in FIG. 7a, In various implementations, the selection of the portion or portions to be highlighted may be accomplished without having to highlight (e.g., highlight entirely) each of the portion or portions to be highlighted, but by merely marking or tagging only part or parts of each of the portions of the item 701* to be highlighted.

For example, in some cases, operation 672 may include an operation 674 for presenting the one or more highlighted portions of the item, the one or more highlighted portions being highlighted in response, at least in part, to said determining and in response to being selected for highlighting by the first user prior to the transfer of the computing device from the first user to the second user, the first user having provided the selection by only tagging one or more parts respectively of the one or more portions of the item through a display device, the one or more portions being entirely highlighted in response to the marking of the one or more parts of the one or more portions. For instance, the highlighted portion presenting module 104* of the computing device 10* presenting the one or more highlighted portions 702* of the item 701*, the one or more highlighted portions 702* being highlighted in response, at least in part, to determining that the computing device 10* has been transferred from the first user 20 to the second user 30 and in response to being selected for highlighting by the first user 20 as detected by, for example, the highlighting selection detecting module 106* prior to the transfer of the computing device 10* from the first user 20 to the second user 30, the first user 20 having provided the selection by only tagging (e.g., marking by writing a check marking, clicking, tapping, etc.) one or more parts respectively of the one or more portions of the item 702* through a display device 12, the one or more portions being entirely highlighted in response to the marking of the one or more parts of the one or more portions. In other words, if the first user 20 wishes to highlight certain portions of an item 702* after the computing device 10* has been transferred to the second user 30, then the first user 20 may merely mark or tag only part of the portion to be highlighted by simply writing, tapping, or clicking only part of the portion of the item to be highlighted. Thus, in some cases, an item 701* may be divided into multiple portions. For example, in the example item 701*a*, each of the illustrated paragraphs may be distinct portions of the item 701*b*. A user, such as first user 20, may select a particular portion for highlighting merely by writing a check mark (e.g., or clicking or tapping via a touch screen) only a small part of the portion to be highlighted.

In some cases, the highlighted portion presenting operation 404 of FIG. 4 may involve highlighting only those portion or portions of the item 701* that are determined to be linked to the second user 30. For example, and referring now to FIG. 6*c*, in various implementations, the highlighted portion presenting operation 404 of FIG. 4 may include an operation 675 for presenting the one or more highlighted portions of the item, the one or more highlighted portions being selectively highlighted in response, at least in part, to said determining and in response to ascertaining that the one or more portions of the item that are to be highlighted being specifically associated with the second user. For instance, the highlighted portion presenting module 104* including the user association ascertaining module 236 (see FIG. 3*d*) of the computing device 10* presenting the one or more highlighted portions 702* of the item 701*, the one or more highlighted portions 702* being selectively highlighted in response, at least in part, to determining that the computing device 10* has been transferred from the first user 20 to the second user 30 and in response to the user association ascertaining module 236 ascertaining that the one or more portions 702*of the item 701* that are to be highlighted being specifically associated with the second user 30 (while those portions of the item 701* that are ascertained to be not associated with the second user 30 not being highlighted).

As further illustrated in 6*c*, in various implementations, operation 675 may include one or more additional operations in various alternative implementations. For example, in some implementations, operation 675 may include an operation 676 for ascertaining that the one or more portions of the item that are to be highlighted are specifically associated with the second user by ascertaining that the one or more portions of the items that are to be highlighted being specifically associated with identity of the second user. For instance, the user association ascertaining module 236 including the user identity association ascertaining module 238 (see FIG. 3*d*) of the computing device 10* ascertaining that the one or more portions (e.g., one or more highlighted portions 702*) of the item 701* that are to be highlighted are specifically associated with the second user 30 when the user identity association ascertaining module 238 ascertains that the one or more portions of the items that are to be highlighted are specifically associated with identity (e.g., biometric characteristics or user ID credentials such as username) of the second user 30.

In some cases, operation 676 may in turn include an operation 677 for ascertaining that the one or more portions of the items that are to be highlighted are specifically associated with identity of the second user by identifying the second user based, at least in part, on one or more biometric characteristics of the second user as sensed by one or more sensors. For instance, the user identity association ascertaining module 238 including the user identifying module 240 (see FIG. 3*d*) of the computing device 10* ascertaining that the one or more portions (see, for example, highlighted portion 720*f* of FIG. 7*f*) of the items 701* that are to be highlighted are specifically associated with identity of the second user 30 when the user identifying module 240 at least identifies the second user 30 based, at least in part, on one or more biometric characteristics of the second user 30 as sensed by one or more sensors 120. Note that in some implementations, the user identifying module 240 of FIG. 3*d* may be the same module as the user identifying module 230 of FIG. 3*c*.

In some implementations, operation 677 may include an operation 678 for identifying the second user based, at least in part, on the one or more biometric characteristics of the second user by identifying the second user based, at least in part, on one or more movement characteristics of the second user as sensed by one or more movement sensors. For instance, the user identifying module 240 of the computing device 10* identifying the second user 30* based, at least in part, on the one or more biometric characteristics of the second user 30 by identifying the second user 30 based, at least in part, on one or more movement characteristics (e.g., signature movements including, for example, signature heart or pulse vibration or signature gestures) of the second user 30 as sensed by one or more movement sensors 302.

In some implementations, operation 677 may include an operation 679 for identifying the second user based, at least in part, on one or more biometric characteristics of the second user by identifying the second user based, at least in part, on one or more facial or retinal characteristics of the second user as sensed by one or more image capturing devices. For instance, the user identifying module 240 of the computing device 10* identifying the second user 30* based, at least in part, on one or more biometric characteristics of the second user 30 by identifying the second user 30 based, at least in part, on one or more facial or retinal characteristics of the second user 30 as sensed by one or more image capturing devices 304.

In some implementations, operation 677 may include an operation 680 for identifying the second user based, at least in part, on one or more biometric characteristics of the second user by identifying the second user based, at least in part, on one or more voice characteristics of the second user as sensed by one or more audio capturing devices. For instance, the user identifying module 240 of the computing device 10\* identifying the second user 30\* based, at least in part, on one or more biometric characteristics of the second user 30 by identifying the second user 30 based, at least in part, on one or more voice characteristics (e.g., signature voice pattern) of the second user 30 as sensed by one or more audio capturing device 306.

In some implementations, operation 677 may include an operation 681 for identifying the second user based, at least in part, on one or more biometric characteristics of the second user by identifying the second user based, at least in part, on one or more biometric characteristics of the second user as sensed by two or more combinations of a movement sensor, an image capturing device, and/or an audio capturing device. For instance, the user identifying module 240 of the computing device 10\* identifying the second user 30\* based, at least in part, on one or more biometric characteristics of the second user 30 by identifying the second user 30 based, at least in part, on one or more biometric characteristics of the second user 30 as sensed by at least two or more combinations of a movement sensor 302, an image capturing device 304, and/or an audio capturing device 306.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The invention claimed is:

1. A system comprising:
a transfer determining module configured to determine that a computing device, that was presenting an item, has been transferred from a first user to a second user, the transfer determining module including at least:
a visual cue detecting module configured to determine that the computing device has been transferred from the first user to the second user when the visual cue detecting module at least detects presence or absence of one or more visual cues in proximate vicinity of the computing device that when detected as occurring at least suggested transfer of the computing device between the first and second users, the visual cue detecting module including at least:
a gesture detecting module configured to detect the presence or absence of the one or more visual cues in the proximate vicinity of the computing device when the gesture detecting module at least detects visually one or more gestures exhibited by the first user that when detected as occurring at least suggested transfer of the computing device from the first user to the second user at least in part by the first user moving the computing device at least in part with the one or more gestures; and
a highlighted portion presenting module configured to present, via the computing device, one or more highlighted portions of the item, the highlighted portion presenting module being responsive at least in part to the transfer determining module configured to determine that a computing device, that was presenting an item, has been transferred from a first user to a second user, the highlighted portion presenting module being configured to present the one or more highlighted portions of the item responsive at least in part to the transfer determining module and to a highlighting selection detecting module, the highlighting selection detection module configured to detect, prior to the transfer of the computing device from the first user to the second user, that the first user has at least one of marked or tagged at least one or more parts of the one or more portions to select the one or more portions for highlighting.

2. The system of claim 1, wherein said transfer determining module configured to determine that a computing device, that was presenting an item, has been transferred from a first user to a second user comprises:
a transfer determining module configured to determine that the computing device has been transferred from the first user to the second user based, at least in part, on data provided by one or more sensors.

3. The system of claim 1, wherein said transfer determining module configured to determine that a computing device, that was presenting an item, has been transferred from a first user to a second user comprises:
a transfer determining module configured to determine that the computing device has been transferred from the first user to the second user based, at least in part, on data provided by one or more movement sensors.

4. The system of claim 1, wherein said transfer determining module configured to determine that a computing device, that was presenting an item, has been transferred from a first user to a second user comprises:
a transfer determining module configured to determine that the computing device has been transferred from the first user to the second user based, at least in part, on data provided by at least one of a movement sensor, an image capturing device, or an audio capturing device.

5. The system of claim 1, wherein said transfer determining module configured to determine that a computing device, that was presenting an item, has been transferred from a first user to a second user, the transfer determining module including at least a visual cue detecting module configured to determine that the computing device has been transferred from the first user to the second user when the visual cue detecting module at least detects presence or absence of one or more visual cues in proximate vicinity of the computing device that when detected as occurring at least suggested transfer of the computing device between the first and second users, the visual cue detecting module including at least a gesture detecting module configured to detect the presence or absence of the one or more visual cues in the proximate vicinity of the computing device when the gesture detecting module at least detects visually one or more gestures exhibited by the first user that when detected as occurring at least suggested transfer of the computing device from the first user to the second user at least in part by the first user moving the computing device at least in part with the one or more gestures comprises:
a particular movement detecting module configured to determine that the computing device has been transferred from the first user to the second user when the particular movement detecting module at least detects that the computing device has moved in a particular manner that when detected as occurring at least suggested that the computing device has been transferred between the first and second users.

6. The system of claim 5, wherein said particular movement detecting module comprises:
a tilt detecting module configured to detect that the computing device has moved in the particular manner when the tilt detecting module at least detects that the computing device is no longer in a particular tilt orientation that the computing device was detected as having when the computing device was in possession of the first user prior to said transfer.

7. The system of claim 6, wherein said tilt detecting module comprises:
a tilt detecting module configured to detect that the computing device is no longer in a particular tilt orientation that the computing device was detected as having when the computing device was in the possession of the first user by at least detecting that the computing device has been reoriented from the particular tilt orientation to another tilt orientation having an angular tilt that is at least a predefined percentage different from an angular tilt associated with the particular tilt orientation that the computing device was detected as having when the computing device was in the possession of the first user.

8. The system of claim 5, wherein said particular movement detecting module comprises:
a spatial location detecting module configured to detect that the computing device has moved in the particular manner when the spatial location detecting module at least detects that the computing device is no longer at a particular spatial location that the computing device was detected as being located at when the computing device was in possession of the first user prior to said transfer.

9. The system of claim 8, wherein said spatial location detecting module comprises:
a spatial location detecting module configured to detect that the computing device is no longer at a particular spatial location that the computing device was detected as being located at when the computing device was in the possession of the first user prior to said transfer by at least detecting that the computing device has been relocated from the particular spatial location to another spatial location that is at least a predefined distance away from the particular spatial location that the computing device was detected as being located at when the computing device was in the possession of the first user prior to said transfer.

10. The system of claim 5, wherein said particular movement detecting module comprises:
a spin rotation detecting module configured to detect that the computing device has moved in the particular manner when the spin rotation detecting module at least detects that the computing device has been spin rotated from a first orientation to a second orientation, the first orientation being an orientation associated with the computing device when the computing device was in possession of the first user prior to said transfer.

11. The system of claim 5, wherein said particular movement detecting module comprises:
a moving away detecting module configured to detect that the computing device has moved in the particular manner when the moving away detecting module at least detects that the computing device has moved away from the first user.

12. The system of claim 11, wherein said moving away detecting module comprises:
a moving away detecting module configured to detect that the computing device has moved away from the first user by at least detecting that the computing device has moved a predefined distance away from the first user.

13. The system of claim 5, wherein said particular movement detecting module comprises:
a vibration detecting module configured to detect that the computing device has moved in the particular manner when the vibration detecting module at least detects that the computing device is no longer vibrating in a manner that matches with a vibration pattern that the computing device was detected as having when the computing device was in possession of the first user prior to said transfer.

14. The system of claim 13, wherein said vibration detecting module comprises:
- a vibration detecting module configured to detect that the computing device is no longer vibrating in the manner that matches with the vibration pattern that the computing device was detected as having when the computing device was in the possession of the first user prior to said transfer by at least detecting that the computing device is vibrating in a manner that matches with a signature vibration pattern associated with the second user.

15. The system of claim 5, wherein said particular movement detecting module comprises:
- a vibration detecting module configured to detect that the computing device has moved in the particular manner when the vibration detecting module at least detects that the computing device is not vibrating in a manner that matches with a signature vibration pattern that is associated with the first user.

16. The system of claim 5, wherein said particular movement detecting module comprises:
- a three-dimensional movement detecting module configured to detect that the computing device has moved in the particular manner when the three-dimensional movement detecting module at least detects that the computing device has moved in a particular three-dimensional way that at least suggested that the computing device has been transferred between the first and second users.

17. The system of claim 16, wherein said three-dimensional movement detecting module comprises:
- a three-dimensional movement detecting module configured to detect that the computing device has moved in the particular three-dimensional way that at least suggested that the computing device has been transferred between two users by detecting that the computing device is exhibiting one or more three-dimensional movements that matches with one or more signature three-dimensional movements that when detected as occurring at least suggested transfer of the computing device between the first and second users.

18. The system of claim 17, wherein said three-dimensional movement detecting module comprises:
- a three-dimensional movement detecting module configured to detect that the computing device is exhibiting one or more three-dimensional movements that matches with the one or more signature three-dimensional movements by detecting that the computing device is exhibiting one or more three-dimensional movements that matches with one or more signature three-dimensional movements that are particularly associated with the first user and that when detected as occurring at least suggested transfer of the computing device from the first user to the second user.

19. The system of claim 16, wherein said three-dimensional movement detecting module configured to detect that the computing device has moved in the particular manner when the three-dimensional movement detecting module at least detects that the computing device has moved in a particular three-dimensional way that at least suggested that the computing device has been transferred between two users comprises:
- a three-dimensional movement detecting module configured to detect that the computing device has moved in the particular manner when the three-dimensional movement detecting module at least detects that the computing device has moved in a particular three-dimensional way that matches one or more three-dimensional movements stored in a movement library stored in one or more memories, the movement library cataloging one or more three-dimensional movements of the computing device that when detected imply a transfer of the computing device between the first and second users.

20. The system of claim 1, wherein said visual cue detecting module including at least a gesture detecting module configured to detect the presence or absence of the one or more visual cues in the proximate vicinity of the computing device when the gesture detecting module at least detects visually one or more gestures exhibited by the first user that when detected as occurring at least suggested transfer of the computing device from the first user to the second user at least in part by the first user moving the computing device at least in part with the one or more gestures comprises:
- a lighting change detecting module configured to detect the presence or absence of the one or more visual cues in the proximate vicinity of the computing device when the lighting change detecting module detects at least a change in lighting in the proximate vicinity of the computing device that when detected as occurring at least suggested that the computing device has at least moved.

21. The system of claim 1, wherein said visual cue detecting module including at least a gesture detecting module configured to detect the presence or absence of the one or more visual cues in the proximate vicinity of the computing device when the gesture detecting module at least detects visually one or more gestures exhibited by the first user that when detected as occurring at least suggested transfer of the computing device from the first user to the second user at least in part by the first user moving the computing device at least in part with the one or more gestures comprises:
- a face detecting module configured to detect the presence or absence of the one or more visual cues in the proximate vicinity of the computing device when the face detecting module at least detects presence of a first face associated with the first user and a second face associated with the second user in the proximate vicinity of the computing device, the second face being detected as being closer to the computing device than the first face.

22. The system of claim 1, wherein said visual cue detecting module including at least a gesture detecting module configured to detect the presence or absence of the one or more visual cues in the proximate vicinity of the computing device when the gesture detecting module at least detects visually one or more gestures exhibited by the first user that when detected as occurring at least suggested transfer of the computing device from the first user to the second user at least in part by the first user moving the computing device at least in part with the one or more gestures comprises:
- an eye detecting module configured to detect the presence or absence of the one or more visual cues in the proximate vicinity of the computing device when the eye detecting module at least detects presence of a first one or more eyes associated with the first user and a second one or more eyes associated with the second user in the proximate vicinity of the computing device, the second one or more eyes being detected as being closer to the computing device than the first one or more eyes.

23. The system of claim 1, wherein said visual cue detecting module including at least a gesture detecting module configured to detect the presence or absence of the one or more visual cues in the proximate vicinity of the computing device when the gesture detecting module at least detects visually one or more gestures exhibited by the first user that when detected as occurring at least suggested transfer of the computing device from the first user to the second user at least in part by the first user moving the computing device at least in part with the one or more gestures comprises:
- a visual moving away detecting module configured to detect the presence or absence of the one or more visual cues in the proximate vicinity of the computing device when the visual moving away detecting module at least detects visually that the computing device has moved away from the first user.

24. The system of claim 1, wherein said transfer determining module configured to determine that a computing device, that was presenting an item, has been transferred from a first user to a second user comprises:
- an audio cue detecting module configured to detect that the computing device has been transferred from the first user to the second user when the audio cue detecting module at least detects presence or absence of one or more audio cues in proximate vicinity of the computing device that when detected as occurring at least suggested transfer of the computing device between the first and second users.

25. The system of claim 24, wherein said audio cue detecting module comprises:
- an audio moving away detecting module configured to detect the presence or absence of the one or more audio cues in the proximate vicinity of the computing device when the audio moving away detecting module at least detects audibly that the computing device has moved away from the first user.

26. The system of claim 24, wherein said audio cue detecting module comprises:
- a voice pattern detecting module configured to detect the presence or absence of the one or more audio cues in the proximate vicinity of the computing device when the voice pattern detecting module at least detects presence of at least one audio voice pattern not associated with the first user in the proximate vicinity of the computing device.

27. The system of claim 1, wherein said transfer determining module configured to determine that a computing device, that was presenting an item, has been transferred from a first user to a second user, the transfer determining module including at least a visual cue detecting module configured to determine that the computing device has been transferred from the first user to the second user when the visual cue detecting module at least detects presence or absence of one or more visual cues in proximate vicinity of the computing device that when detected as occurring at least suggested transfer of the computing device between the first and second users, the visual cue detecting module including at least a gesture detecting module configured to detect the presence or absence of the one or more visual cues in the proximate vicinity of the computing device when the gesture detecting module at least detects visually one or more gestures exhibited by the first user that when detected as occurring at least suggested transfer of the computing device from the first user to the second user at least in part by the first user moving the computing device at least in part with the one or more gestures comprises:
- a particular movement detecting module and a visual cue detecting module configured to determine that the computing device has been transferred from the first user to the second user when the particular movement detecting module detects that the computing device has moved in a particular manner and when the visual cue detecting module detects presence or absence of one or more visual cues in proximate vicinity of the computing device.

28. The system of claim 27, wherein said transfer determining module including a particular movement detecting module and a visual cue detecting module comprises:
- a particular movement detecting module, a visual cue detecting module, and an audio cue detecting module configured to determine that the computing device has been transferred from the first user to the second user when the particular movement detecting module detects that the computing device has moved in a particular manner, the visual cue detecting module detects the presence or absence of the one or more visual cues in the proximate vicinity of the computing device, and the audio cue detecting module detects presence or absence of one or more audio cues in the proximate vicinity of the computing device.

29. The system of claim 1, wherein said transfer determining module configured to determine that a computing device, that was presenting an item, has been transferred from a first user to a second user, the transfer determining module including at least a visual cue detecting module configured to determine that the computing device has been transferred from the first user to the second user when the visual cue detecting module at least detects presence or absence of one or more visual cues in proximate vicinity of the computing device that when detected as occurring at least suggested transfer of the computing device between the first and second users, the visual cue detecting module including at least a gesture detecting module configured to detect the presence or absence of the one or more visual cues in the proximate vicinity of the computing device when the gesture detecting module at least detects visually one or more gestures exhibited by the first user that when detected as occurring at least suggested transfer of the computing device from the first user to the second user at least in part by the first user moving the computing device at least in part with the one or more gestures comprises:
- a visual cue detecting module and an audio cue detecting module configured to determine that the computing device has been transferred from the first user to the second user when the visual cue detecting module detects presence or absence of one or more visual cues in the proximate vicinity of the computing device and when the audio cue detecting module detects presence or absence of one or more audio cues in proximate vicinity of the computing device.

30. The system of claim 1, wherein said highlighted portion presenting module comprises:
- an unhighlighted portion presenting module configured to present the one or more highlighted portions of the item by presenting the one or more highlighted portions with one or more unhighlighted portions of the item as presented by the unhighlighted portion presenting module, the one or more highlighted portions having one or more visual and/or audio formats that are different from the one or more unhighlighted portions.

31. The system of claim 30, wherein said unhighlighted portion presenting module comprises:
- an unhighlighted portion presenting module configured to present the one or more highlighted portions with the one or more unhighlighted portions of the item by presenting the one or more highlighted portions that include text having one or more font styles that are different from one or more font styles of text included with the one or more unhighlighted portions.

32. The system of claim 30, wherein said unhighlighted portion presenting module comprises:

an unhighlighted portion presenting module configured to present the one or more highlighted portions with the one or more unhighlighted portions of the item by presenting the one or more highlighted portions having one or more color and/or brightness schemes that are different from one or more color and/or brightness schemes of the one or more unhighlighted portions.

33. The system of claim 30, wherein said unhighlighted portion presenting module comprises:
an unhighlighted portion presenting module configured to present the one or more highlighted portions with the one or more unhighlighted portions of the item by presenting the one or more highlighted portions that include one or more backgrounds that are different from one or more backgrounds of the one or more unhighlighted portions.

34. The system of claim 30, wherein said unhighlighted portion presenting module comprises:
an unhighlighted portion presenting module configured to present the one or more highlighted portions with the one or more unhighlighted portions of the item by presenting the one or more highlighted portions that include one or more audio schemes that are different from one or more audio schemes of the one or more unhighlighted portions.

35. The system of claim 30, wherein said unhighlighted portion presenting module comprises:
an unhighlighted portion presenting module configured to present the one or more highlighted portions with the one or more unhighlighted portions of the item by presenting the one or more highlighted portions that are encircled by one or more borders.

36. The system of claim 30, wherein said unhighlighted portion presenting module comprises:
an unhighlighted portion presenting module configured to present the one or more highlighted portions with the one or more unhighlighted portions of the item by presenting the one or more highlighted portions that are displayed at a greater brightness than the one or more unhighlighted portions.

37. The system of claim 1, wherein said highlighted portion presenting module comprises:
a highlighted portion presenting module configured to present the one or more highlighted portions of the item, the one or more highlighted portions being highlighted in response, at least in part, to said determining that a computing device, that was presenting an item, has been transferred from a first user to a second user and in response to being preselected for being highlighted, the highlighted portion presenting module configured to present, as the one or more highlighted portions of the item, one or more highlighted portions that were previously presented prior to said transfer of the computing device from the first user to the second user in one or more unhighlighted formats.

38. The system of claim 37, wherein said highlighted portion presenting module comprises:
a highlighted portion presenting module configured to present the one or more highlighted portions of the item, the one or more highlighted portions being highlighted in response, at least in part, to said determining that the computing device has been transferred from the first user to the second user and in response to being selected for highlighting by the first user as detected by a highlighting selection detecting module prior to the transfer of the computing device from the first user to the second user.

39. The system of claim 38, wherein said highlighted portion presenting module comprises:
a highlighted portion presenting module configured to present the one or more highlighted portions of the item, the one or more highlighted portions being highlighted in response, at least in part, to said determining and in response to being selected for highlighting by the first user as detected by the highlighting selection detecting module prior to the transfer of the computing device from the first user to the second user, the first user having provided the selection by selecting from the item one or more portions for highlighting through a user interface.

40. The system of claim 39, wherein said highlighted portion presenting module comprises:
a highlighted portion presenting module configured to present the one or more highlighted portions of the item, the one or more highlighted portions being highlighted in response, at least in part, to said determining and in response to being selected for highlighting by the first user as detected by the highlighting selection detecting module prior to the transfer of the computing device from the first user to the second user, the first user having providing the selection by at least one of marking or tagging one or more parts respectively of one or more portions of the item through a display device, the one or more portions being entirely highlighted in response to the at least one of marking or tagging of the one or more parts of the one or more portions.

41. The system of claim 1, wherein said highlighted portion presenting module comprises:
a user association ascertaining module configured to present the one or more highlighted portions of the item, the one or more highlighted portions being selectively highlighted in response, at least in part, to said determining and in response to the user association ascertaining module ascertaining that the one or more portions of the item that are to be highlighted being specifically associated with the second user.

42. The system of claim 41, wherein said user association ascertaining module comprises:
a user identity association ascertaining module configured to determine that the one or more portions of the item that are to be highlighted are specifically associated with the second user when the user identity association ascertaining module ascertains that the one or more portions of the items that are to be highlighted are specifically associated with identity of the second user.

43. The system of claim 42, wherein said user identity association ascertaining module comprises:
a user identifying module configured to ascertain that the one or more portions of the items that are to be highlighted are specifically associated with identity of the second user when the user identifying module at least identifies the second user based, at least in part, on one or more biometric characteristics of the second user as sensed by one or more sensors.

44. The system of claim 43, wherein said user identifying module comprises:
a user identifying module configured to identify the second user based, at least in part, on one or more biometric characteristics of the second user by identifying the second user based, at least in part, on one or more movement characteristics of the second user as sensed by one or more movement sensors.

45. The system of claim 43, wherein said user identifying module comprises:

a user identifying module configured to identify the second user based, at least in part, on one or more biometric characteristics of the second user by identifying the second user based, at least in part, on one or more voice characteristics of the second user as sensed by one or more audio capturing devices.

46. The system of claim 1, wherein the gesture detecting module configured to detect the presence or absence of the one or more visual cues in the proximate vicinity of the computing device when the gesture detecting module at least detects visually one or more gestures exhibited by the first user that when detected as occurring at least suggested transfer of the computing device from the first user to the second user at least in part by the first user moving the computing device at least in part with the one or more gestures comprises:
    a gesture detecting module configured to detect one or more gestures exhibited by the first user that at least rotate the computing device to cause a front side of the computing device to face away from the first user and toward the second user.

47. The system of claim 1, wherein the gesture detecting module configured to detect the presence or absence of the one or more visual cues in the proximate vicinity of the computing device when the gesture detecting module at least detects visually one or more gestures exhibited by the first user that when detected as occurring at least suggested transfer of the computing device from the first user to the second user at least in part by the first user moving the computing device at least in part with the one or more gestures comprises:
    a gesture detecting module configured to detect one or more gestures exhibited by the first user that are to include at least the first user extending one or both arms, the detected one or more gestures to be suggestive of at least the first user extending the one or both arms while holding the computing device in one or both hands to offer the computing device to the second user.

48. The system of claim 1, wherein the gesture detecting module configured to detect the presence or absence of the one or more visual cues in the proximate vicinity of the computing device when the gesture detecting module at least detects visually one or more gestures exhibited by the first user that when detected as occurring at least suggested transfer of the computing device from the first user to the second user at least in part by the first user moving the computing device at least in part with the one or more gestures comprises:
    a gesture detecting module configured to detect one or more gestures exhibited by the first user that are to include at least the first user holding the computing device in a hand and extending the hand with the computing device away from the first user.

49. The system of claim 1, wherein said highlighted portion presenting module configured to present, via the computing device, one or more highlighted portions of the item, the highlighted portion presenting module being responsive at least in part to the transfer determining module configured to determine that a computing device, that was presenting an item, has been transferred from a first user to a second user, the highlighted portion presenting module being configured to present the one or more highlighted portions of the item responsive at least in part to the transfer determining module and to a highlighting selection detecting module, the highlighting selection detection module configured to detect, prior to the transfer of the computing device from the first user to the second user, that the first user has at least one of marked or tagged at least one or more parts of the one or more portions to select the one or more portions for highlighting comprises:
    a highlighting selection detection module configured to detect, prior to the transfer of the computing device from the first user to the second user, that the first user has at least one of marked or tagged at least one or more parts of the one or more portions with at least one of a touchscreen or a mouse by at least one of writing a symbol on the at least one or more parts, writing a symbol near the at least one or more parts, or drawing a circle around the at least one or more parts.

50. The system of claim 1, wherein said highlighted portion presenting module configured to present, via the computing device, one or more highlighted portions of the item, the highlighted portion presenting module being responsive at least in part to the transfer determining module configured to determine that a computing device, that was presenting an item, has been transferred from a first user to a second user, the highlighted portion presenting module being configured to present the one or more highlighted portions of the item responsive at least in part to the transfer determining module and to a highlighting selection detecting module, the highlighting selection detection module configured to detect, prior to the transfer of the computing device from the first user to the second user, that the first user has at least one of marked or tagged at least one or more parts of the one or more portions to select the one or more portions for highlighting comprises:
    a highlighting selection detection module configured to detect, prior to the transfer of the computing device from the first user to the second user, that the first user has at least one of marked or tagged at least one or more parts of the one or more portions with at least one of a touchscreen or a mouse by at least one of tapping or clicking on the at least one or more parts.

51. The system of claim 1, wherein said highlighted portion presenting module configured to present, via the computing device, one or more highlighted portions of the item, the highlighted portion presenting module being responsive at least in part to the transfer determining module configured to determine that a computing device, that was presenting an item, has been transferred from a first user to a second user, the highlighted portion presenting module being configured to present the one or more highlighted portions of the item responsive at least in part to the transfer determining module and to a highlighting selection detecting module, the highlighting selection detection module configured to detect, prior to the transfer of the computing device from the first user to the second user, that the first user has at least one of marked or tagged at least one or more parts of the one or more portions to select the one or more portions for highlighting comprises:
    a highlighting selection detection module configured to detect, prior to the transfer of the computing device from the first user to the second user, that the first user has at least one of marked or tagged at least one or more parts of the one or more portions with one or more user input devices that include at least one of a touch screen, a keyboard, or a mouse.

52. The system of claim 1, wherein said a gesture detecting module configured to detect the presence or absence of the one or more visual cues in the proximate vicinity of the computing device when the gesture detecting module at least detects visually one or more gestures exhibited by the first user that when detected as occurring at least suggested transfer of the computing device from the first user to the second user at least in part by the first user having moved the computing device at least in part with the one or more gestures comprises:

a gesture detecting module configured to detect the one or more gestures exhibited by the first user at least in part based on a detection of one or more movements displayed on or exhibited by the computing device.

53. The system of claim 52, wherein said gesture detecting module configured to detect the one or more gestures exhibited by the first user at least in part based on a detection of one or more movements displayed on or exhibited by the computing device comprises:
a gesture detecting module configured to detect the one or more gestures exhibited by the first user at least in part based on a detection of the second user with one or more image capturing devices.

54. The system of claim 52, wherein said gesture detecting module configured to detect the one or more gestures exhibited by the first user at least in part based on a detection of one or more movements displayed on or exhibited by the computing device comprises:
a gesture detecting module configured to detect the one or more gestures exhibited by the first user at least in part based on a detection that the computing device has spatially moved in one or more particular ways.

55. The system of claim 54, wherein said gesture detecting module configured to detect the one or more gestures exhibited by the first user at least in part based on a detection that the computing device has spatially moved in one or more particular ways comprises:
a gesture detecting module configured to detect the one or more gestures exhibited by the first user at least in part based on a detection that the computing device has exhibited a change in at least one of a spatial location, a spin rotation, a tilt orientation, or a position relative to the first user.

56. The system of claim 54, wherein said gesture detecting module configured to detect the one or more gestures exhibited by the first user at least in part based on a detection that the computing device has spatially moved in one or more particular ways comprises:
a gesture detecting module configured to detect the one or more gestures exhibited by the first user at least in part based on a detection with one or more image capturing devices of one or more environmental aspects surrounding the computing device.

57. The system of claim 56, wherein said gesture detecting module configured to detect the one or more gestures exhibited by the first user at least in part based on a detection with one or more image capturing devices of one or more environmental aspects surrounding the computing device comprises:
a gesture detecting module configured to detect the one or more gestures exhibited by the first user at least in part based on a detected change in a rate of movement of the computing device relative to one or more objects as viewed with one or more image capturing devices.

58. The system of claim 56, wherein said gesture detecting module configured to detect the one or more gestures exhibited by the first user at least in part based on a detection with one or more image capturing devices of one or more environmental aspects surrounding the computing device comprises:
a gesture detecting module configured to detect the one or more gestures exhibited by the first user at least in part based on a detected change in rate of movement of the computing device relative to one or more surroundings of the computing device.

59. The system of claim 1, wherein said highlighting selection detection module configured to detect, prior to the transfer of the computing device from the first user to the second user, that the first user has at least one of marked or tagged at least one or more parts of the one or more portions to select the one or more portions for highlighting comprises:
a highlighting selection detection module further configured to store at least an indication of the selection for subsequent access by the highlighted portion presenting module.

60. The system of claim 59, wherein said highlighting selection detection module further configured to store at least an indication of the selection for subsequent access by the highlighted portion presenting module comprises:
a highlighting selection detection module further configured to store at least an indication of the selection in one or more memories for subsequent access by the highlighted portion presenting module.

61. The system of claim 59, wherein said highlighting selection detection module further configured to store at least an indication of the selection for subsequent access by the highlighted portion presenting module comprises:
a highlighting selection detection module further configured to store at least an indication of the selection for a subsequent determination by the highlighted portion presenting module regarding one or more formats for presenting the one or more highlighted portions.

62. The system of claim 1, wherein said highlighted portion presenting module configured to present, via the computing device, one or more highlighted portions of the item comprises:
a highlighted portion presenting module configured to access from one or memories at least an indication of a selection of the one or more portions by the highlighting selection detection module, the highlighted portion presenting module configured to make a determination, after the transfer of the computing device from the first user to the second user, regarding one or more formats for presenting the one or more highlighted portions of the item to the second user via the computing device.

63. The system of claim 62, wherein said highlighted portion presenting module configured to access from one or memories at least an indication of a selection of the one or more portions by the highlighting selection detection module, the highlighted portion presenting module configured to make a determination, after the transfer of the computing device from the first user to the second user, regarding one or more formats for presenting the one or more highlighted portions of the item to the second user via the computing device comprises:
a highlighted portion presenting module configured to determine one or more formats for presenting the one or more highlighted portions of the item to the second user, wherein the highlighted portion presenting module is configured to determine that the one or more formats for presenting the one or more highlighted portions of the item to the second user are the same as one or more formats for presenting the one or more highlighted portions of the item to the first user prior to the transfer of the computing device from the first user to the second user and subsequent to the detection of the at least one of the marking or the tagging.

64. The system of claim 62, wherein said highlighted portion presenting module configured to access from one or memories at least an indication of a selection of the one or more portions by the highlighting selection detection module, the highlighted portion presenting module configured to make a determination, after the transfer of the computing device from the first user to the second user, regarding one or more formats for presenting the one or more highlighted portions of the item to the second user via the computing device comprises:
- a highlighted portion presenting module configured to determine one or more formats for presenting the one or more highlighted portions of the item to the second user, wherein the highlighted portion presenting module is configured to determine that the one or more formats for presenting the one or more highlighted portions of the item to the second user are different from one or more formats for presenting the one or more highlighted portions of the item to the first user prior to the transfer of the computing device from the first user to the second user and subsequent to the detection of the at least one of the marking or the tagging.

65. A computationally-implemented system, comprising:
circuitry for determining that a computing device, that was presenting an item, has been transferred from a first user to a second user, including at least:
- circuitry for detecting at least presence or absence of one or more visual cues in proximate vicinity of the computing device that when detected as occurring at least suggested transfer of the computing device between the first and second users, the circuitry for detecting including at least:
  - circuitry for visually detecting one or more gestures exhibited by the first user that when detected as occurring at least suggested transfer of the computing device from the first user to the second user at least in part by the first user moving the computing device at least in part with the one or more gestures; and
circuitry for presenting, via the computing device, one or more highlighted portions of the item, the circuitry for presenting being responsive at least in part to the circuitry for determining that a computing device, that was presenting an item, has been transferred from a first user to a second user, the circuitry for presenting being configured to present the one or more highlighted portions of the item responsive at least in part to the circuitry for determining and to a highlighting selection detection circuitry, the highlighting selection detection circuitry configured to detect, prior to the transfer of the computing device from the first user to the second user, that the first user has at least one of marked or tagged at least one or more parts of the one or more portions to select the one or more portions for highlighting.

66. An article of manufacture, comprising:
a non-transitory storage medium bearing:
one or more instructions for determining that a computing device, that was presenting an item, has been transferred from a first user to a second user, one or more instructions for determining including at least:
- one or more instructions for visually detecting at least presence or absence of one or more visual cues in proximate vicinity of the computing device that when detected as occurring at least suggested transfer of the computing device between the first and second users, the one or more instructions for visually detecting including at least:
  - one or more instructions for visually detecting one or more gestures exhibited by the first user that when detected as occurring at least suggested transfer of the computing device from the first user to the second user at least in part by the first user moving the computing device at least in part with the one or more gestures; and
one or more instructions for presenting, via the computing device, one or more highlighted portions of the item, the one or more highlighted portions being highlighted in response, at least in part, to said one or more instructions for determining, the one or more instructions for presenting being configured to present the one or more highlighted portions of the item responsive at least in part to the one or more instructions for determining and one or more highlighting selection detecting instructions, the one or more highlighting selection detecting instructions configured to detect, prior to the transfer of the computing device from the first user to the second user, that the first user has at least one of marked or tagged at least one or more parts of the one or more portions to select the one or more portions for highlighting.

* * * * *